United States Patent
Okanishi et al.

(10) Patent No.: US 8,182,958 B2
(45) Date of Patent: *May 22, 2012

(54) MEMBRANE MEMBRANE-REINFORCEMENT-MEMBER ASSEMBLY, MEMBRANE CATALYST-LAYER ASSEMBLY, MEMBRANE ELECTRODE ASSEMBLY AND POLYMER ELECTROLYTE FUEL CELL

(75) Inventors: Takeou Okanishi, Osaka (JP); Atsushi Nogi, Aichi (JP); Yoichiro Tsuji, Osaka (JP)

(73) Assignee: Panasonic Corporation, Osaka (JP)

( * ) Notice: Subject to any disclaimer, the term of this patent is extended or adjusted under 35 U.S.C. 154(b) by 328 days.

This patent is subject to a terminal disclaimer.

(21) Appl. No.: 12/524,835

(22) PCT Filed: Jan. 29, 2008

(86) PCT No.: PCT/JP2008/051260
§ 371 (c)(1),
(2), (4) Date: Jul. 28, 2009

(87) PCT Pub. No.: WO2008/093658
PCT Pub. Date: Aug. 7, 2008

(65) Prior Publication Data
US 2010/0062304 A1    Mar. 11, 2010

(30) Foreign Application Priority Data

Jan. 29, 2007  (JP) ................. 2007-017872
Mar. 8, 2007   (JP) ................. 2007-058844

(51) Int. Cl.
*H01M 8/10* (2006.01)
(52) U.S. Cl. .................. 429/492; 429/480; 429/508
(58) Field of Classification Search .............. 429/479, 429/481, 484, 491–494
See application file for complete search history.

(56) References Cited

U.S. PATENT DOCUMENTS
2005/0181249 A1   8/2005   Logan
(Continued)

FOREIGN PATENT DOCUMENTS
JP    62-5569    1/1987
(Continued)

OTHER PUBLICATIONS

US Notice of Allowance issued in U.S. Appl. No. 12/530,907 dated Feb. 9, 2012.

*Primary Examiner* — Ula C Ruddock
*Assistant Examiner* — Scott J Chmielecki
(74) *Attorney, Agent, or Firm* — McDermott Will & Emery LLP

(57) ABSTRACT

A membrane membrane-reinforcement-member assembly, membrane catalyst-layer assembly, membrane electrode assembly, and polymer electrolyte fuel cell are provided, which are so configured as to ensure sufficient durability and a cost reduction in unit cells and be suited for mass production. To this end, a membrane membrane-reinforcement-member assembly (20) of a membrane catalyst-layer assembly (30) provided in an MEA (5) of a cell (100) has a polymer electrolyte membrane (1), a pair of first membrane reinforcement members (10*a*) and a pair of second membrane reinforcement members (10*b*) which members (10*a*), (10*b*) are embedded in the polymer electrolyte membrane (1) such that their main surfaces are not exposed therefrom. The first and second membrane reinforcement members (10*a*), (10*b*) are embedded in a parallelogrammatic fashion so as to overlap each other in the four corners of the polymer electrolyte membrane (1) when viewed in a thickness direction of the polymer electrolyte membrane.

12 Claims, 36 Drawing Sheets

U.S. PATENT DOCUMENTS

| | | |
|---|---|---|
| 2005/0181267 A1 * | 8/2005 | Mitsuta et al. ............... 429/40 |
| 2005/0227132 A1 | 10/2005 | Hori et al. |
| 2006/0046121 A1 * | 3/2006 | Shimohira et al. .............. 429/30 |

FOREIGN PATENT DOCUMENTS

| | | |
|---|---|---|
| JP | 05-021077 | 1/1993 |
| JP | 05-242897 | 9/1993 |
| JP | 07-220742 | 8/1995 |
| JP | 08-259710 | 10/1996 |
| JP | 10-154521 | 6/1998 |
| JP | 2001-236971 | 8/2001 |
| JP | 2003-082488 | 3/2003 |
| JP | 2006-338938 | 12/2006 |
| WO | WO 2005/081343 A1 | 9/2005 |
| WO | WO 2005/086264 A1 | 9/2005 |
| WO | WO 2006/025335 A1 | 3/2006 |
| WO | WO 2006/137203 A1 | 12/2006 |
| WO | WO 2007/032442 A1 | 3/2007 |

* cited by examiner

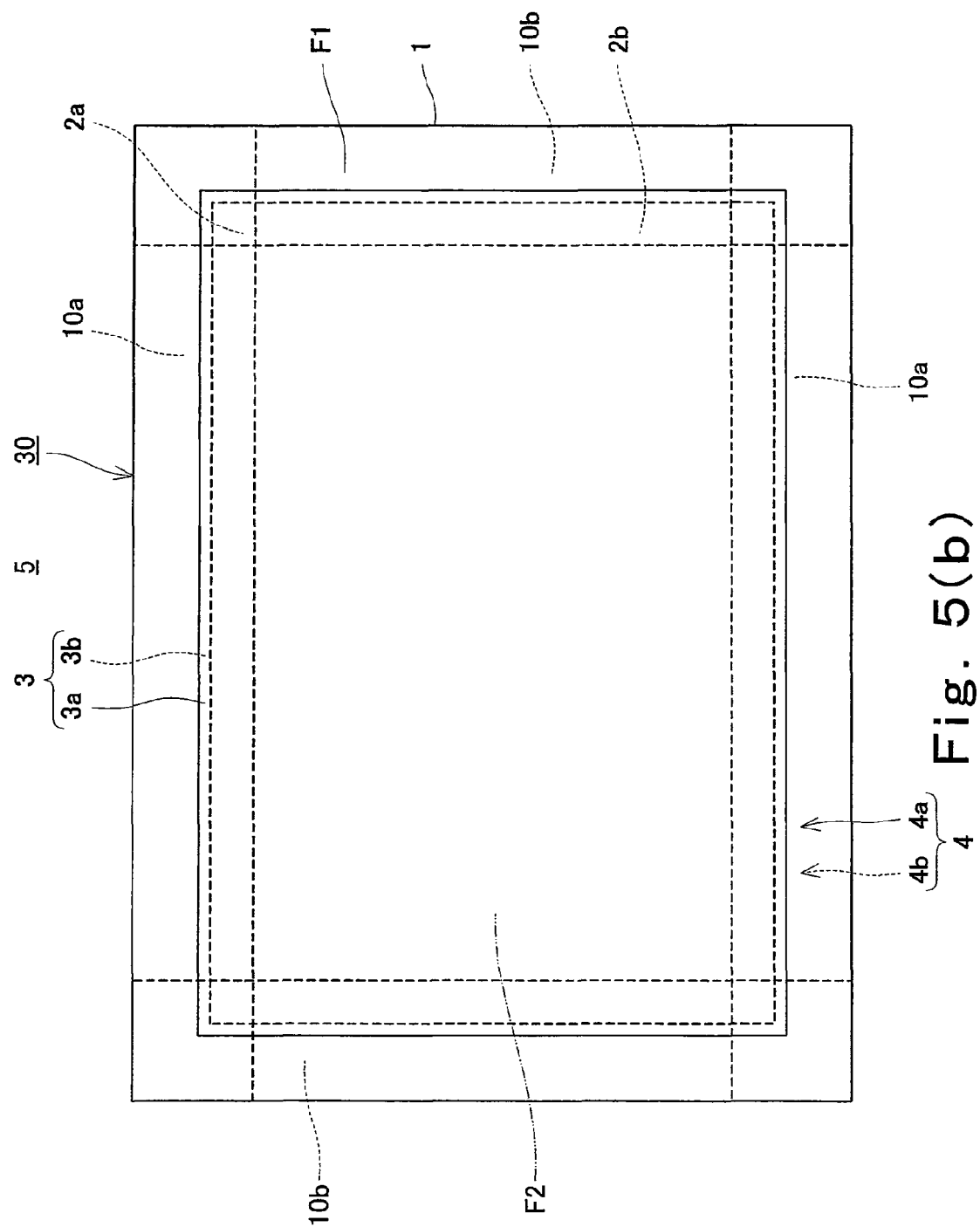

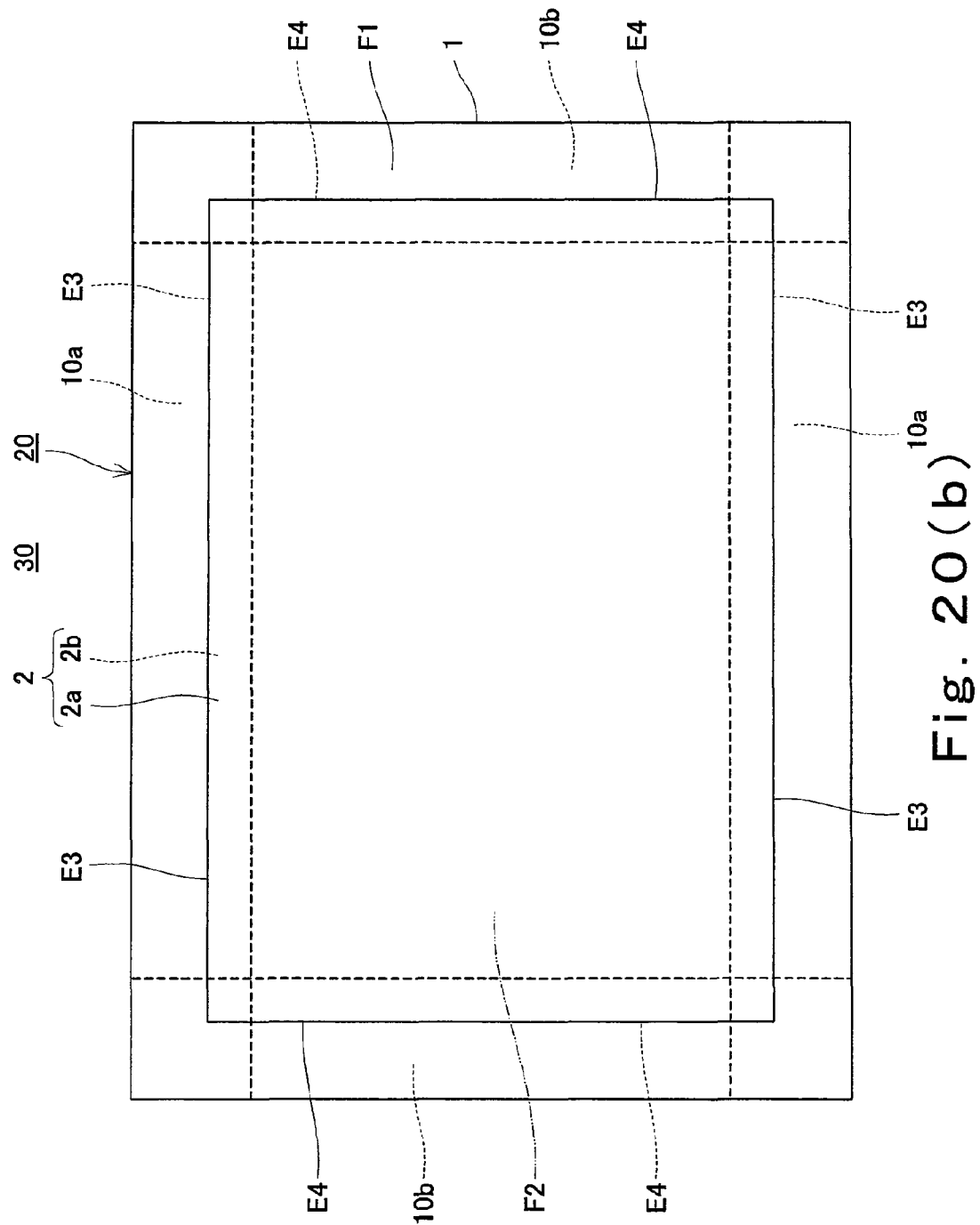

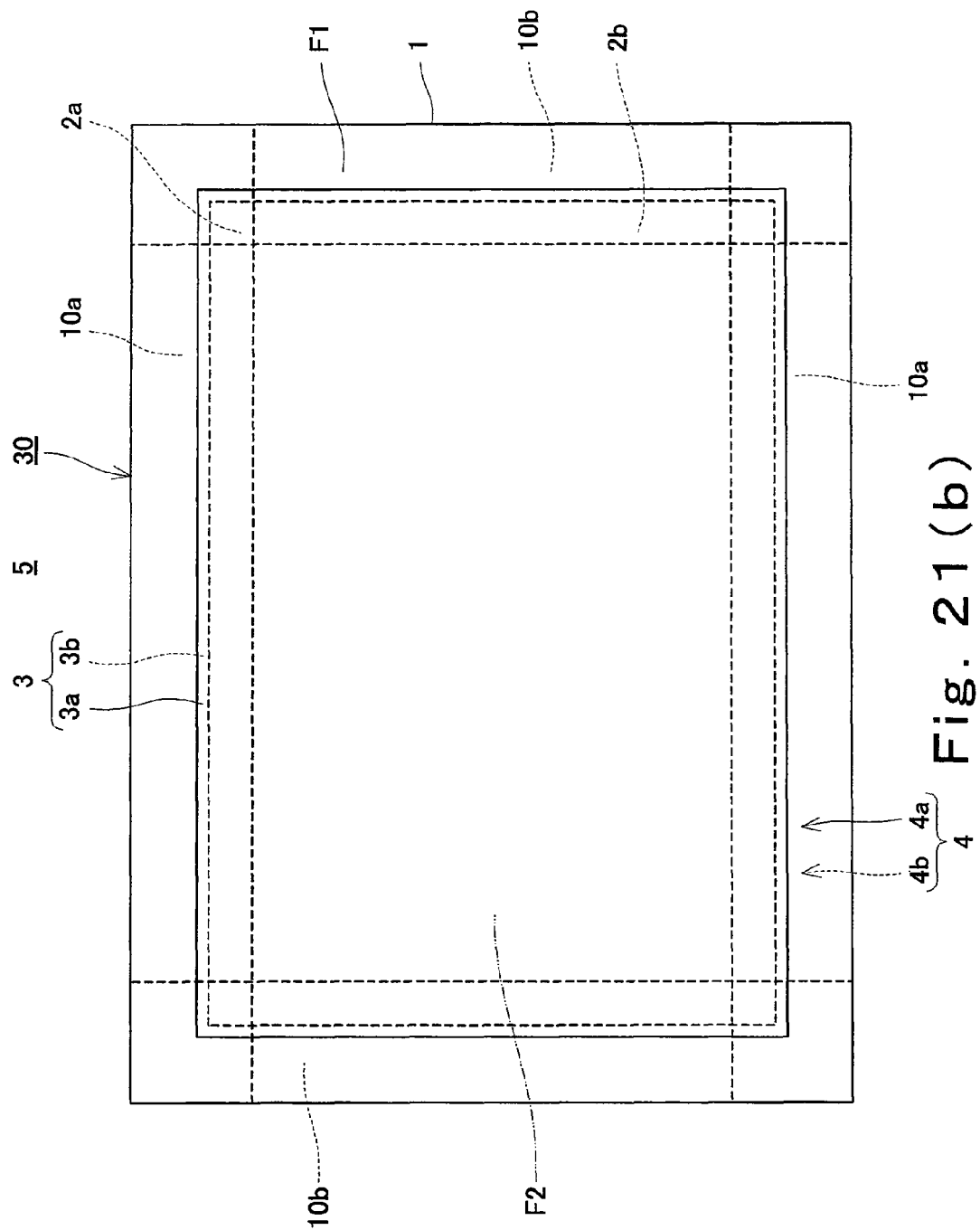

MEMBRANE MEMBRANE-REINFORCEMENT-MEMBER ASSEMBLY, MEMBRANE CATALYST-LAYER ASSEMBLY, MEMBRANE ELECTRODE ASSEMBLY AND POLYMER ELECTROLYTE FUEL CELL

RELATED APPLICATIONS

This application is the U.S. National Phase under 35 U.S.C. §371 of International Application No. PCT/JP2008/051260, filed on Jan. 29, 2008, which in turn claims the benefit of Japanese Application No. 2007-017872, filed on Jan. 29, 2007 and 2007-058844, filed on Mar. 8, 2007, the disclosures of which Applications are incorporated by reference herein.

TECHNICAL FIELD

The present invention relates to the configuration of a membrane membrane-reinforcement-member assembly, membrane catalyst-layer assembly, membrane electrode assembly and polymer electrolyte fuel cell, and more particularly to the configuration of the membrane membrane-reinforcement-member assembly.

BACKGROUND ART

Polymer electrolyte fuel cell stacks (often referred to as "PEFCs") offer advantages over other fuel cell stacks (often referred to as "stacks"), including lower operating temperatures during power generating operation, higher output densities and higher long-term reliability. Therefore, they have been drawing attention as a fuel cell stack used for fuel cell cogeneration systems.

Polymer electrolyte fuel cell stacks cause direct conversion of energy created by an electrochemical reaction into electric energy, accompanied with heat generation. This electrochemical reaction occurs between a fuel gas and an oxidizing gas (e.g., air), the fuel gas being generated from reforming of a raw fuel (e.g., city gas) and, more particularly, between hydrogen contained in the fuel gas and oxygen contained in the oxidizing gas. Incidentally, polymer electrolyte fuel cell stacks include unit cells (often referred to as "cells"). Each unit cell is composed of a membrane electrode assembly (often referred to as "MEA") that includes a polymer electrolyte membrane and a pair of gas diffusion electrodes sandwiching the polymer electrolyte membrane therebetween; a pair of gaskets; and a pair of conductive separators. Either one of the conductive separators has, at its main surface in contact with a gas diffusion electrode, a groove-shaped fuel gas flow passage for permitting the passage of the fuel gas. The other conductive separator has, at its main surface in contact with the other gas diffusion electrode, a groove-shaped oxidizing gas flow passage for permitting the passage of the oxidizing gas. A pair of gaskets are disposed in the peripheral portion of the membrane electrode assembly so as to be sandwiched between the pair of conductive separators, thereby forming the unit cell. A specified number of such unit cells are stacked to thereby form a polymer electrolyte fuel cell stack. As a technique for manufacture of unit cells provided in a polymer electrolyte fuel cell stack, a continuous membrane electrode assembly production method has been proposed, which provides improved assembling (see e.g., Patent Document 1).

FIG. 31 shows a process chart outlining, in a schematic manner, production steps of a membrane electrode assembly (i.e., a catalyst layer coating step and a diffusion layer integration step) disclosed in Patent Document 1.

As illustrated in FIG. 31, in the catalyst layer coating step 310 of the production of the membrane electrode assembly disclosed in Patent Document 1, catalyst layers 331 are applied to the upper and lower surfaces, respectively, of the polymer electrolyte membrane 330 by coating and then dried with hot rolls 380 thereby forming a catalyst-layer polymer-electrolyte-membrane assembly 332. In the diffusion layer integration step 320 of the production of the membrane electrode assembly, diffusion layers 333 are applied to the upper and lower surfaces, respectively, of the catalyst-layer polymer-electrolyte-membrane assembly 332 and then heated by hot rollers 390, so that the diffusion layers 333 are bonded to the catalyst layers 331 respectively. Such a continuous production method is adopted to thereby facilitate the fabrication of the membrane electrode assembly in the course of the production of a unit cell.

As a polymer electrolyte fuel cell stack configuration, the so-called "stacking type" is generally known, according to which a specified number of unit cells are linearly stacked and fastened together so that the adjacent membrane electrode assemblies are electrically serially connected. When fabricating the polymer electrolyte fuel cell stack having the above stacking type configuration, a pair of end plates are provided at both ends of the stack of unit cells to sandwich the stack, and the pair of end plates and the stacked unit cells are fastened together by specified fastening members. Therefore, the polymer electrolyte membrane of the membrane electrode assembly needs to be protected by a proper protecting means so as to withstand the pressure of the fastening and so as not to suffer from mechanical damage caused by wear or the like during long periods of use.

As an attempt to meet the need, a membrane electrode assembly configuration having a frame-shaped protective film attached to the polymer electrolyte membrane has been proposed (see, e.g., Patent Document 2).

FIG. 32 is a cross-sectional view schematically illustrating a configuration of a unit cell in a solid polymer electrolyte fuel cell stack disclosed in Patent Document 2.

As illustrated in FIG. 32, frame-shaped protective films 220 formed from a fluororesin-based sheet are disposed on the main surfaces, respectively, of a solid polymer electrolyte membrane 210 such that the inner peripheral portions of the protective films 220 are covered with electrodes 213 respectively. In addition, gaskets 212 are disposed such that each electrode 213 is enclosed by its associated gasket 212 with a gap 214 therebetween. In this way, each protective film 220 is securely held between the gasket 212/the electrode 213 and the solid polymer electrolyte membrane 210, thereby reinforcing the solid polymer electrolyte membrane 210 at the gap 214. Therefore, damage to the solid polymer electrolyte membrane 210 can be properly prevented without need for increasing the thickness of the solid polymer electrolyte membrane 210.

Patent Document 1: JP-A-2001-236971
Patent Document 2: JP-A-05-21077

DISCLOSURE OF THE INVENTION

Problems that the Invention is to Solve

The configuration of the unit cells in the solid polymer electrolyte fuel cell stack disclosed in Patent Document 2 is premised on the production of the membrane electrode assembly by the so-called batch method in which the frame-shaped protective films 220 are formed beforehand and then, the solid polymer electrolyte membrane 210, the protective films 220 and the electrodes 213 are combined together.

Therefore, there still remains room for improvement in the production process of the membrane electrode assembly disclosed in Patent Document 1, when taking account of further cost reduction and improved productivity and more particularly when pursuing efficient mass production.

The invention is directed to overcoming the foregoing problem and a primary object of the invention is therefore to provide a membrane membrane-reinforcement-member assembly, a membrane catalyst-layer assembly, a membrane electrode assembly and a polymer electrolyte fuel cell provided with these assemblies, which assemblies and fuel cell are configured to ensure sufficient durability and a cost reduction in the unit cells and be suited for mass production.

Means of Solving the Problems

The above object can be achieved by a membrane membrane-reinforcement-member assembly according to the invention, the assembly comprising:

a polymer electrolyte membrane that is substantially quadrilateral in shape and has a first main surface and a second main surface;

a pair of first membrane reinforcement members that respectively extend along one opposed pair of sides of four sides of the polymer electrolyte membrane and are embedded in the polymer electrolyte membrane such that their main surfaces are unexposed; and a pair of second membrane reinforcement members that respectively extend along the other opposed pair of sides of four sides of the polymer electrolyte membrane and are embedded in the polymer electrolyte membrane such that their main surfaces are unexposed;

wherein the pair of first membrane reinforcement members and the pair of second membrane reinforcement members are arranged such that the pair of first membrane reinforcement members are positioned closer to the first main surface than the pair of second membrane reinforcement members, and are so embedded as to overlap each other in the four corners of the polymer electrolyte membrane, when viewed in a thickness direction of the polymer electrolyte membrane.

In this configuration, the peripheral portion of the polymer electrolyte membrane is reinforced by the pair of first membrane reinforcement members and the pair of second membrane reinforcement members, so that damage to the polymer electrolyte membrane that is likely to occur when fabricating a polymer electrolyte fuel cell by fastening can be prevented without fail. Further, the pair of first membrane reinforcement members and the pair of second membrane reinforcement members are embedded so as to overlap each other in the four corners of the polymer electrolyte membrane, which unfailingly prevents a cross-leak of the fuel gas and the oxidizing gas (reaction gases).

In addition, the above configuration makes it possible to easily incorporate the membrane electrode assembly production method disclosed in Patent Document 1 into the production method of the membrane membrane-reinforcement-member assembly of the invention, the production method of Patent Document 1 being such that a tape-shaped membrane reinforcement member is laminated to a tape-shaped polymer electrolyte membrane, thereby forming a laminate composed of the tape-shaped polymer electrolyte membrane and membrane reinforcement member. Compared to the configuration of the membrane electrode assembly having frame-shaped protective films disclosed in Patent Document 2, the invention ensures equivalent durability while bringing about a reduction in the material cost.

With the configuration of the membrane membrane-reinforcement-member assembly according to the invention, not only satisfactory durability but also further cost reduction and improved productivity can be easily achieved.

In this case, the pair of first membrane reinforcement members and the pair of second membrane reinforcement members may be embedded such that their respective main surfaces are in contact with each other in the four corners of the polymer electrolyte membrane.

In this configuration, since the pair of first membrane reinforcement members and the pair of second membrane reinforcement members are in contact with each other in the four corners of the polymer electrolyte membrane, the polymer electrolyte membrane can be adequately reinforced.

In addition, the pair of first membrane reinforcement members and the pair of second membrane reinforcement members may be embedded such that their respective main surfaces are not in contact with each other in the four corners of the polymer electrolyte membrane.

Further, the pair of first membrane reinforcement members and the pair of second membrane reinforcement members may be embedded such that their respective main surfaces are not in contact with each other in the four corners of the polymer electrolyte membrane, with the polymer electrolyte membrane sandwiched therebetween.

In this configuration, since the pair of first membrane reinforcement members and the pair of second membrane reinforcement members are separated from each other with the polymer electrolyte membrane therebetween in the four corners of the polymer electrolyte membrane, the pair of first membrane reinforcement members and the pair of second membrane reinforcement members can be unfailingly prevented from coming off each other with time.

Further, the pair of first membrane reinforcement members may be embedded in the polymer electrolyte membrane such that a first portion of the first main surface is substantially flush with a second portion of the first main surface, the first portion being located on the pair of first membrane reinforcement members whereas the second portion is an area other than the first portion, and the pair of second membrane reinforcement members may be embedded in the polymer electrolyte membrane such that a first portion of the second main surface is substantially flush with a second portion of the second main surface, the first portion being located on the pair of second membrane reinforcement members whereas the second portion is an area other than the first portion.

In this configuration, since the first and second main surfaces of the polymer electrolyte membrane are respectively flat, a first catalyst layer and a second catalyst layer can be easily formed on the first and second main surfaces respectively.

The polymer electrolyte membrane may contain therein an inner reinforcement membrane having a through hole that serves as an ion conduction path.

In this configuration, since the polymer electrolyte membrane has therein an inner reinforcement membrane having a through hole that serves as an ion conduction path, the mechanical strength of the polymer electrolyte membrane can be further increased while ensuring ion conductivity. In the event of damage to the polymer electrolyte membrane, a cross-leak of the fuel gas and the oxidizing gas can be unfailingly prevented by the inner reinforcement membrane.

In this case, the pair of first membrane reinforcement members and the pair of second membrane reinforcement members may be embedded so as to sandwich the inner reinforcement membrane therebetween in the four corners of the polymer electrolyte membrane.

In this configuration, since the pair of first membrane reinforcement members and the pair of second membrane reinforcement members are integral with the inner reinforcement membrane, a dramatic improvement can be achieved in the mechanical strength of the polymer electrolyte membrane.

According to the invention, there is provided a membrane catalyst-layer assembly comprising:

the membrane membrane-reinforcement-member assembly having the above-described discriminative configuration of the invention;

a first catalyst layer that is so arranged as to cover the first main surface of the polymer electrolyte membrane; and a second catalyst layer that is so arranged as to cover the second main surface of the polymer electrolyte membrane;

wherein the first catalyst layer is arranged to overlap a part of the main surfaces of the pair of first membrane reinforcement members and a portion of the polymer electrolyte membrane which portion is located between the pair of first membrane reinforcement members, when viewed in a thickness direction of the polymer electrolyte membrane; and wherein the second catalyst layer is arranged to overlap a part of the main surfaces of the pair of second membrane reinforcement members and a portion of the polymer electrolyte membrane which portion is located between the pair of second membrane reinforcement members, when viewed in the thickness direction of the polymer electrolyte membrane.

In this configuration, since the ends of the first and second catalyst layers are arranged so as to overlap the pair of first membrane reinforcement members and the pair of second membrane reinforcement members, damage to the polymer electrolyte membrane by the first and second catalyst layers can be prevented without fail.

In this case, the first catalyst layer and the second catalyst layer may be arranged such that their entire peripheral portions overlap the first membrane reinforcement members and the second membrane reinforcement members respectively, when viewed in the thickness direction of the polymer electrolyte membrane.

In this configuration, since the first catalyst layer and the second catalyst layer are arranged such that their entire peripheral portions overlap the first and second membrane reinforcement members respectively, when viewed in the thickness direction of the polymer electrolyte membrane, a cross-leak of the fuel gas and the oxidizing gas can be more reliably prevented.

According to the invention, there is provided a membrane electrode assembly comprising:

the membrane catalyst-layer assembly of a configuration having the above-described characteristic features of the invention, a first gas diffusion layer that is arranged so as to cover the first catalyst layer of the membrane catalyst-layer assembly, and a second gas diffusion layer that is arranged so as to cover the second catalyst layer of the membrane catalyst-layer assembly.

This membrane electrode assembly is constructed with the membrane catalyst-layer assembly having excellent durability, cost performance and productivity. Therefore, the invention can steadily provide a membrane electrode assembly excellent in durability and cost performance according to need.

According to the invention, there is provided a polymer electrolyte fuel cell including the membrane electrode assembly of a configuration having the above-described characteristic features of the invention.

This polymer electrolyte fuel cell is constructed with the membrane electrode assembly having excellent durability, cost performance and productivity. Therefore, the invention can steadily provide a polymer electrolyte fuel cell excellent in durability and cost performance according to need.

Effects of the Invention

According to the invention, it is possible to provide a membrane membrane-reinforcement-member assembly, a membrane catalyst-layer assembly, a membrane electrode assembly and a polymer electrolyte fuel cell provided with these assemblies, which assemblies and fuel cell are so configured as to ensure satisfactory durability and a cost reduction in unit cells and be suited for mass production.

BRIEF DESCRIPTION OF DRAWINGS

FIG. 5(b) is a schematic view when viewed from the direction of arrow Vb indicated in FIG. 5(a).

FIG. 20(b) is a schematic view when viewed from the direction of arrow XXb indicated in FIG. 20(a).

FIG. 21(b) is a schematic view when viewed from the direction of arrow XXIb indicated in FIG. 21(a).

REFERENCE NUMERALS IN THE DRAWINGS

Figure 1:
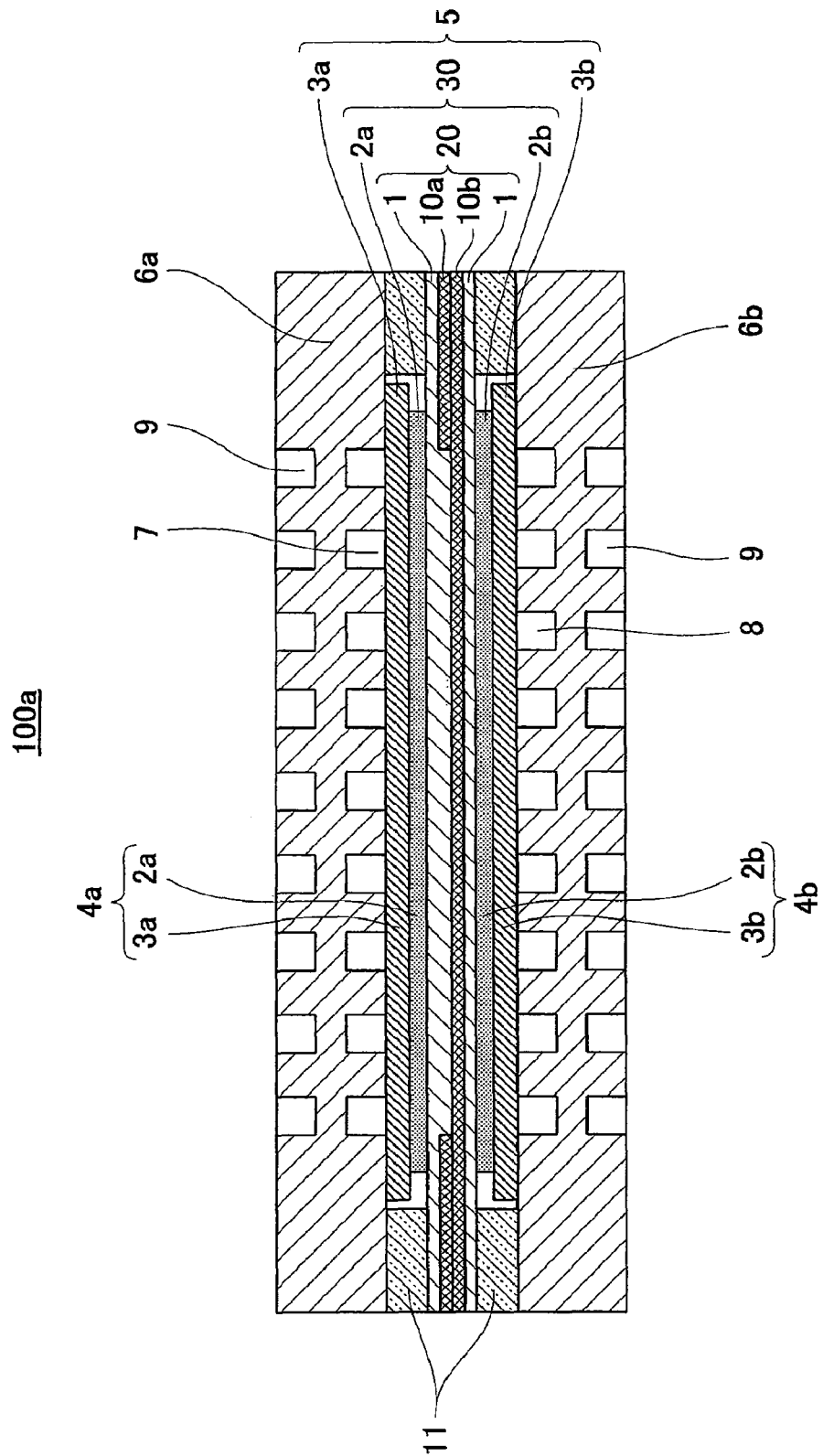
FIG. 1 is a cross-sectional view schematically illustrating a general configuration of a unit cell provided in a polymer electrolyte fuel cell according to a first embodiment of the invention.

1: polymer electrolyte membrane
1$a$: first cavity portion
1$b$: second cavity portion
2: catalyst layers
2$a$: anode catalyst layer
2$b$: cathode catalyst layer
3: gas diffusion layers
3$a$: anode gas diffusion layer
3$b$: cathode gas diffusion layer
4: electrodes
4$a$: anode
4$b$: cathode
5: MEA (membrane electrode assembly)
6$a$: anode separator
6$b$: cathode separator
7: fuel gas flow passage
8: oxidizing gas flow passage
9: heating medium flow passage
10$a$: first membrane reinforcement member
10$b$: second membrane reinforcement member
11: gaskets
15: polymer electrolyte membrane/inner reinforcement membrane composite
15$a$: polymer electrolyte membrane
15$b$: polymer electrolyte membrane
15$c$: inner reinforcement membrane
16: opening
20: membrane membrane-reinforcement-member assembly
30: membrane catalyst-layer assembly
40: polymer electrolyte membrane roll
40$b$: polymer electrolyte membrane roll
40$c$: polymer electrolyte membrane roll
41$a$: polymer electrolyte membrane tape
41$b$: cast membrane
41$c$: polymer electrolyte membrane tape
41$d$: polymer electrolyte membrane tape
41$e$: polymer electrolyte membrane tape
42: membrane membrane-reinforcement-member assembly tape
43: concave portion
44: polyelectrolyte solution
45: blade
46: membrane membrane-reinforcement-member assembly tape
47: mask
48: opening
49: catalyst layer forming apparatus
50: membrane catalyst-layer assembly tape
51: cutting machine
60: membrane reinforcement member roll
61: membrane reinforcement member tape
80, 81: roller 82, 83: roller
84: substrate sheet
85: substrate membrane reinforcement member roll
86: substrate membrane-reinforcement-member assembly tape
87: substrate polymer electrolyte membrane tape
92: rotating roll
93: applicator roll
94: liquid dam portion
95: roll knife coater
96: roll knife
96a: swing cutter portion
97: notch
97a: side surface
100a, 100b: cell
210: solid polymer electrolyte membrane
212: gasket
213: electrode
214: gap
220: protective film
222: openings
250: protective film
252: protective film roll
260: solid polymer electrolyte membrane
262: solid polymer electrolyte membrane roll
280: membrane protective-film assembly roll
290: rollers
310: catalyst layer application step
320: diffusion layer integration step
330: polymer electrolyte membrane
331: catalyst layers
332: catalyst-layer polymer-electrolyte-membrane assembly
333: diffusion layer
380: hot roll
390: hot roll
D1, D10: pay-out direction
E1, E2: side
E3, E4: side
F1, F2: main surface
P1: bonding step
P2: thermal treatment step
P3: thermocompression bonding step
P4: coating step
P5: cutting step
R200: region
d: distance

BEST MODE FOR CARRYING OUT THE INVENTION

Referring now to the accompanying drawings, first and second preferred embodiments of the invention will be described in detail. In the following description, those parts in all figures that are substantially equivalent or function substantially similarly to one another are indicated by the same numerals and redundant explanation will be omitted.

First Embodiment

FIG. 1 is a cross-sectional view schematically illustrating a general configuration of a unit cell (hereinafter referred to as "cell") provided in a polymer electrolyte fuel cell stack (hereinafter referred to as "PEFC") according to a first embodiment of the invention. It should be noted the configuration of the cell is partially omitted in FIG. 1.

As illustrated in FIG. 1, a cell 100a of the PEFC of the first embodiment has a membrane electrode assembly (hereinafter referred to as "MEA") 5, first and second membrane reinforcement members 10a, 10b disposed in the MEA 5, gaskets 11, an anode separator 6a, and a cathode separator 6b.

The MEA 5 is provided with a polymer electrolyte membrane 1 configured to selectively transport hydrogen ions, an anode 4a composed of an anode catalyst layer (first catalyst layer) 2a and an anode gas diffusion layer (first gas diffusion layer) 3a, and a cathode 4b composed of a cathode catalyst layer (second catalyst layer) 2b and a cathode gas diffusion layer (second gas diffusion layer) 3b. In this specification, the assembly constituted by the polymer electrolyte membrane 1 and the first and second membrane reinforcement members 10a, 10b is called "membrane membrane-reinforcement-member assembly 20". In this specification, the assembly constituted by the membrane membrane-reinforcement-member assembly 20, the anode catalyst layer 2a and the cathode catalyst layer 2b is called "membrane catalyst-layer assembly 30".

First, the configuration of the polymer electrolyte membrane 1 and the membrane membrane-reinforcement-member assembly 20 will be explained.

Figure 2:
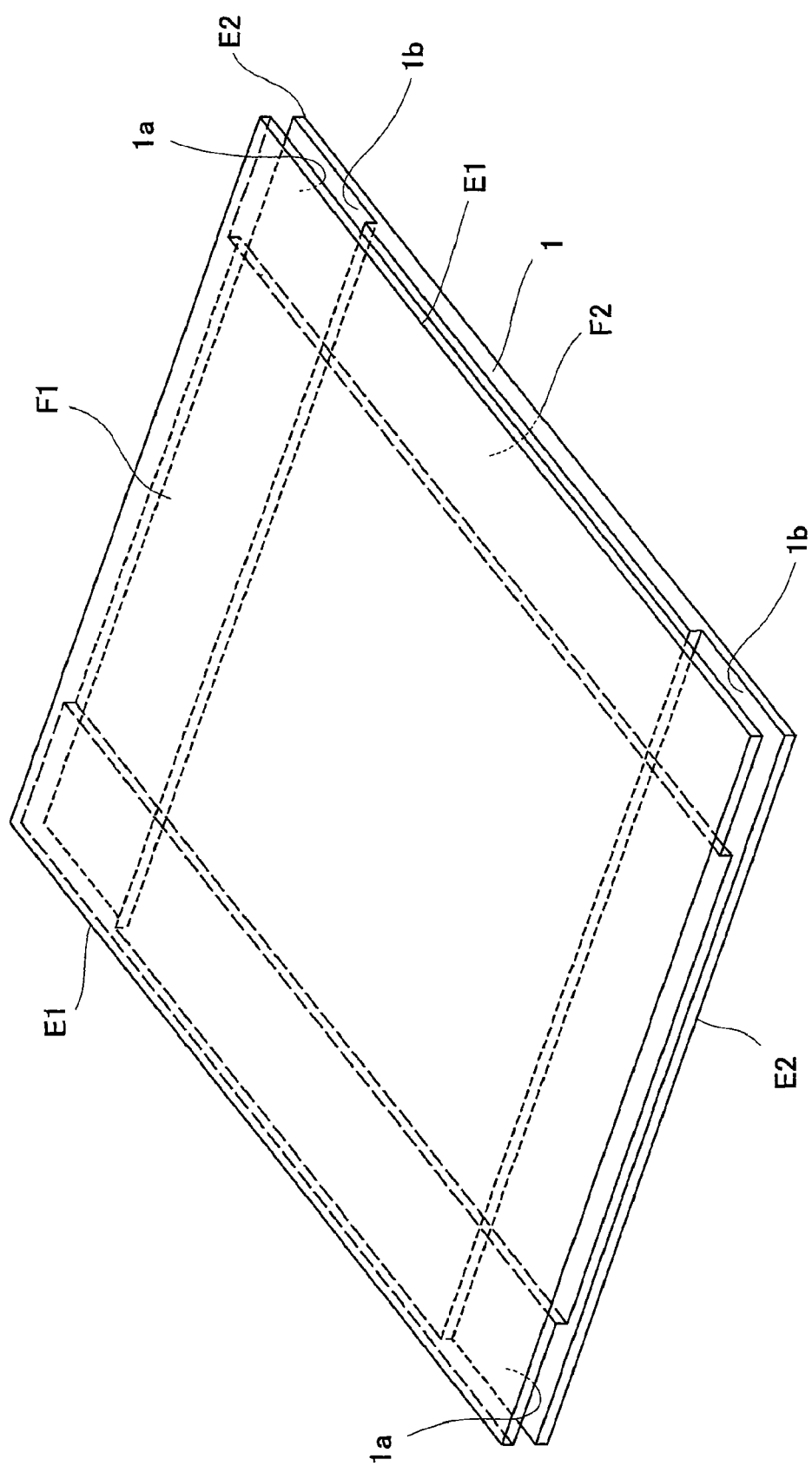
FIG. 2 is a perspective view schematically illustrating a general configuration of a polymer electrolyte membrane in the unit cell of the polymer electrolyte fuel cell shown in FIG. 1.
Figure 3:
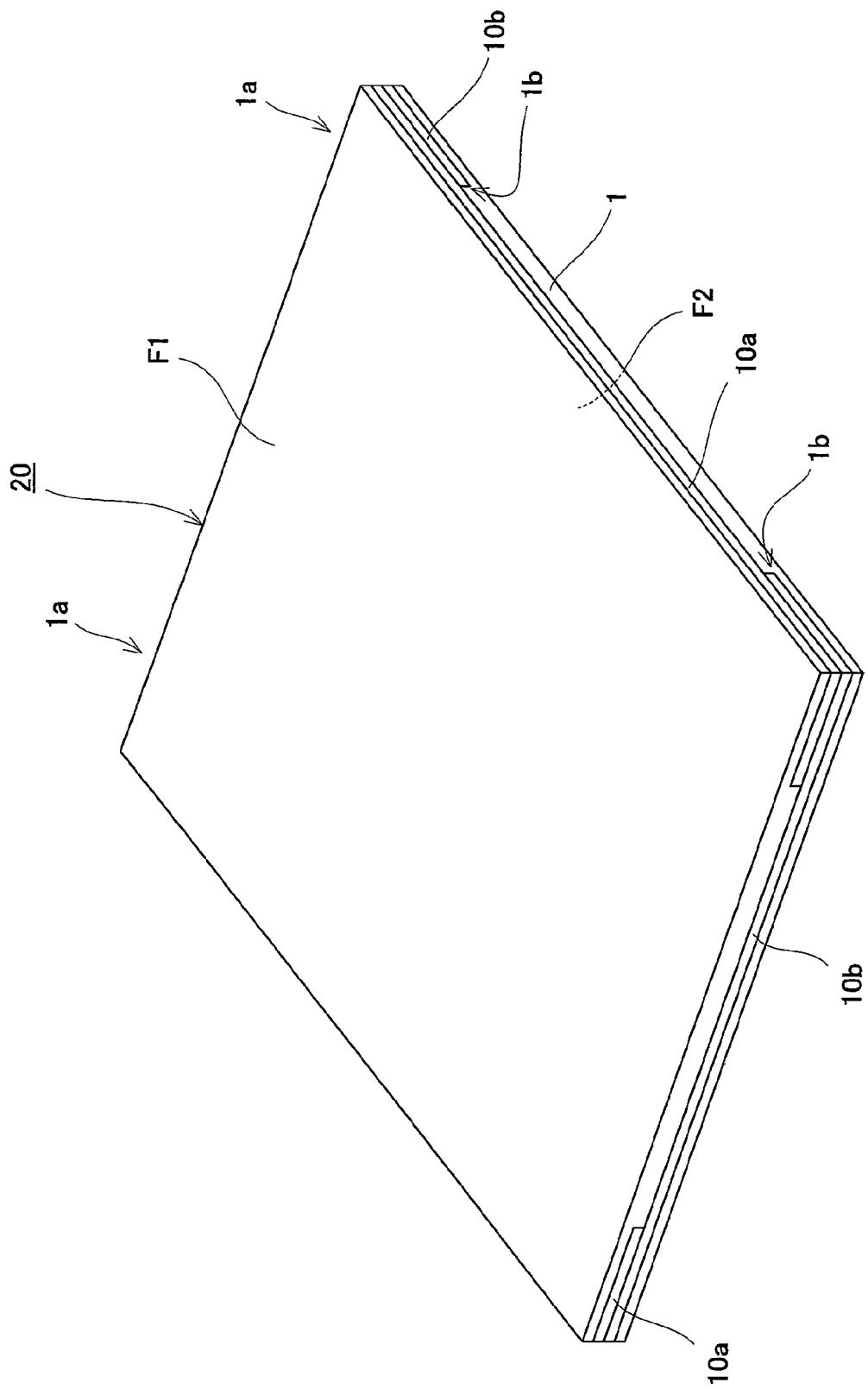
FIG. 3 is a perspective view schematically illustrating a general configuration of a membrane membrane-reinforcement-member assembly in a state where membrane reinforcement members are arranged in the polymer electrolyte membrane shown in FIG. 2.

FIG. 2 is a perspective view schematically illustrating a general configuration of the polymer electrolyte membrane 1 in the cell 100a of the PEFC shown in FIG. 1. FIG. 3 is a perspective view schematically illustrating a general configuration of the membrane membrane-reinforcement-member assembly 20 in a state where the first and second membrane reinforcement members 10a, 10b are arranged in the polymer electrolyte membrane 1 shown in FIG. 2.

As illustrated in FIG. 2, the polymer electrolyte membrane 1 is substantially quadrilateral (rectangular in this embodiment) in shape when viewed from a main surface F1 side. Formed in the peripheral portion of the polymer electrolyte membrane 1 are a pair of first cavity portions 1a and a pair of second cavity portions 1b. More specifically, the pair of first cavity portions 1a each having a strip-like shape are formed so as to extend along the entire length of an opposed pair of sides E1 of the main surface F1 of the polymer electrolyte membrane 1, being a specified distance away from the main surface F1 in a thickness direction of the polymer electrolyte membrane 1. The pair of second cavity portions 1b each having a strip-like shape are formed so as to extend along the entire length of an opposed pair of sides E2 of a main surface F2 of the polymer electrolyte membrane 1, being a specified distance away from the main surface F2 in the thickness direction of the polymer electrolyte membrane 1. In this embodiment, as illustrated in FIG. 2, the pair of first cavity portions 1a are closer to the main surface F1 than the pair of second cavity portions 1b.

As illustrated in FIG. 3, first membrane reinforcement members 10a each having a film shape and the same strip-like shape as of the first cavity portions 1a are just fit in the first cavity portions 1a, respectively, of the polymer electrolyte membrane 1. In other words, the first reinforcement members 10a are embedded in the polymer electrolyte membrane 1 with their main surfaces being unexposed. Second membrane reinforcement members 10b each having a film shape and the same strip-like shape as of the second cavity portions 1b are just fit in the second cavity portions 1b, respectively, of the polymer electrolyte membrane 1. That is, the second reinforcement members 10b are embedded in the polymer electrolyte membrane 1 with their main surfaces being unexposed, similarly to the first reinforcement members 10a.

As illustrated in FIG. 3, the pair of first membrane reinforcement members 10a and the pair of second membrane reinforcement members 10b are arranged in a state where they extend along the four sides, respectively, of the polymer electrolyte membrane 1 when viewed as a whole and they overlap each other in the four corners of the polymer electrolyte membrane 1 (this state is hereinafter referred to as "parallelogrammatic arrangement state" according to need). More concretely, the pair of first membrane reinforcement members 10a and the pair of second membrane reinforcement members 10b are arranged with their main surfaces being in contact with each other in the four corners of the polymer electrolyte membrane 1. In addition, the pair of first membrane reinforcement members 10a are so embedded in the polymer electrolyte membrane 1 that a first portion of the main surface F1 and a second portion of the main surface F1 are substantially flush, the first portion being opposite to the pair of first membrane reinforcement members 10a whereas the second portion corresponds to the area located between the pair of first membrane reinforcement members 10a. The pair of second membrane reinforcement members 10b are so embedded in the polymer electrolyte membrane 1 that a first portion of the main surface F2 and a second portion of the main surface F1 are substantially flush, the first portion being opposite to the pair of second membrane reinforcement members 10b whereas the second portion corresponds to the area located between the pair of second membrane reinforcement members 10b. That is, in the membrane membrane-reinforcement-member assembly 20, each of the man surfaces F1 and F2 is flat.

Although the thickness and width of the first and second membrane reinforcement members 10a, 10b, which are fitted in the first and second cavity portions 1a, 1b respectively, are not particularly specified as long as the effects of the invention can be obtained, it is desirable in view of more reliable achievement of the effects of the invention to make the thickness and width of the first membrane reinforcement members 10a equal to those of the second membrane reinforcement members 10b respectively.

Next, the constituent parts of the membrane membrane-reinforcement-member assembly 20 will be explained.

The polymer electrolyte membrane 1 has proton conductivity. Preferably, the polymer electrolyte membrane 1 has, for instance, a sulfonic acid group, carboxylic acid group, phosphonic acid group, or sulfonimide group as a cation-exchange group. It is more preferable in view of the attainment of proper proton conductivity that the polymer electrolyte membrane 1 has a sulfonic acid group.

Desirable examples of the resin having a sulfonic acid group that constitutes the polymer electrolyte membrane 1 include dry resins having an ion exchange capacity of 0.5 to 1.5 meq/g. The reason for this is that where the ion exchange capacity of the dry resin that constitutes the polymer electrolyte membrane 1 is 0.5 meq/g or more, the increase in the resistance value of the polymer electrolyte membrane 1 during power generation can be satisfactorily reduced. In addition, where the ion exchange capacity of the dry resin that constitutes the polymer electrolyte membrane 1 is no more than 1.5 meq/g, the polymer electrolyte membrane 1 does not increase in its moisture content and is therefore unlikely to swell, so that clogging of the fine pores of the catalyst layers 2 (described later) can be prevented. It is more preferable from the foregoing viewpoint that the ion exchange capacity of the dry resin that constitutes the polymer electrolyte membrane 1 be 0.8 to 1.2 meq/g.

Preferred examples of the polymer electrolyte membrane 1 include copolymers that have a polymerized unit derived from a perfluorovinyl compound represented by Chemical Formula (1) ("m" designates an integer number within the range of from 0 to 3, "n" designates an integer number within the range of from 1 to 12, "p" designates 0 or 1 and "X" designates a fluorine atom or a trifluoromethyl group) and a polymerized unit from tetrafluoroethylene.

$$CF_2=CF-(OCF_2CFX)_m-O_p-(CF_2)_n-SO_3H \qquad (1)$$

Preferred examples of the fluorovinyl compound include the compounds represented by Chemical Formulas (2) to (4). It should be noted that, in the following chemical formulas, "q" designates an integer number within the range of from 1 to 8, "r" designates an integer number within the range of from 1 to 8, and "t" designates an integer number within the range of from 1 to 3.

$$CF_2=CFO(CF_2)_q-SO_3H \qquad (2)$$

$$CF_2=CFOCF_2CF(CF_3)O(CF_2)_r-SO_3H \qquad (3)$$

$$CF_2=CF(OCF_2CF(CF_3))_tO(CF_2)_2-SO_3H \qquad (4)$$

Preferred examples of the constituent material of the first and second membrane reinforcement members 10a, 10b include synthetic resins having flexibility and pliability so that they can be rolled up during production and restored to their original shapes when unrolled.

In the light of durability, the synthetic resins applicable as the constituent material of the first and second membrane reinforcement members 10a, 10b are preferably composed of at least one or more resins selected from the group consisting of polyethylene naphthalate; polytetrafluoroethylene; polyethylene terephthalate; fluoroethylene propylene copolymers; tetrafluoroethylene-perfluoroalkoxyethylene copolymers; polyethylene; polypropylene; polyether amide; polyetherimide; polyether ether ketone; polyethersulfone; polyphenylene sulfide; polyarylate; polysulfide; polyimide; and polyimide-amide.

Next, the configuration of the membrane catalyst-layer assembly 30 will be described.

Figure 4A:
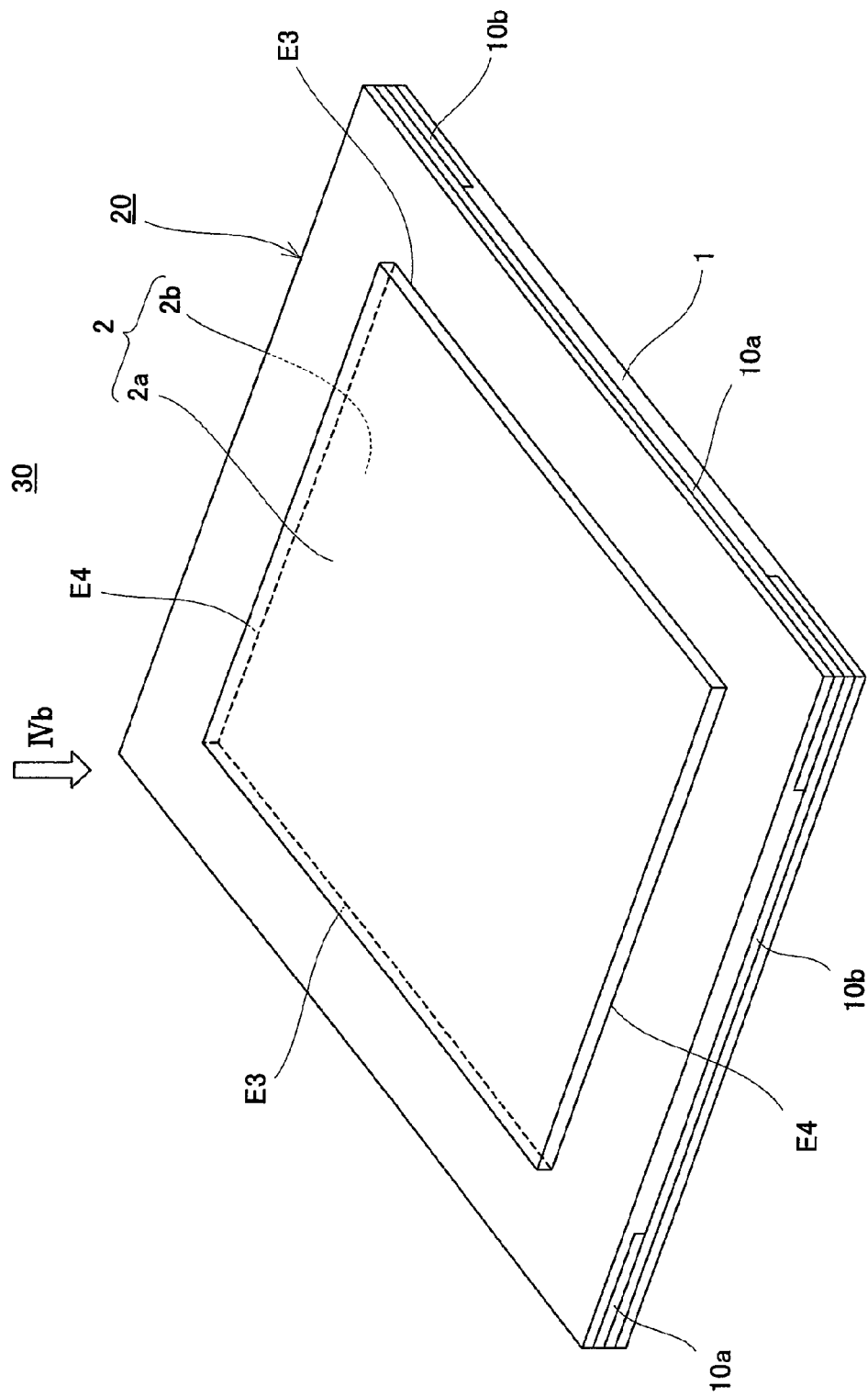
FIG. 4(a) is a perspective view schematically illustrating a general configuration of a membrane catalyst-layer assembly in the unit cell of the polymer electrolyte fuel cell shown in FIG. 1.
Figure 4B:
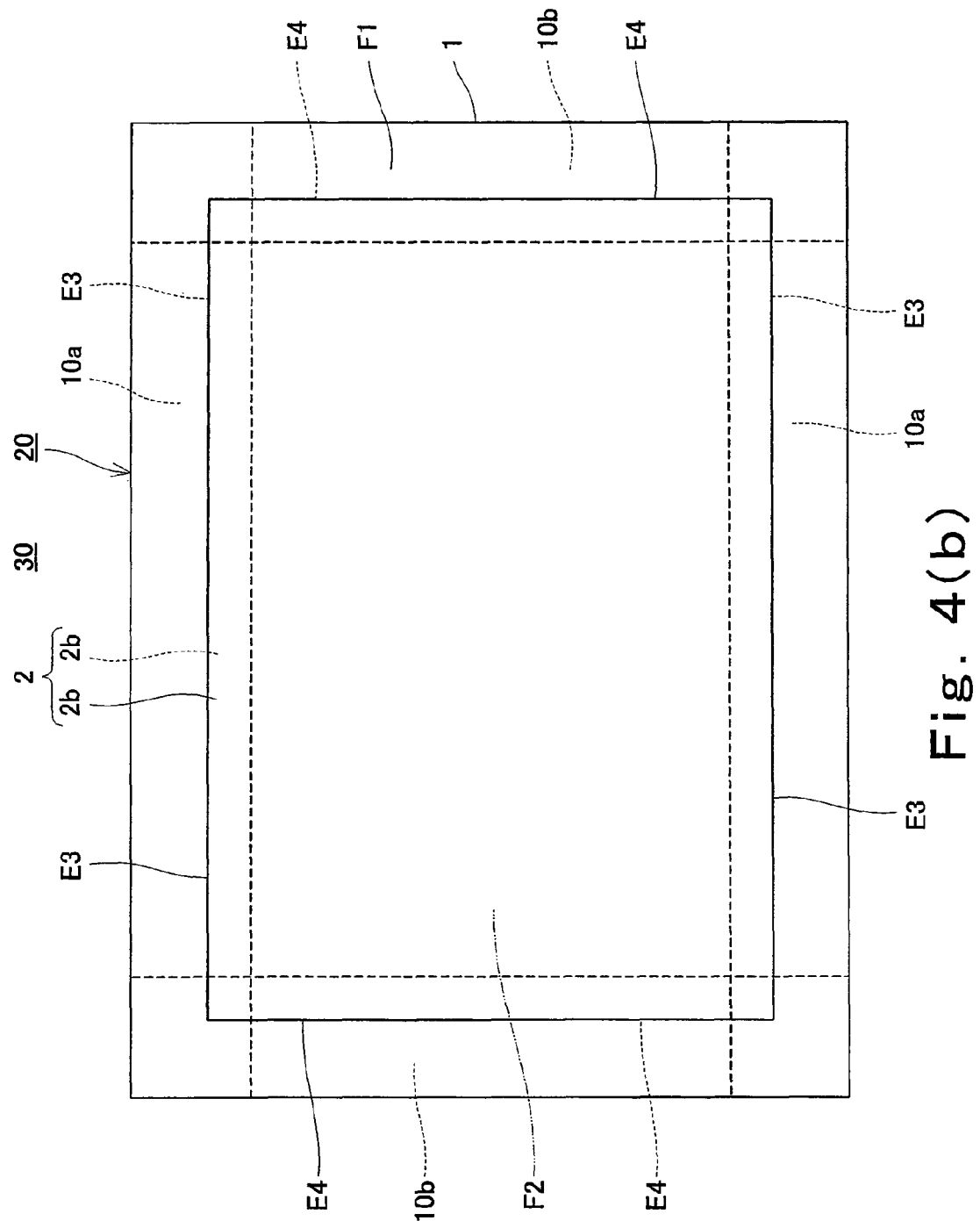
FIG. 4(b) is a schematic view when viewed from the direction of arrow IVb indicated in FIG. 4(a).

FIG. 4(a) is a perspective view schematically illustrating a general configuration of the membrane catalyst-layer assembly 30 in the unit cell 100a of the PEFC shown in FIG. 1. FIG. 4(b) is a schematic view when viewed from the direction of arrow IVb indicated in FIG. 4(a).

As illustrated in FIG. 4(a), the membrane catalyst-layer assembly 30 has the membrane membrane-reinforcement-member assembly 20 and the catalyst layers 2 (anode catalyst layer 2a and cathode catalyst layer 2b). The anode catalyst layer 2a is placed on the main surface F1 side of the polymer electrolyte membrane 1 so as to extend from a part of one of the first membrane reinforcement members 10a to a part of the other first membrane reinforcement member 10a. Although not seen from FIG. 4(a), the cathode catalyst layer 2b is placed on the main surface F2 side of the polymer electrolyte membrane 1 so as to extend from a part of one of the second membrane reinforcement members 10b to a part of the other second membrane reinforcement member 10b. As illustrated in FIG. 4(b), the anode catalyst layer 2a and cathode catalyst layer 2b of this embodiment have a rectangular shape similar to the polymer electrolyte membrane 1. When viewed from the thickness direction of the polymer electrolyte membrane 1 (i.e., the direction of arrow IVb indicated in FIG. 4(a)), the entire peripheries of the anode and cathode catalyst layers overlap the first membrane reinforcement members 10a and the second membrane reinforcement members 10b.

Of the four sides of the main surface of the anode catalyst layer 2a, an opposed pair of sides E3 are accordingly in contact with the portions of the main surface F1 of the polymer electrolyte membrane 1 reinforced by the first membrane reinforcement members 10a, so that the polymer electrolyte membrane 1 will not be damaged. Similarly, of the four sides of the main surface of the cathode catalyst layer 2b, an opposed pair of sides E4 are accordingly in contact with the portions of the main surface F2 of the polymer electrolyte membrane 1 reinforced by the second membrane reinforcement members 10b, so that the polymer electrolyte membrane 1 will not be damaged.

An opposed pair of sides E4 of the four sides of the main surface of the anode catalyst layer 2a are in direct contact with the main surface F1 of the polymer electrolyte membrane 1, and therefore it may happen that the polymer electrolyte membrane 1 is damaged in this area. However, a cross-leak of the reaction gases does not occur even in such a case, because the main surface F2 side of the polymer electrolyte membrane 1 in this area is provided with the second membrane reinforcement members 10b. Similarly, an opposed pair of sides E3 of the four sides among the main surface of the cathode catalyst layer 2b are in direct contact with the main surface F2 of the polymer electrolyte membrane 1, and therefore it may happen that the polymer electrolyte membrane 1 is damaged in this area. However, a cross-leak of the reaction gases does not occur even in such a case, because the main surface F1 side of the polymer electrolyte membrane 1 in this area is provided with the first membrane reinforcement members 10a.

The catalyst layers 2 are not limited to particular configurations but may be constructed similarly to the catalyst layers of the gas diffusion electrodes of known polymer electrolyte fuel cells, so long as the effects of the invention can be achieved. For instance, the catalyst layers 2 may be configured to include electrically-conductive carbon particles (powder) carrying an electrode catalyst and polymer electrolyte having cation (hydrogen ion) conductivity. Alternatively, it may further contain a water-repellent material such as polytetrafluoroethylene. In addition, the anode catalyst layer 2a and the cathode catalyst layer 2b may have the same configuration or different configurations.

In addition, the catalyst layers 2 may be formed by a known production method for the catalyst layers of the gas diffusion electrodes of a polymer electrolyte fuel cell. For example, a liquid (ink for catalyst layer formation) containing at least the constituent material (e.g., the above-mentioned electrically-conductive carbon particles carrying an electrode catalyst and polymer electrolyte) of the catalyst layers 2 and a dispersion medium is prepared and the catalyst layers 2 may be formed from this liquid.

As the polymer electrolyte, a material that is the same or different in kind as or from the above-described material of the polymer electrolyte membrane 1 may be used. As the electrode catalyst, metal particles may be employed. The metal particles are not limited to particular kinds but various types of metals may be used. However, it is preferable in the light of electroreactivity to use at least one or more metals selected from the metal group consisting of platinum, gold, silver, ruthenium, rhodium, palladium, osmium, iridium, chrome, iron, titanium, manganese, cobalt, nickel, molybdenum, tungsten, aluminum, silicon, zinc and tin. Above all, use of platinum or an alloy of platinum and at least one metal selected from the above metal group is desirable. For instance, use of an alloy of platinum and ruthenium is particularly preferable because it stabilizes the activity of the catalyst in the anode catalyst layer 2a.

Preferably, the metal particles used as the electrode catalyst have an average particle diameter of 1 to 5 nm. The reason for this is as follows. Electrode catalysts having an average particle diameter of 1 nm or more are easy to industrially prepare and therefore desirable. In addition, use of an electrode catalyst having an average particle diameter of 5 nm or less makes it easy to ensure sufficient activity per mass of an electrode catalyst, which leads to a reduction in the cost of the polymer electrolyte fuel cell and is therefore desirable.

Preferably, the above electrically-conductive carbon particles have a specific surface area of 50 to 1500 $m^2/g$. The reason for this is that where the specific surface area of the electrically-conductive carbon particles is 50 $m^2/g$ or more, the loading of the electrode catalyst can be easily increased so that the resultant catalyst layers 2 have more adequate output characteristics. In addition, if the specific surface area of the electrically-conductive carbon particles is 1500 $m^2/g$ or less, fine pores having good size can be more easily obtained and coating with the polymer electrolyte can be facilitated, so that the resultant catalyst layers 2 have more adequate output characteristics. From the viewpoint as just discussed, it is more preferable that the specific surface area of the electrically-conductive carbon particles be 200 to 900 $m^2/g$.

Preferably, the above electrically-conductive carbon particles have an average particle diameter of 0.1 to 1.0 µm. The reason for this is as follows. If the average particle diameter of the electrically-conductive carbon particles is 0.1 µm or more, the catalyst layers 2 can ensure more adequate gas diffusivity, which results in more reliable prevention of flooding. If the average particle diameter of the electrically-conductive carbon particles is no more than 1.0 µm, the coated condition of the electrode catalyst coated with polymer electrolyte can be more easily improved and therefore a sufficient area of the electrode catalyst can be coated with polymer electrolyte, which facilitates achievement of higher electrode performance.

Next, the configuration of the MEA (membrane electrode assembly) 5 will be described.

Figure 5A:
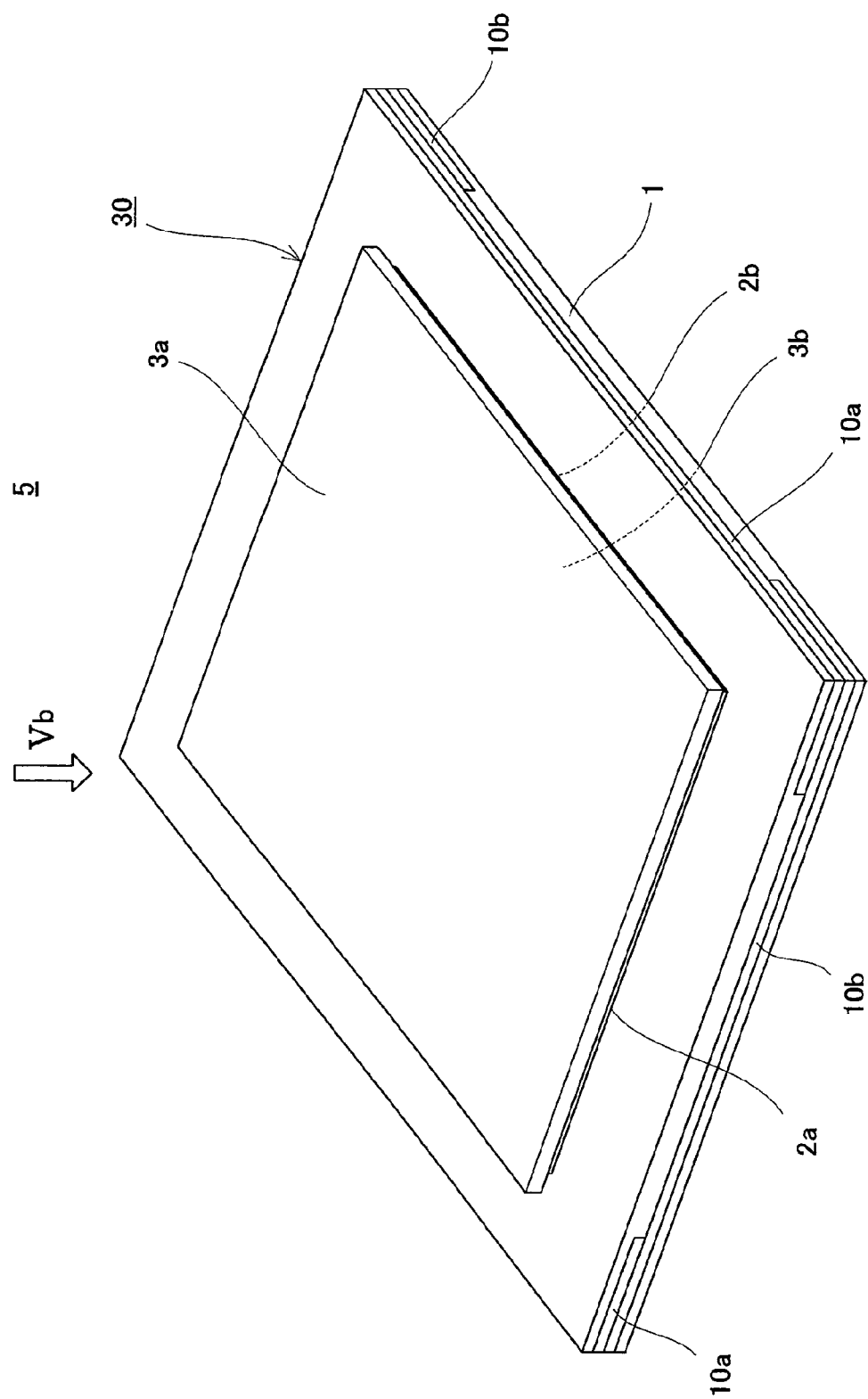
FIG. 5(a) is a perspective view schematically illustrating a general configuration of a membrane electrode assembly (MEA) in the unit cell of the polymer electrolyte fuel cell shown in FIG. 1.

FIG. 5(a) is a perspective view schematically illustrating a general configuration of a membrane electrode assembly (MEA) in the unit cell 100a of the PEFC shown in FIG. 1. FIG. 5(b) is a schematic view when viewed from the direction of arrow Vb indicated in FIG. 5(a).

As illustrated in FIGS. 5(a), (5b), in the MEA 5, an anode gas diffusion layer 3a is provided so as to cover the main surface of the anode catalyst layer 2a of the membrane catalyst-layer assembly 30. Likewise, in the MEA 5, a cathode gas diffusion layer 3b is so disposed as to cover the main surface of the cathode catalyst layer 2b. Herein, the anode catalyst layer 2a and the anode gas diffusion layer 3a constitute the anode 4a. The cathode catalyst layer 2b and the cathode gas diffusion layer 3b constitute the cathode 4b. The anode 4a together with the cathode 4b is referred to as electrodes 4. In this embodiment, although the main surfaces of the anode gas diffusion layer 3a and the cathode gas diffusion layer 3b are rectangular in shape, being similar to and slightly larger than the main surfaces of the anode catalyst layer 2a and the cathode catalyst layer 2b respectively, the anode and cathode gas diffusion layers 3a, 3b are not necessarily limited to this, but may be the same in shape as the anode and cathode catalyst layers.

The anode and cathode gas diffusion layers 3a, 3b (hereinafter referred to as "gas diffusion layers 3") are not limited to any particular configurations but may have the same configuration as of the gas diffusion layers of the gas diffusion electrodes of known polymer electrolyte fuel cells as long as the effects of the invention can be obtained. Additionally, the gas diffusion layers 3 may have the same configuration or different configurations.

As the gas diffusion layers 3, an electrically-conductive substrate of porous structure may be used in order to obtain gas permeability, which substrate is prepared from, for example, a carbon fine powder having high surface area, pore-forming material, carbon paper, carbon cloth or the like. In order to obtain adequate drainage properties, a water-repellent polymer compound or the like, representative examples of which include fluorocarbon resin, may be dispersed in the gas diffusion layers 3. To achieve adequate electron conductivity, the gas diffusion layers 3 may be formed from an electron-conductive material such as carbon fiber, metal fiber or carbon fine powder.

Further, a water-repellent carbon layer constituted by a water-repellent polymer compound and carbon powder may be formed between the anode gas diffusion layer 3a and the anode catalyst layer 2a and between the cathode gas diffusion layer 3b and the cathode catalyst layer 2b. This makes it possible to more easily and reliably perform control over the water in the MEA 5 (i.e., keeping of the water required for maintaining the good properties of the MEA 5 and quick discharge of unnecessary water).

Next, the parts of the configuration of the cell 100a, which have been skipped in the above description, will be explained.

As shown in FIG. 1, a pair of gaskets 11 made of fluorocarbon rubber are disposed around the anode 4a and cathode 4b, respectively, of the MEA 5 so as to sandwich the polymer electrolyte membrane 1. This prevents leakage of the fuel gas, air and oxidizing gas to the outside of the cell 100a and mixing of these gases within the cell 100a. Although not shown in FIG. 1, the peripheral portions of the polymer electrolyte membrane 1, the first and second membrane reinforcement members 10a, 10b and the gaskets 11 are properly provided with manifold holes such as a fuel gas supply manifold hole composed of a through hole extending in a thickness direction.

The electrically-conductive anode separator 6a and cathode separator 6b are disposed so as to sandwich the MEA 5 and the gaskets 11. These anode separator 6a and cathode separator 6b are made of a resin-impregnated graphite sheet prepared by impregnating phenol resin into a graphite sheet and curing it. The anode separator 6a and cathode separator 6b may be made of a metallic material such as SUS. With the anode separator 6a and the cathode separator 6b, the MEA 5 is mechanically fixed and the MEAs 5 of the adjacent cells are electrically serially connected.

Formed on the inner surface (that is in contact with the MEA 5) of the anode separator 6a is a groove-like fuel gas flow passage 7 for allowing the flow of the fuel gas, which flow passage 7 assumes, for instance, a serpentine shape. Formed on the outer surface (that is not in contact with the MEA 5) of the anode separator 6a is a groove-like heating medium flow passage 9 for allowing the flow of a heating medium, which flow passage 9 assumes, for instance, a serpentine shape. Although not shown in FIG. 1, the peripheral portion of the anode separator 6a is provided with manifold holes such as the fuel gas supply manifold hole composed of a through hole extending in a thickness direction.

Formed on the inner surface (that is in contact with the MEA 5) of the cathode separator 6b is a groove-like oxidizing gas flow passage 8 for allowing the flow of the oxidizing gas, which flow passage 8 assumes, for instance, a serpentine shape. Like the anode separator 6a, the outer surface (that is not in contact with the MEA 5) of the cathode separator 6b is provided with the groove-like heating medium flow passage 9 for allowing the flow of the heating medium, which flow passage 9 is formed, for instance, in a serpentine shape. Although not shown in FIG. 1, the peripheral portion of the cathode separator 6b is provided with manifold holes such as the fuel gas supply manifold hole composed of a through hole extending in a thickness direction, similarly to the anode separator 6a.

Although the fuel gas flow passage 7, the oxidizing gas flow passage 8 and the heating medium flow passage 9 are serpentiform in this embodiment, the shape of these flow passages are not limited to this. These flow passages may take any shapes as long as they are configured to allow the reaction gases and the heating medium to flow in the substantially entire region of the main surfaces of the anode and cathode separators 6a, 6b.

The cells 100a thus formed are stacked in their thickness direction, thereby forming a stack of cells 100a. When stacking the cells 100a, the manifold holes such as the fuel gas supply manifold holes provided in the anode separators 6a, the cathode separators 6b and the gaskets 11 are coupled together in the thickness direction, so that the manifolds such as the fuel gas supply manifold are respectively formed. End plates having a power collector plate and an insulating plate respectively are disposed at the ends, respectively, of the stack of cells 100a and secured by specified clamps to form the stack (PEFC).

Next, an MEA production method for the PEFC of this embodiment will be described. It should be noted that the production of cells and a stack (PEFC) using the MEAs produced by the process described below is not limited to any particular methods but known PEFC production techniques can be employed. Therefore, a detailed description thereof is omitted herein.

First, a production method of the membrane catalyst-layer assembly 30 will be described.

Figure 6:
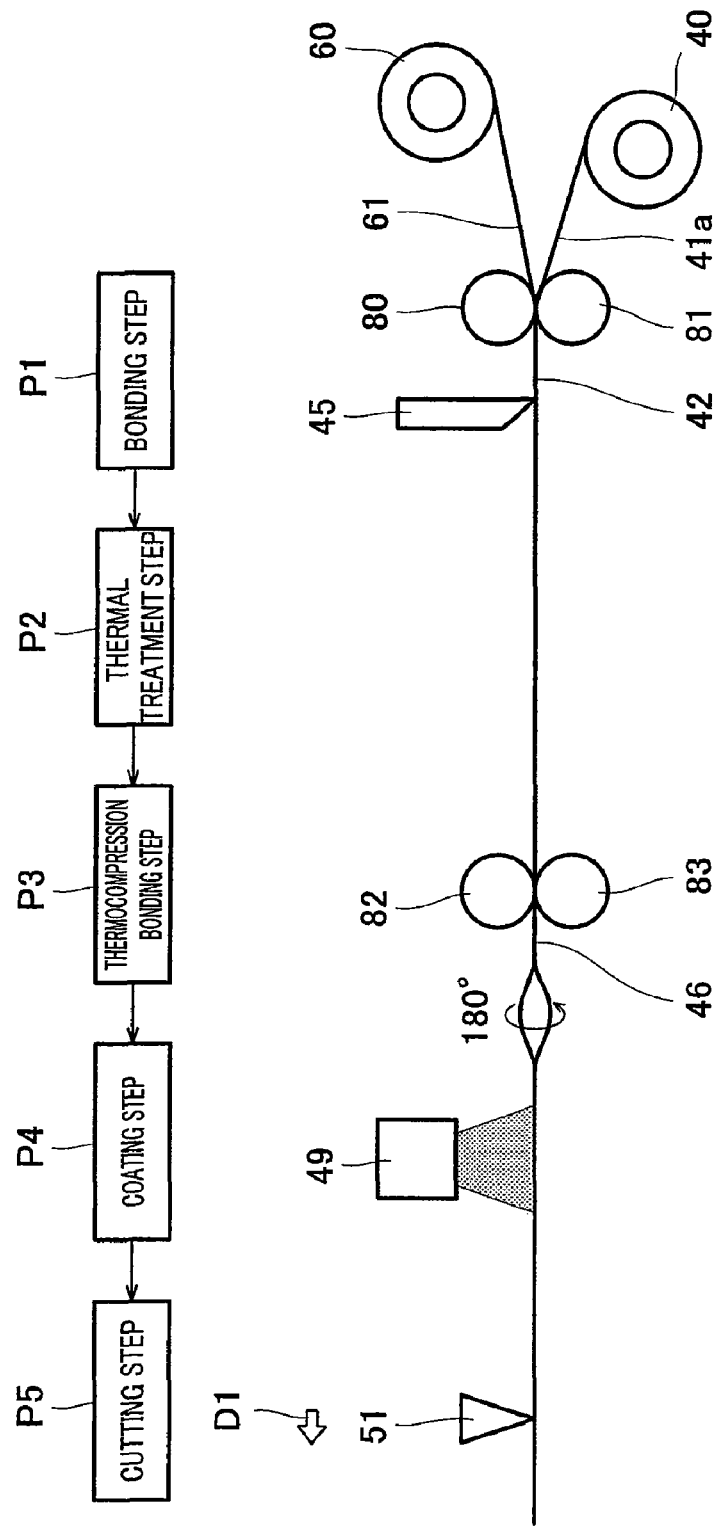
FIG. 6 is a schematic view generally illustrating a part of a series of steps and a production line for producing a membrane catalyst-layer assembly.

FIG. 6 is a schematic view generally illustrating a part of a series of steps (processing area) and a production line for producing the membrane catalyst-layer assembly.

As illustrated in FIG. 6, the membrane catalyst-layer assembly 30 shown in FIG. 4(a) is produced by performing a bonding step P1 for bonding a polymer electrolyte membrane tape and a membrane reinforcement member tape to each other to thereby form a membrane membrane-reinforcement-member assembly tape; a thermal treatment step P2 for drying the membrane membrane-reinforcement-member assembly tape; a thermocompression bonding step P3 for thermally compression bonding the membrane membrane-reinforcement-member assembly tape; a coating step P4 for coating the membrane membrane-reinforcement-member assembly tape with a catalyst layer; and a cutting step P5 for cutting the membrane catalyst-layer assembly tape into a specified length. With this process, the MEA 5 shown in FIG. 1 can be easily mass-produced at low cost.

First, the bonding step P1 will be concretely explained.

Figure 7:
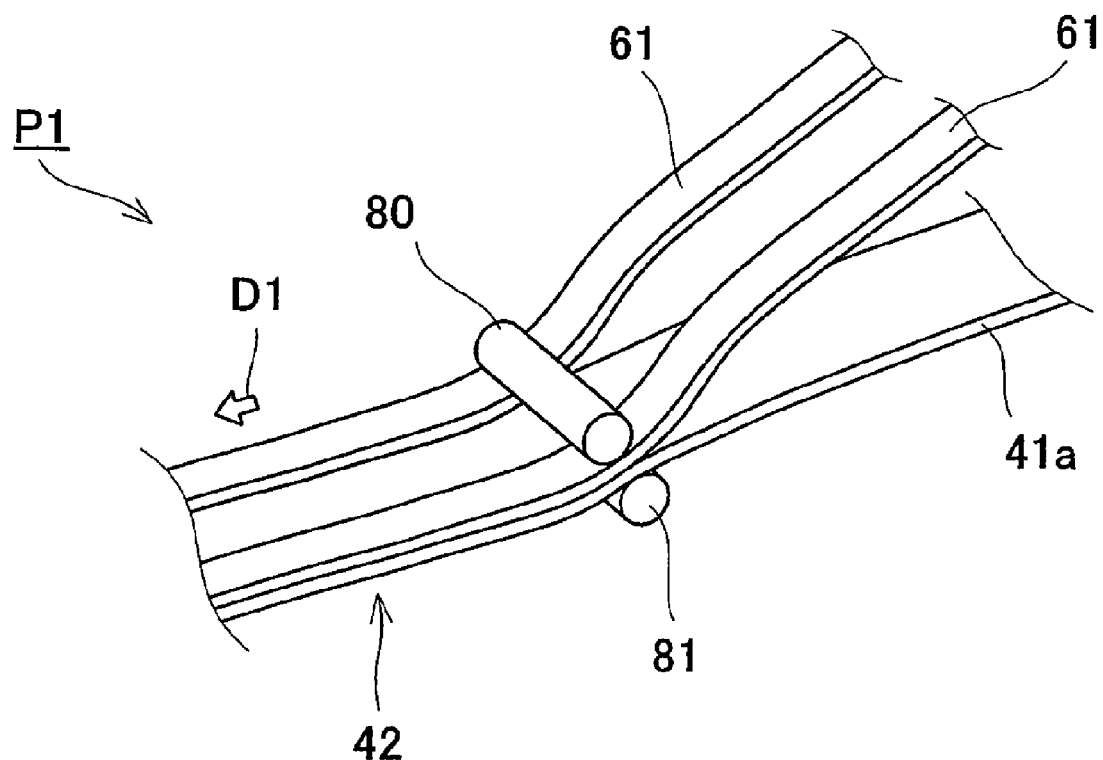
FIG. 7 is a schematic view depicted for the purpose of describing a bonding step P1 in a production process of the membrane catalyst-layer assembly.
Figure 8:
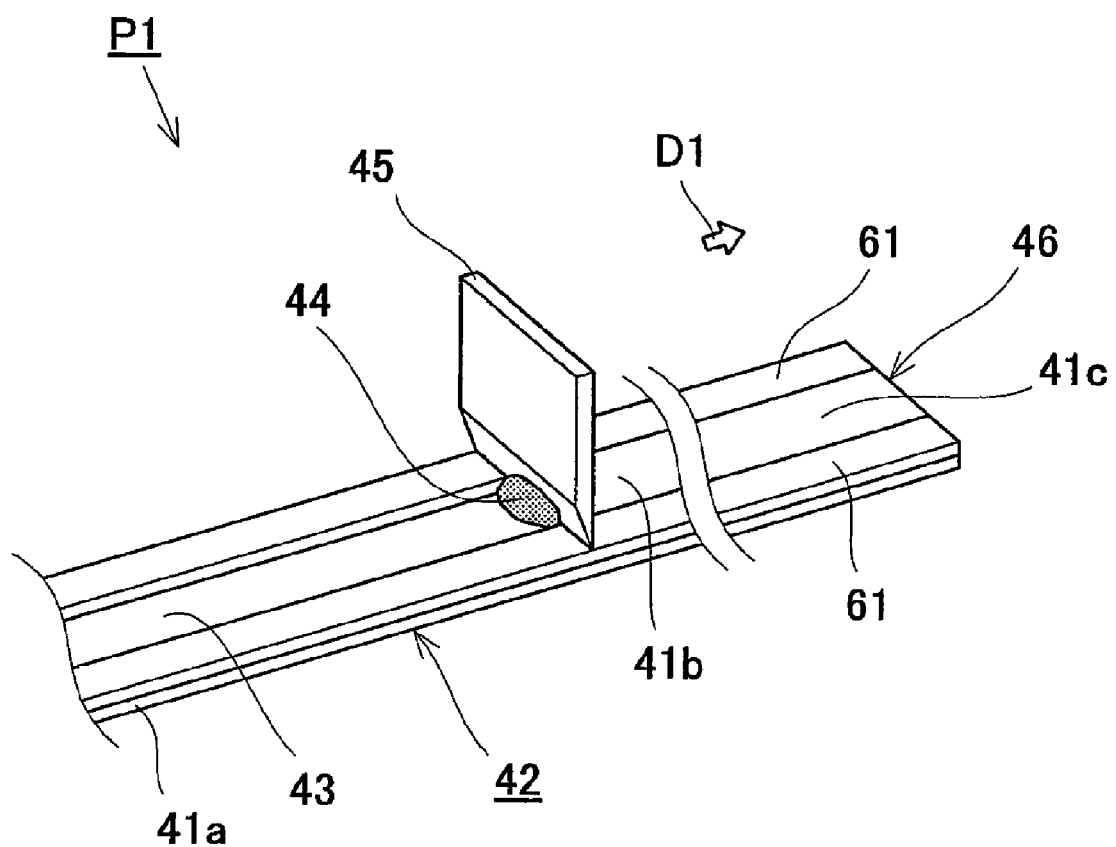
FIG. 8 is a schematic view depicted for the purpose of describing the bonding step P1 in the production process of the membrane catalyst-layer assembly.

FIGS. 7 and 8 are schematic views depicted in order to describe the bonding step P1 in the production process of the membrane catalyst-layer assembly.

First, a polymer electrolyte membrane roll 40 into which a long polymer electrolyte membrane tape 41a (that becomes the polymer electrolyte membrane 1 shown in FIG. 1 after cutting) is rolled up and membrane reinforcement member rolls 60 into which membrane reinforcement member tapes 61 (that become the membrane reinforcement members 10a, 10b shown in FIG. 1 after cutting) are rolled up respectively are produced by use of a known thin film production technique.

Then, as shown in FIG. 7, the polymer electrolyte membrane tape 41a is paid out from the polymer electrolyte membrane roll 40 whereas the pair of membrane reinforcement member tapes 61 are paid out from the pair of membrane reinforcement member rolls 60, and these tapes are guided into the thermocompression bonding machine (not shown in FIG. 7) having a pair of rollers 80, 81. At that time, relative positioning of the polymer electrolyte membrane tape 41a and the pair of membrane reinforcement member tapes 61 is carried out such that the pair of membrane reinforcement member tapes 61 are placed at both sides of the polymer electrolyte membrane tape 41a. Then, in the thermocompression bonding machine, the polymer electrolyte membrane tape 41a and the pair of membrane reinforcement member tapes 61 are bonded together while passing through the space between the preheated rollers 80, 81 in a pay-out direction D1. In this way, a long membrane membrane-reinforcement-member assembly tape 42 is formed.

Before brought into contact with the polymer electrolyte membrane tape 41a, the pair of membrane reinforcement member tapes 61 may be subjected to pretreatment where their surfaces (that serve as contact surfaces) are coated with an adhesive agent. In this case, the compression process may be performed with the rollers 80, 81 preheated as mentioned above or alternatively, only the compression process may be performed without preheating the rollers 80. 81. In this case, it is preferable to use the adhesive agent that does not deteriorate the discharge characteristic of the cell 100a. Examples of the adhesive agent include liquids in which a polymer electrolyte material (such as the materials listed earlier as examples of the constituent material of the polymer electrolyte membrane 1) is contained in a dispersion medium or a solvent, the polymer electrolyte material being of the same type as of the polymer electrolyte membrane tape 41a or different type from the same (in the latter case, the polymer electrolyte material has affinity so that it can be thoroughly integrated with the polymer electrolyte membrane tape 41a).

Thereafter, a cast membrane 41b of polymer electrolyte is formed in a groove-like concave portion 43 by use of a blade 45 as illustrated in FIG. 8, the concave portion 43 being defined by the polymer electrolyte membrane tape 41a and membrane reinforcement member tapes 61 of the membrane membrane-reinforcement-member assembly tape 42. More concretely, polymer electrolyte is brought into a liquid state by water substitution, alcohol dispersion or the like to thereby prepare a polyelectrolyte solution 44 having a proper degree of viscosity. After an adequate amount of the polyelectrolyte solution 44 is put on the concave portion 43, the lower end of the blade 45 is brought into contact with the upper surfaces (main surfaces) of the membrane reinforcement member tapes 61 of the membrane membrane-reinforcement-member assembly tape 42. Then, the membrane membrane-reinforcement-member assembly tape 42 is moved in the pay-out direction D1, thereby forming the polymer electrolyte cast membrane 41b between the lower end of the blade 45 and the concave portion 43.

Next, the thermal treatment step P2 will be concretely explained.

In the thermal treatment step P2, the liquid contained in the cast membrane 41b, which is the polymer electrolyte membrane formed in the bonding step P1, is removed by performing a thermal treatment with a proper means (e.g., a treatment in which the membrane membrane-reinforcement-member assembly tape 42 is allowed to pass through a drying furnace controlled to have a temperature at which the dispersing agent containing polymer electrolyte dispersed therein evaporates), so that the polymer electrolyte membrane tape 41c is formed on the main surface (the concave portion 43) of the polymer electrolyte membrane tape 41a. Herein, the surface of the polymer electrolyte membrane tape 41c is so formed as to be flash with the surfaces of the pair of membrane reinforcement member tapes 61 of the membrane membrane-reinforcement-member assembly tape 42.

Next, the thermocompression bonding step P3 will be concretely explained.

In the thermocompression bonding step P3, thermocompression bonding is carried out to completely integrate the polymer electrolyte membrane tape 41c formed in the thermal treatment step P2 with the polymer electrolyte membrane tape 41a. Concretely, the membrane membrane-reinforcement-member assembly tape 42 and the polymer electrolyte membrane tape 41c are allowed to pass through the thermocompression bonding machine (not shown in FIG. 6) having a pair of rollers 82, 83. Herein, the rollers 82, 83 are preheated to a temperature equal to or higher than the glass transition point (Tg) of the polymer electrolyte that constitutes the polymer electrolyte membrane tape 41a and the polymer electrolyte membrane tape 41c. Accordingly, the membrane membrane-reinforcement-member assembly tape 42 is bonded to and completely integrated with the polymer electrolyte membrane tape 41c and the polymer electrolyte membrane tape 41a is bonded to and completely integrated with the polymer electrolyte membrane tape 41c while they are passing through the space between the rollers 82, 83 of the thermocompression bonding machine in the pay-out direction D1, so that a long, membrane membrane-reinforcement-member assembly tape 46 is formed.

Alternatively, the membrane membrane-reinforcement-member assembly tape 46 may be formed in the following way.

Figure 9:
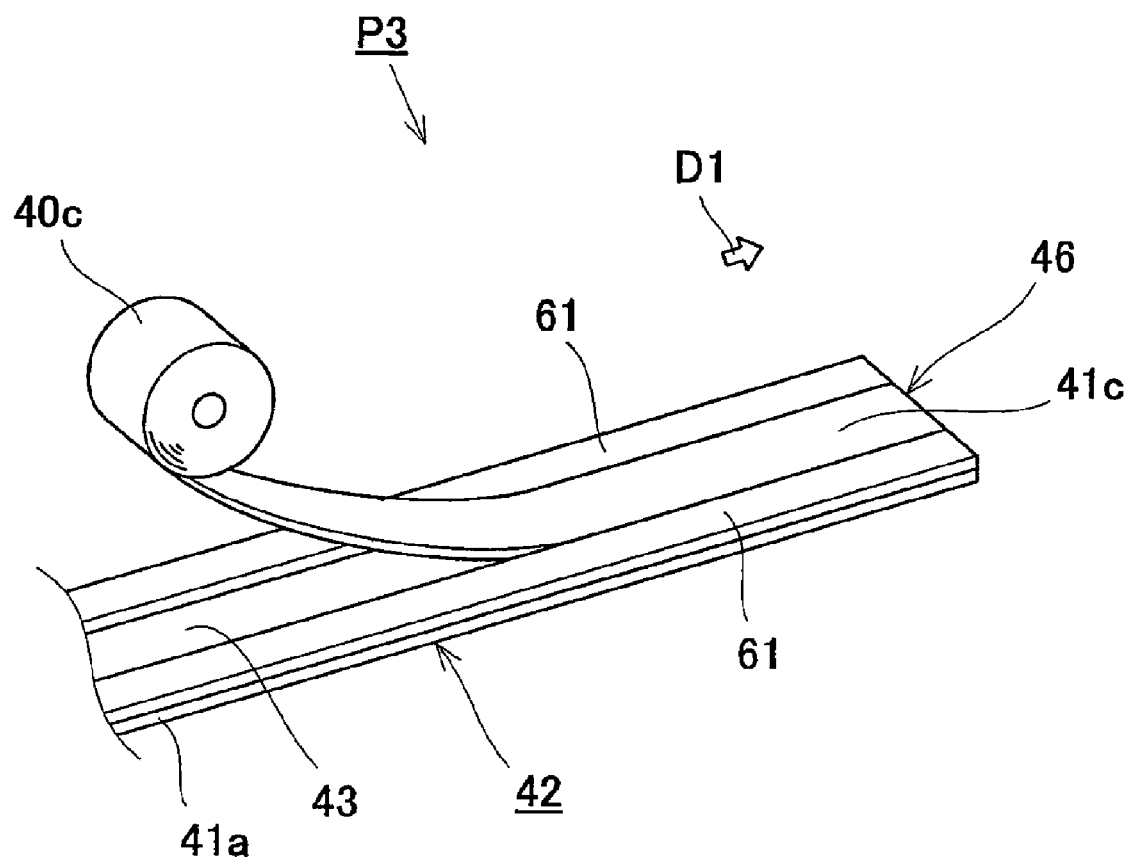
FIG. 9 is a schematic view depicted for the purpose of describing another production method for forming the membrane catalyst-layer assembly tape.

FIG. 9 is a schematic view illustrating another production method for forming the membrane membrane-reinforcement-member assembly tape.

As illustrated in FIG. 9, the polymer electrolyte membrane roll 40c into which the long polymer electrolyte membrane tape 41c is rolled up is produced with a known thin film production technique. At that time, the polymer electrolyte membrane tape 41c is formed so as to have the same width as of the concave portion 43 of the membrane membrane-reinforcement-member assembly tape 42.

Then, the polymer electrolyte membrane tape 41c is paid out from the polymer electrolyte membrane roll 40c and fitted in the concave portion 43 of the membrane membrane-reinforcement-member assembly tape 42, as shown in FIG. 9. Then, the membrane membrane-reinforcement-member assembly tape 42 and the polymer electrolyte membrane tape 41c are guided into the thermocompression bonding machine (not shown in FIG. 9). In the thermocompression bonding machine, the polymer electrolyte membrane tape 41a of the membrane membrane-reinforcement-member assembly tape 42 and the polymer electrolyte membrane tape 41c are bonded to and completely integrated with each other, thereby forming the long, membrane membrane-reinforcement-member assembly tape 46.

Another alternative method for forming the membrane membrane-reinforcement-member assembly tape 46 is as follows.

Figure 10:
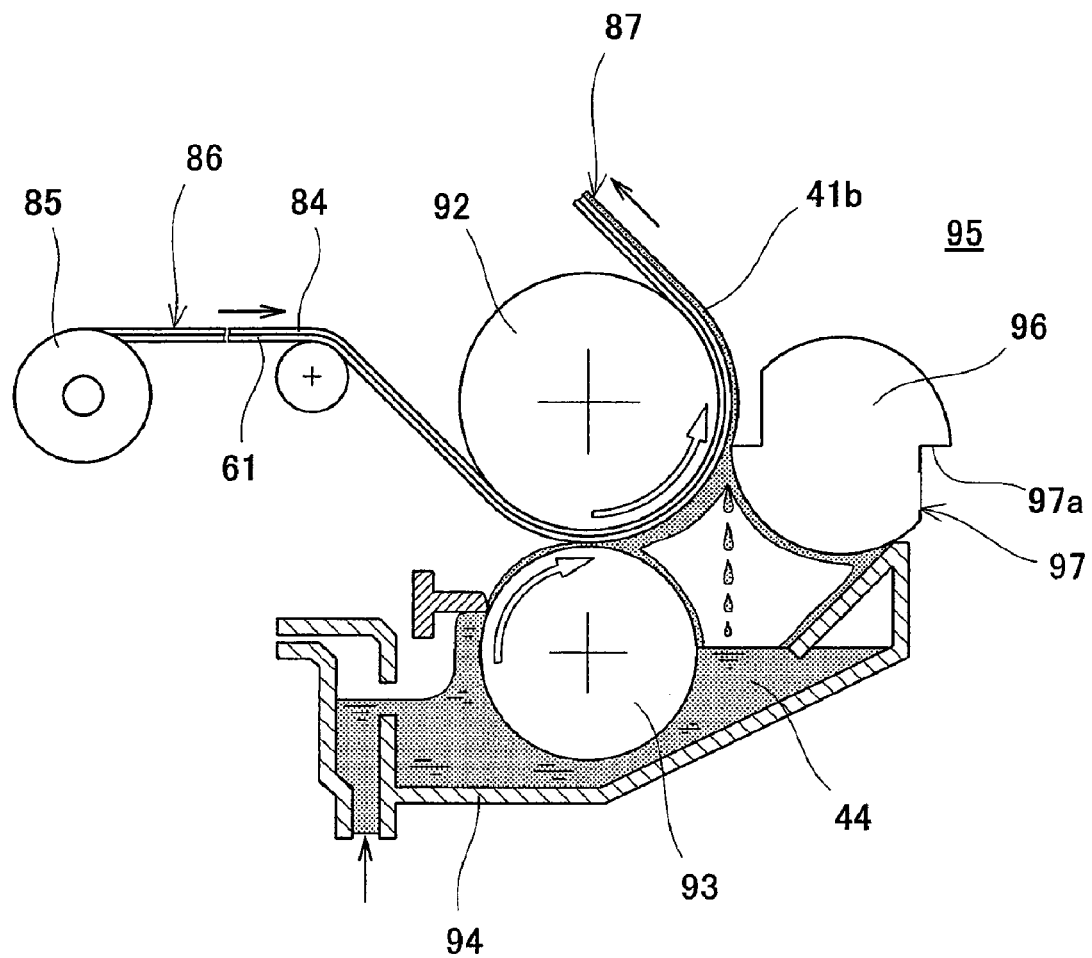
FIG. 10 is a schematic view illustrating another production method that uses a roll knife coater (comma coater) for forming a membrane membrane-reinforcement-member assembly sheet.
Figure 11:
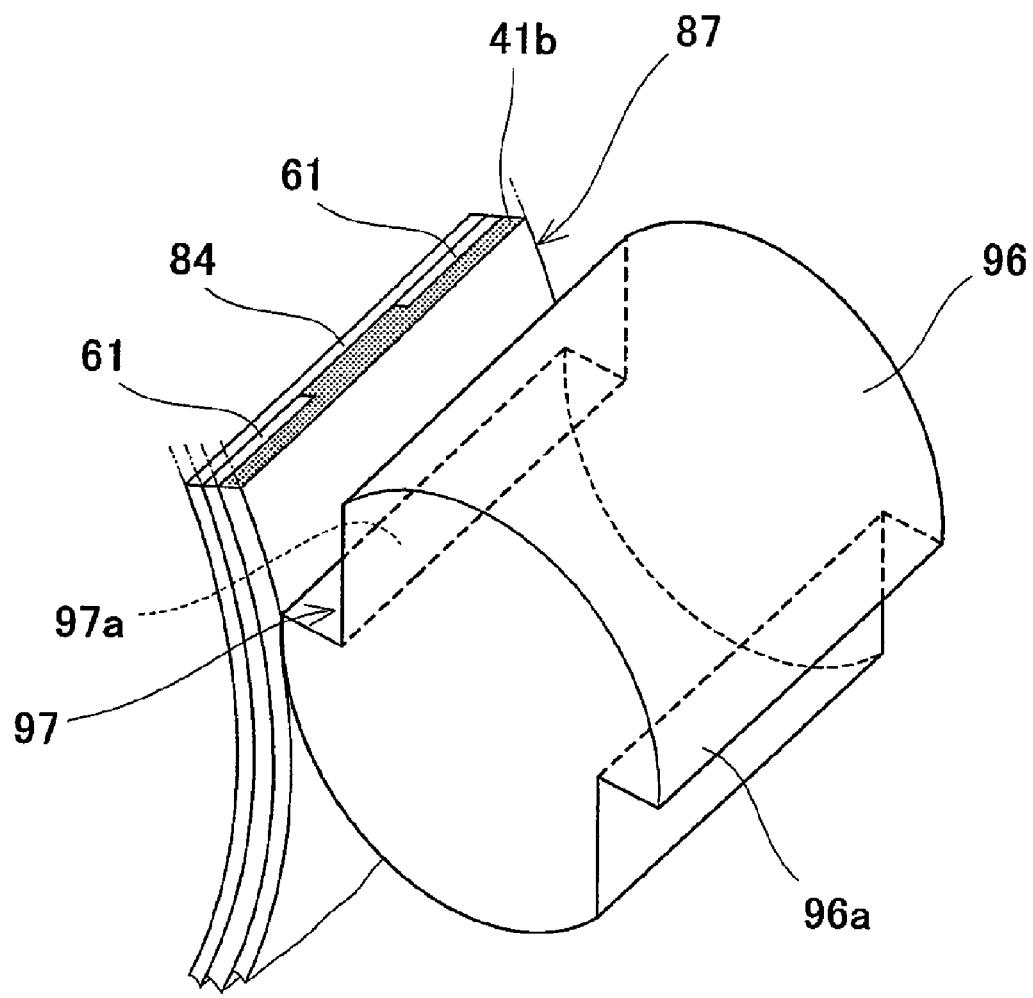
FIG. 11 is a schematic view which illustrates, in enlarged form, a main part of the roll knife coater shown in FIG. 10.

FIG. 10 is a schematic view illustrating another production method that uses a roll knife coater (comma coater) for forming the membrane membrane-reinforcement-member assembly tape 46. FIG. 11 is a schematic view which illustrates, in enlarged form, a main part of the roll knife coater shown in FIG. 10.

First, a substrate membrane-reinforcement-member assembly tape 86 having the pair of membrane reinforcement member tapes 61 affixed to both sides of a long substrate sheet 84 is made by use of a known thin film production technique, and then, a substrate membrane reinforcement member roll 85 into which this substrate membrane-reinforcement-member assembly tape 86 is rolled up is prepared. Thereafter, the cast membrane 41b, which is a polymer electrolyte membrane having a convex cross-section, is formed on either one (hereinafter referred to as "surface") of the main surfaces of the substrate membrane-reinforcement-member assembly tape 86, by use of the known roll knife coater 95 shown in FIGS. 10 and 11.

Herein, the roll knife coater 95 will be briefly described.

As illustrated in FIG. 10, a rotating roll 92 is disposed in the production line of the cast membrane 41b so as to rotate in a specified rotating direction. Wound around the rotating roll 92 is the substrate membrane-reinforcement-member assembly tape 86 paid out from the substrate membrane reinforcement member roll 85. Under the rotating roll 92, an applicator roll 93 is arranged in parallel with the rotating roll 92, being spaced a specified distance from the substrate membrane-reinforcement-member assembly tape 86 wound around the rotating roll 92. The applicator roll 93 rotates in a direction opposite to the rotation of the rotating roll 92. A liquid dam portion 94 is formed so as to enclose the applicator roll 93 and the lower part of the applicator roll 93 is immersed in the coating liquid (that is the polyelectrolyte solution 44 in this embodiment) impounded in the liquid dam portion 94. A roll knife 96 is arranged at a position that is posterosuperior to the applicator roll 93 with respect to the pay-out direction of the substrate membrane-reinforcement-member assembly tape 86.

As illustrated in FIGS. 10, 11, the roll knife 96 has a pair of V-shaped notches 97 which respectively extend over the entire peripheral surface of a cylindrical body in its axial direction. The pair of notches 97 are symmetrical about the central axis of the cylindrical body. Swing cutter portions 96a are provided, each of which is constituted by a ridge portion defined by a side surface 97a of the notch 97 and the circumferential surface of the cylindrical body, the side surface 97a being located at the front side of the notch 97 when viewed in the pay-out direction of the substrate membrane-reinforcement-member assembly tape 86. The roll knife 96 is fixedly mounted in parallel with the rotating roll 92 such that either of the swing cutter portions 96a is spaced a specified distance from the substrate membrane-reinforcement-member assembly tape 86 wound around the rotating roll 92.

In the roll knife coater 95 of the above-described structure, the substrate membrane-reinforcement-member assembly tape 86 passes through the space between the rotating roll 92 and the applicator roll 93 and the surface of the substrate membrane-reinforcement-member assembly tape 86 is coated with the polyelectrolyte solution 44 when passing through the space between the rolls 92, 93. The substrate membrane-reinforcement-member assembly tape 86 coated with the polyelectrolyte solution 44 moves along the circumferential surface of the rotating roll 92. At that time, the cast membrane 41b, that is a polymer electrolyte membrane, becomes convex in a cross section relative to its thickness direction because the substrate membrane-reinforcement-member assembly tape 86 is formed such that a concave portion is provided between the substrate sheet 84 and the pair of membrane reinforcement member tapes 61. In this way, a substrate polymer electrolyte membrane tape 87 is formed. The film thickness of the polymer electrolyte membrane tape 41a formed on the surface of the substrate membrane-reinforcement-member assembly tape 86 is dependent upon the spacing between the circumferential surface of the rotating roll 92 (more particularly, the surface of the substrate membrane-reinforcement-member assembly tape 86) and the swing cutter portion 96a of the roll knife 96.

Then, the liquid contained in the cast membrane 41b of the substrate polymer electrolyte membrane tape 87 thus formed is removed by a thermal treatment by use of a proper means, similarly to the thermal treatment step P2. Subsequently, the substrate sheet 84 is peeled off the substrate polymer electrolyte membrane tape 87 by a proper means, thereby forming the membrane membrane-reinforcement-member assembly tape 46.

While the substrate polymer electrolyte membrane tape 87 is formed using a roll knife coater in this embodiment, the invention is not limited to this. The substrate polymer electrolyte membrane tape 87 may be formed by use of a known coating device such as a slot die coater, lip coater or gravure coater.

Next, the coating step P4 will be concretely explained.

Figure 12:
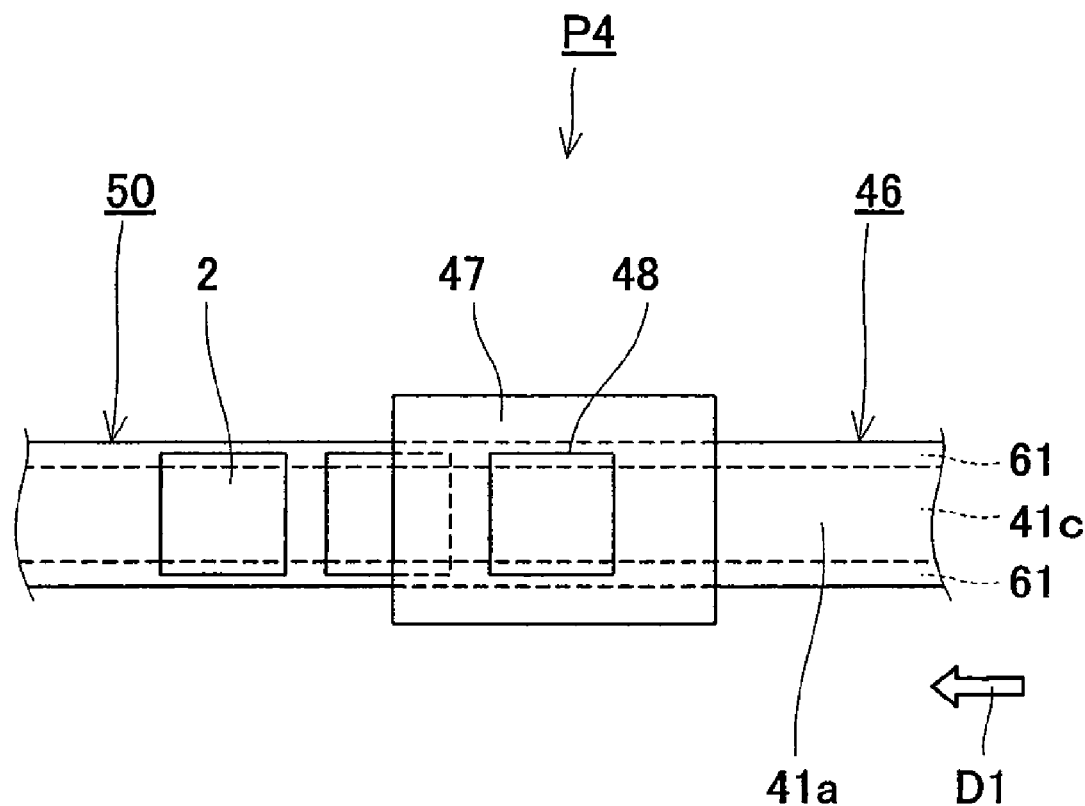
FIG. 12 is a schematic view depicted for the purpose of describing a coating step P4 in the production process of the membrane catalyst-layer assembly.

FIG. 12 is a schematic view depicted for the purpose of describing the coating step P4 in the production process of the membrane catalyst-layer assembly.

First, the structure of the area where the coating step P4 takes place will be described.

As illustrated in FIG. 12, the area where the coating step P4 is performed is provided with a mask 47 with an opening 48; a specified supporting means (e.g., supporting table) that is not shown in FIG. 12 and for supporting the membrane membrane-reinforcement-member assembly tape 46 from its main surface (hereinafter referred to as "rear surface") on the side where the pair of membrane reinforcement member tapes 61 are arranged; and a catalyst layer forming apparatus 49 (see FIG. 6). Herein, the opening 48 is designed to correspond, in shape, to the main surfaces of the catalyst layers 2 shown in FIGS. 4(a) and 4(b). The catalyst layer forming apparatus 49 has a mechanism for forming the catalyst layers 2 on the surface of the membrane membrane-reinforcement-member assembly tape 46 by coating or spraying an ink for catalyst layer formation. As this mechanism, known mechanisms for forming the catalyst layers of the gas diffusion layers of a polymer electrolyte fuel cell may be employed. Specifically, the mechanism is designed to perform a technique such as spraying, spin coating, the doctor blade method, die coating and screen printing.

Next, the processing content of the coating step P4 will be concretely explained.

After proceeding to a position short of the coating step P4 area, the membrane membrane-reinforcement-member assembly tape 46 formed in the thermocompression bonding step P3 is reversely rotated through, e.g., 180 degrees by e.g., a specified rotation mechanism and then once stopped. Then, the membrane membrane-reinforcement-member assembly tape 46 is fixedly held between the mask 47 and the supporting table not shown in FIG. 12.

Thereafter, the catalyst layer forming apparatus 49 is put into operation so that the ink for catalyst layer formation is poured from a position above the opening 48 of the mask 47, thereby forming a catalyst layer 2 on the main surface of the polymer electrolyte membrane tape 41a of the membrane membrane-reinforcement-member assembly tape 46 such that the catalyst layer 2 overlaps at least a part of the main surfaces of the pair of membrane reinforcement member tapes 61. After the formation of the catalyst layer 2, the mask 47 and the supporting table are retreated from the membrane membrane-reinforcement-member assembly tape 46. A membrane catalyst-layer assembly tape 50 thus formed moves along the pay-out direction D1. In this way, the catalyst layers 2 are formed in the membrane catalyst-layer assembly tape 50 at specified intervals in a longitudinal direction of the tape 50.

The catalyst layers 2 are properly adjusted in terms of composition, dryness and others so as to have adequate flexibility. A treatment (e.g., preheating of the supporting table to dry the dispersing agent contained in the ink for catalyst layer formation) is applied for the purpose of preventing the catalyst layers 2 from coming off the polymer electrolyte membrane tape 41a even if the membrane catalyst-layer assembly tape 50 turns upside down when forming the catalyst layers 2. It should be noted that at least one of desired drying treatments that include e.g., heating, air blasting and deairing may be properly applied whenever a catalyst layer 2 is formed.

Next, the cutting step P5 will be concretely explained.

First, the membrane catalyst-layer assembly tape 50 and another membrane catalyst-layer assembly tape 50 are prepared. Then, these tapes 50 are arranged such that their longitudinal directions are substantially perpendicular to each other and their rear surfaces are opposed to each other (i.e., the membrane reinforcement member tapes 61 of one tape 50 face the membrane reinforcement member tapes 61 of the other tape 50). The pair of membrane catalyst-layer assembly tapes 50 with their rear surfaces overlapping each other are guided into a cutting machine 51 having a thermocompression bonding mechanism and a cutting mechanism. Then, the rear surface of one membrane catalyst-layer assembly tape 50 and the rear surface of the other membrane catalyst-layer assembly tape 50, which tapes 50 have been guided into the cutting machine 51, are thermally compression bonded to each other by the thermocompression bonding mechanism. Then, the tapes 50 are cut into a predetermined size by the cutting mechanism of the cutting machine 51, whereby the membrane catalyst-layer assembly 30 shown in FIGS. 4(a), 4(b) is obtained. It is also possible to form the membrane catalyst-layer assembly 30 by cutting the membrane catalyst-layer assembly tapes 50 into a predetermined size and then bonding the pair of cut membrane catalyst-layer assembly tapes 50 to each other.

In the production line of the membrane catalyst-layer assembly according to this embodiment shown in FIG. 6, the polymer electrolyte membrane tape 41a is moved in the form of a continuous tape until a membrane catalyst-layer assembly tape 50 is formed. In this embodiment, in order to adequately move the polymer electrolyte membrane tape 41a in the pay-out direction D1, the production line of the membrane catalyst-layer assembly includes, in place, a traction mechanism such as capstans and pairs of rollers for traction of the tape; a tension application mechanism such as tensioners for applying proper tension to the tape; and a temporary seat holding mechanism and seat feeding mechanism such as dancer rollers for temporarily stopping the tape in a predetermined area (e.g., the coating step P4) and then fast-forwarding the tape. These mechanisms are known and therefore a description thereof is omitted herein.

In the cutting step (area) P5, a first membrane catalyst-layer assembly production line crosses a second membrane catalyst-layer assembly production line. In the cutting step P5, the second membrane catalyst-layer assembly tape 50 produced in the second membrane catalyst-layer assembly production line is reversed so as to be perpendicular to the first membrane catalyst-layer assembly seat 50 produced in the first membrane catalyst-layer assembly production line shown in FIG. 6 and then processed as described earlier. The second membrane catalyst-layer assembly production line is exactly the same as the membrane catalyst-layer assembly production line shown in FIGS. 6 to 12. Therefore, a description thereof is omitted herein.

Next, a production method for the MEA 5 will be concretely described.

The gas diffusion layers 3 (e.g., carbon cloth), which have been cut into a proper size, are bonded to the respective main surfaces of their associated catalyst layers 2 of the membrane catalyst-layer assembly 30 obtained in the way described earlier, whereby the MEA 5 is obtained. The MEA 5 may be formed by formation of water-repellent carbon layers by coating the main surfaces of the catalyst layers 2 or the gas diffusion layers 3 with water-repellent carbon layer formation ink beforehand.

It is also possible to form the MEA 5 by bonding the gas diffusion layers 3 to the respective main surfaces of the catalyst layers 2 of the membrane catalyst-layer assembly tapes 50 before the cutting step P5. In this case, a membrane electrode assembly tape may be formed by bonding a gas diffusion layer 3, which has been cut beforehand, to the main surface of a catalyst layer 2 or, alternatively, by bonding a gas diffusion layer 3 in the form of a tape to the main surface of a catalyst layer 2 and then cutting the bonded layers. Then, a pair of membrane electrode assembly tapes thus obtained are bonded and cut in the manner similar to the above-described cutting step P5, whereby the MEA 5 is formed. The MEA 5 may be formed after the formation of the water-repellent carbon layers by coating the main surfaces of the catalyst layers 2 or the gas diffusion layers 3 with the water-repellent carbon layer formation ink beforehand.

As a comparative example, a production method will be explained which is generally contemplated to be used in cases where the membrane membrane-reinforcement-member assembly disclosed in Patent Document 2 is mass-produced by use of a known thin film laminate production technique.

Figure 13:
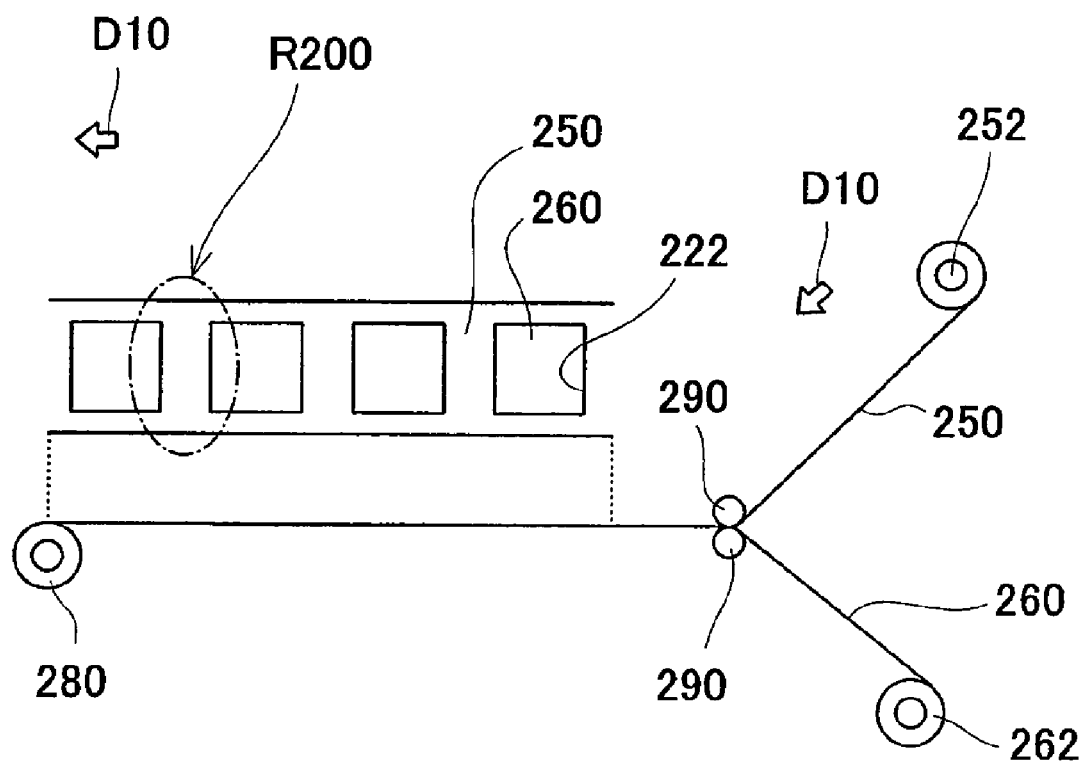
FIG. 13 is an explanatory view illustrating one example of production methods that are generally expected to be employed when intentionally trying to mass produce membrane membrane-reinforcement-member assemblies by means of a known thin film laminate production technique.

FIG. 13 is an explanatory view illustrating one example of production methods that are generally expected to be employed when intentionally trying to mass produce membrane membrane-reinforcement-member assemblies by means of a known thin film laminate production technique.

Figure 32:
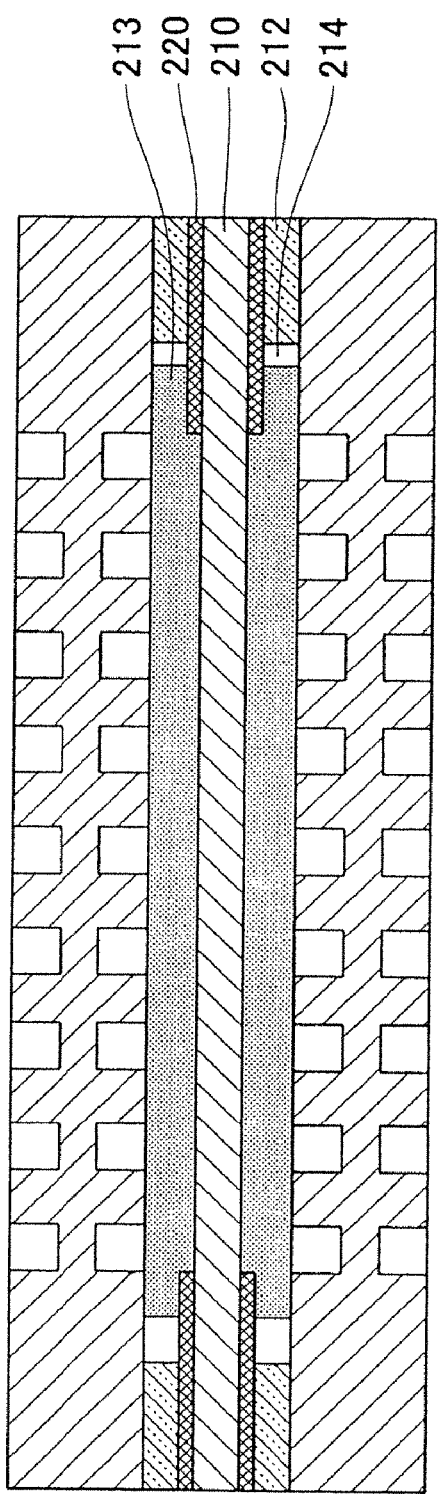
FIG. 32 is a cross-sectional view schematically illustrating a configuration of a unit cell in a solid polymer electrolyte fuel cell stack disclosed in Patent Document 2.

First, as illustrated in FIG. 13, a solid polymer electrolyte membrane 260, which has been produced in the form of a tape, is rolled up to form a solid polymer electrolyte membrane roll 262. A protective film 250 (a tape-shaped film produced by continuous formation of the protective film 220 shown in FIG. 32), which has been produced in the form of a tape, is rolled up to form a protective film roll 252.

Next, a laminate, in which the protective film 250 in the form of a tape is laminated to at least one of the main surfaces of the tape-shaped solid polymer electrolyte membrane 260, is produced in the way similar to the bonding step P1 of this embodiment described earlier. More specifically, the tape-shaped protective film 250 and the tape-shaped solid polymer electrolyte membrane 260 are paid out from the protective film roll 252 and the solid polymer electrolyte membrane roll 262, respectively and then sandwiched by a pair of rollers 290 to be integrated into a laminate. Then, this integral laminate is rolled up, thereby forming a membrane protective-film assembly roll 280.

During the production of the membrane protective-film assembly roll 280, tension is imposed on the protective film 250 in the pay-out direction D10 of the protective film 250 (i.e., the longitudinal direction of the tape-shaped protective film 250). In this case, when tension is imposed on the protective film 250, portions R200 of the protective film 250, which portions are substantially perpendicular to the direction of the tension imposed, lift up, because the protective film 250 is a very thin film (having a thickness of, e.g., 50 μm or less) and has openings 222 within its main surface. This increases the likelihood that wrinkles will be created in the portions R200 of the protective film 250 in the region between the rollers 290 and the protective film roll 252 when the protective film 250 is pressed by the rollers 290. Further, it becomes highly possible because of the tension that the portions R200 of the protective film 250 will come off the solid polymer electrolyte membrane 260 in the region between the rollers 290 and the membrane protective-film assembly roll 280.

Therefore, the production method of the solid polymer electrolyte fuel cell disclosed in Patent Document 2 has to adopt the very troublesome, complicated, costly production process in which the protective films are positioned in relation to the solid polymer electrolyte membranes and affixed thereto one by one with a batch method in order to reliably produce fair quality items by avoiding product failure.

In contrast with this, the protective film 250 (shown in FIG. 13) of this embodiment does not have the portions R200 that are substantially perpendicular to the direction of the tension imposed on the protective film 250 and likely to lift up when the tension is imposed. Therefore, this embodiment enables it to unfailingly prevent the displacement and peeling off of the membrane reinforcement member tapes 61 when the membrane reinforcement member tapes 61 are bonded to the polymer electrolyte membrane tape 41a.

The configuration of the PEFC constructed according to the first embodiment of the invention makes it possible to prevent damage to the polymer electrolyte membrane and a cross-leak of the reaction gases without fail and realize high cost performance mass-production.

In addition, the configuration of the PEFC constructed according to the first embodiment of the invention is least likely to cause wrinkles in the pair of membrane reinforcement member tapes 61 and therefore makes it possible to employ the "roll-aided production method" in place of the batch production method. As a result, polymer electrolyte membranes which are reinforced and therefore unsusceptible to damage can be easily produced. This enables easy production of desirable PEFCs in which a cross-leak of the reaction gases or the like is unfailingly restrained.

Generally, the production of thin PEFCs gives rise to the necessity of not only thinning of the anode and cathode separators but also thinning of the MEAs. To reduce the thickness of the MEAs, thinning of the polymer electrolyte membranes and thinning of the anode and cathode catalyst layers are required. Thinning of the polymer electrolyte membranes is accompanied with a decrease in the strength of the polymer electrolyte membranes and therefore the degree of damage to the MEAs, which is caused by the anode and cathode catalyst layers and particularly their four corners, increases compared to the case of polymer electrolyte membranes that are not subjected to thinning. To reduce such damage to the MEAs, the four corners of the anode and cathode catalyst layers are often rounded in the conventional MEA configurations. Such a rounding treatment applied to the anode and cathode catalyst layers leads to an increase in the production cost of the MEAs. According to the invention, there is no need to apply a rounding treatment to the four corners of the anode and cathode catalyst layers even where thin polymer electrolyte membranes are produced, because membrane reinforcement members are doubly embedded in the four corners of the polymer electrolyte membranes. Accordingly, the damage to the MEAs due to the anode and cathode catalyst layers can be effectively avoided. This makes it possible to unfailingly prevent damage to the polymer electrolyte membranes, a cross-leak of the reaction gases and the like, and moreover, it enables high cost performance mass-production, even where thin PEFCs are produced.

Second Embodiment

Figure 14:
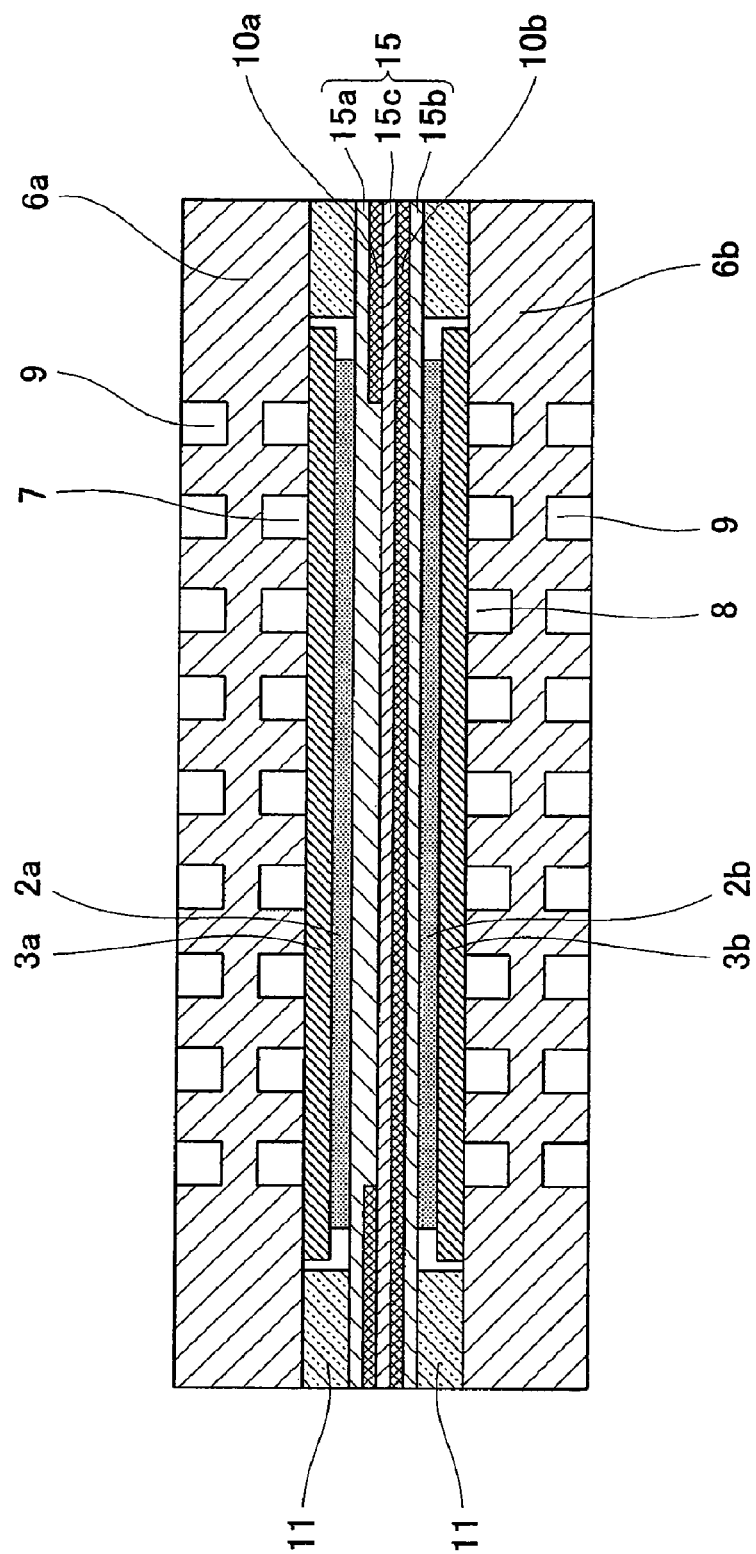
FIG. 14 is a cross-sectional view illustrating a general configuration of a unit cell provided in a polymer electrolyte fuel cell according to a second embodiment of the invention.
Figure 15:
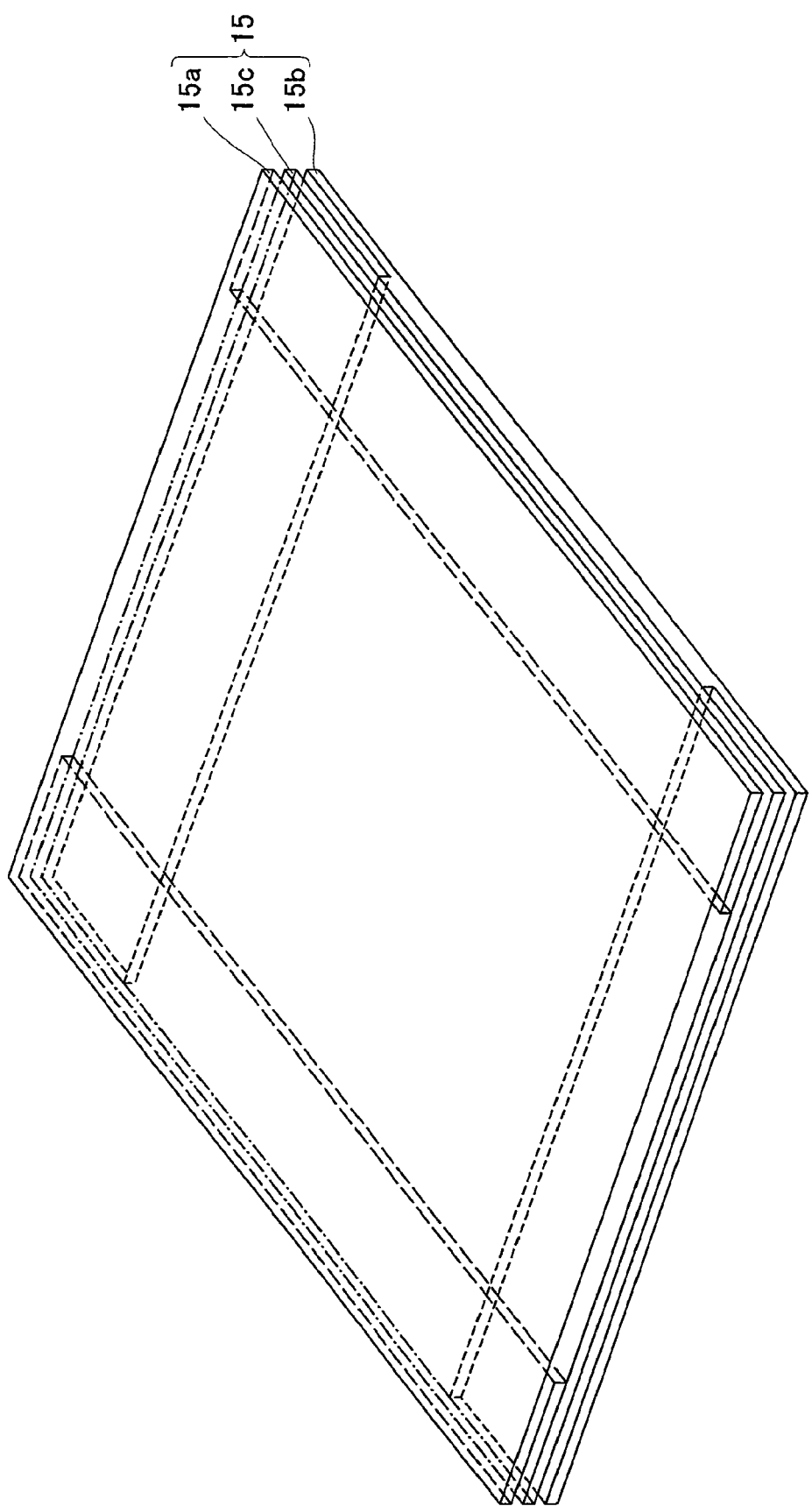
FIG. 15 is a perspective view schematically illustrating a general configuration of a polymer electrolyte membrane/inner reinforcement membrane composite in the unit cell of the polymer electrolyte fuel cell shown in FIG. 14.

FIG. 14 is a cross-sectional view illustrating a general configuration of a unit cell provided in a PEFC according to a second embodiment of the invention. FIG. 15 is a perspective view schematically illustrating a general configuration of a polymer electrolyte membrane/inner reinforcement membrane composite in the unit cell of the PEFC shown in FIG. 14.

The cells of the PEFC according to the second embodiment are basically the same in configuration as of the cells of the PEFC according to the first embodiment except the following points.

As illustrated in FIG. 14, the cells of the PEFC according to the second embodiment each have a polymer electrolyte membrane/inner reinforcement membrane composite 15 in place of the polymer electrolyte membrane 1. It should be noted that the "polymer electrolyte membrane" stated in Claims includes this polymer electrolyte membrane/inner reinforcement membrane composite 15. The polymer electrolyte membrane/inner reinforcement membrane composite 15 has a pair of polymer electrolyte membranes 15a, 15b in the form of a small strip and an inner reinforcement membrane 15c in the form of a small strip. Herein, the polymer electrolyte membranes 15a, 15b and the inner reinforcement membrane 15c are so arranged that their main surfaces are opposed to each other. As illustrated in FIG. 14, the polymer electrolyte membranes 15a, 15b are each provided with a pair of cavity portions extending along an opposed pair of sides thereof and these pairs of cavity portions are formed in the parallelogrammatic arrangement state when viewed in a thickness direction (the direction of a normal line). The first membrane reinforcement members 10a are placed in a pair of cavity portions respectively and the second membrane reinforcement members 10b are placed in the other pair of cavity portions respectively. In this embodiment, the inner reinforcement membrane 15c is sandwiched between the polymer electrolyte membranes 15a, 15b.

Next, the structure of the inner reinforcement membrane 15c will be described in detail with reference to FIG. 16.

Figure 16:
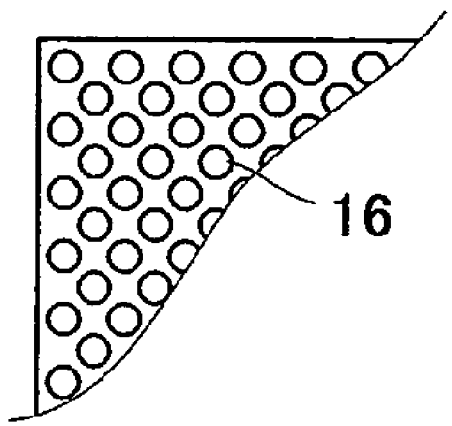
FIG. 16 is a schematic view illustrating a general configuration of an inner reinforcement membrane in the polymer electrolyte membrane/inner reinforcement membrane composite shown in FIG. 15.

FIG. 16 is a schematic view illustrating a general configuration of the inner reinforcement membrane in the polymer electrolyte membrane/inner reinforcement membrane composite shown in FIG. 15. It should be noted that FIG. 16 shows only a part of the inner reinforcement membrane.

As illustrated in FIG. 16, the inner reinforcement membrane 15c has a plurality of openings (through holes) 16 that run through the inner reinforcement membrane 15c in its thickness direction. The openings 16 are filled with polymer electrolyte whose components are the same as or different from the components of the polymer electrolyte membranes 15a, 15b. Herein, the ratio of the area of the openings 16 to the area of the main surface of the inner reinforcement membrane 15c (i.e., opening ratio) is preferably within the range of from 50% to 90%. By setting the opening ratio to 50% or more, sufficient ion conductivity can be easily obtained. By limiting the opening ratio to 90% or less, sufficient mechanical strength can be easily obtained in the inner reinforcement membrane 15c. The openings 16 provided in the inner reinforcement membrane 15c may be very fine pores (having a diameter of e.g., several tens of micron meters). Even in such a case, the opening ratio (porosity) is preferably within the range of from 50% to 90% for the reason discussed above.

The inner reinforcement membrane 15c may be a resinous film or stretched porous film (e.g., "GoreSelect®" produced by Japan Gore-Tex Inc.).

In the light of chemical stability and mechanical stability, the above inner reinforcement membrane 15c is preferably made of at least one or more synthetic resins selected from the resin group consisting of polytetrafluoroethylene; fluoroethylene-propylene copolymers; tetrafluoroethylene-perfluoroalkoxyethylene copolymers; polyethylene; polypropylene; polyether amide; polyetherimide; polyether ether ketone; polyethersulfone; polyphenylene sulfide; polyarylate; polysulfide; polyimide; and polyimide-amide.

The inner reinforcement membrane 15c may be formed such that a sheet-like polymer electrolyte membrane contains at least either fiber-like reinforcement particles or spherical reinforcement particles to thereby increase the strength of the polymer electrolyte membrane. Examples of the constituent material of the reinforcement particles include the resins listed earlier as the material of the inner reinforcement membrane 15c.

The production method of the polymer electrolyte membrane/inner reinforcement membrane composite 15 is not limited to any particular techniques but known thin film production techniques may be employed. The cells of this PEFC can be produced with a method that is the same as the cell production method described earlier except the use of the polymer electrolyte membrane/inner reinforcement membrane composite 15.

While the first and second embodiments of the invention have been described in details, the present invention is not limited to these embodiments.

For instance, whereas the first and second embodiments have been discussed in the context of a configuration in which the outer peripheral portions (edges) of the first membrane reinforcement members 10a and the second membrane reinforcement members 10b are in line with the peripheral portion (edges) of the polymer electrolyte membrane 1 (that is, the outer edges of the first and second membrane reinforcement members 10a, 10b overlap the edges of the polymer electrolyte membrane 1 and the edges of the polymer electrolyte membrane 1 do not stick out when viewed in a direction substantially normal to the main surfaces of the polymer electrolyte membrane 1), the invention is not limited to such a configuration. As long as the effects of the invention can be achieved, other configurations may be employed. For instance, the edges of the first membrane reinforcement members 10a and the second membrane reinforcement members 10b may partially or entirely stick out from the edges of the polymer electrolyte membrane 1, or alternatively, the edges of the polymer electrolyte membrane 1 may partially or entirely stick out from the edges of the first and second membrane reinforcement members 10a, 10b.

In the first and second embodiments, the polymer electrolyte membranes 1, 15a, 15b and the inner reinforcement membrane 15c may be approximately quadrilateral in shape. Precisely speaking, in the first and second embodiments, the internal angles of the four corners of the polymer electrolyte membrane 1 and the inner reinforcement membrane 15c may not be 90 degrees. Concretely, the four sides of these membranes may be slightly curved or the four corners may be chamfered.

Third Embodiment

Third and fourth embodiments for carrying out the invention will be described in detail with reference to the accompanying drawings. In the following description, those parts in all figures that are substantially equivalent or function substantially similarly to one another are indicated by the same numerals and redundant explanation will be omitted.

Figure 17:
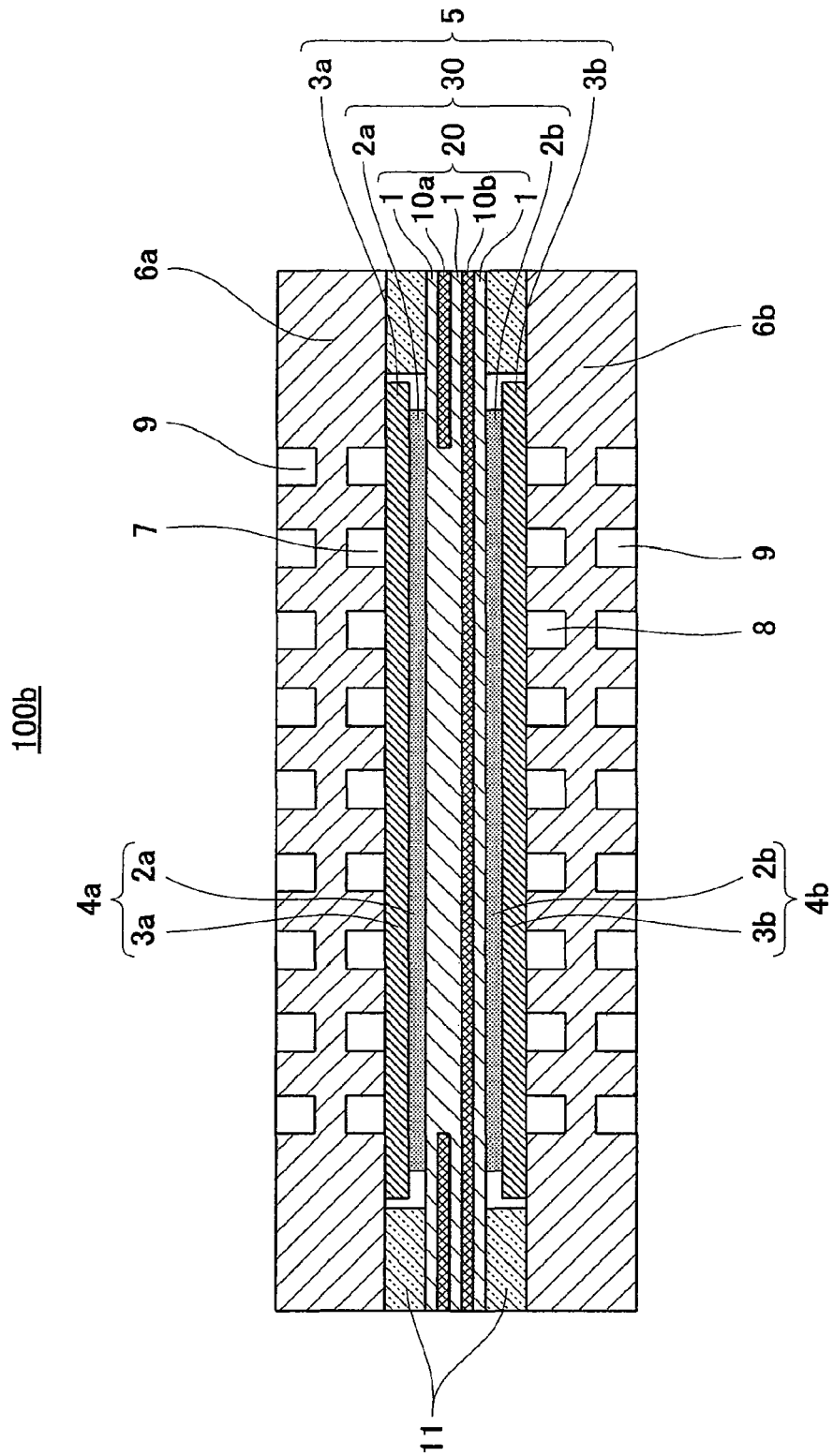
FIG. 17 is a cross-sectional view schematically illustrating a general configuration of a cell provided in a polymer electrolyte fuel cell according to a third embodiment of the invention.

FIG. 17 is a cross-sectional view schematically illustrating a general configuration of a unit cell (hereinafter referred to as "cell") provided in a polymer electrolyte fuel cell stack (hereinafter referred to as "PEFC") according to the third embodiment of the invention. In FIG. 17, the configuration of the cell is partially omitted.

As illustrated in FIG. 17, the cell 100b of the PEFC according to the this embodiment has a membrane electrode assembly (hereinafter referred to as "MEA") 5; first membrane reinforcement members 10a and second membrane reinforcement members 10b disposed within the MEA 5; gaskets 11; an anode separator 6a; and a cathode separator 6b.

The MEA 5 includes a polymer electrolyte membrane 1 for selectively transporting hydrogen ions, an anode 4a composed of an anode catalyst layer (first catalyst layer) 2a and an anode gas diffusion layer (first gas diffusion layer) 3a, and a cathode 4b composed of a cathode catalyst layer (second catalyst layer) 2b and a cathode gas diffusion layer (second gas diffusion layer) 3b. In this specification, the assembly constituted by the polymer electrolyte membrane 1 and the first and second membrane reinforcement members 10a, 10b is called "membrane membrane-reinforcement-member assembly 20". In this specification, the assembly constituted by the membrane membrane-reinforcement-member assembly 20, the anode catalyst layer 2a and the cathode catalyst layer 2b is called "membrane catalyst-layer assembly 30".

First, the configuration of the polymer electrolyte membrane 1 and the membrane membrane-reinforcement-member assembly 20 will be explained.

Figure 18:
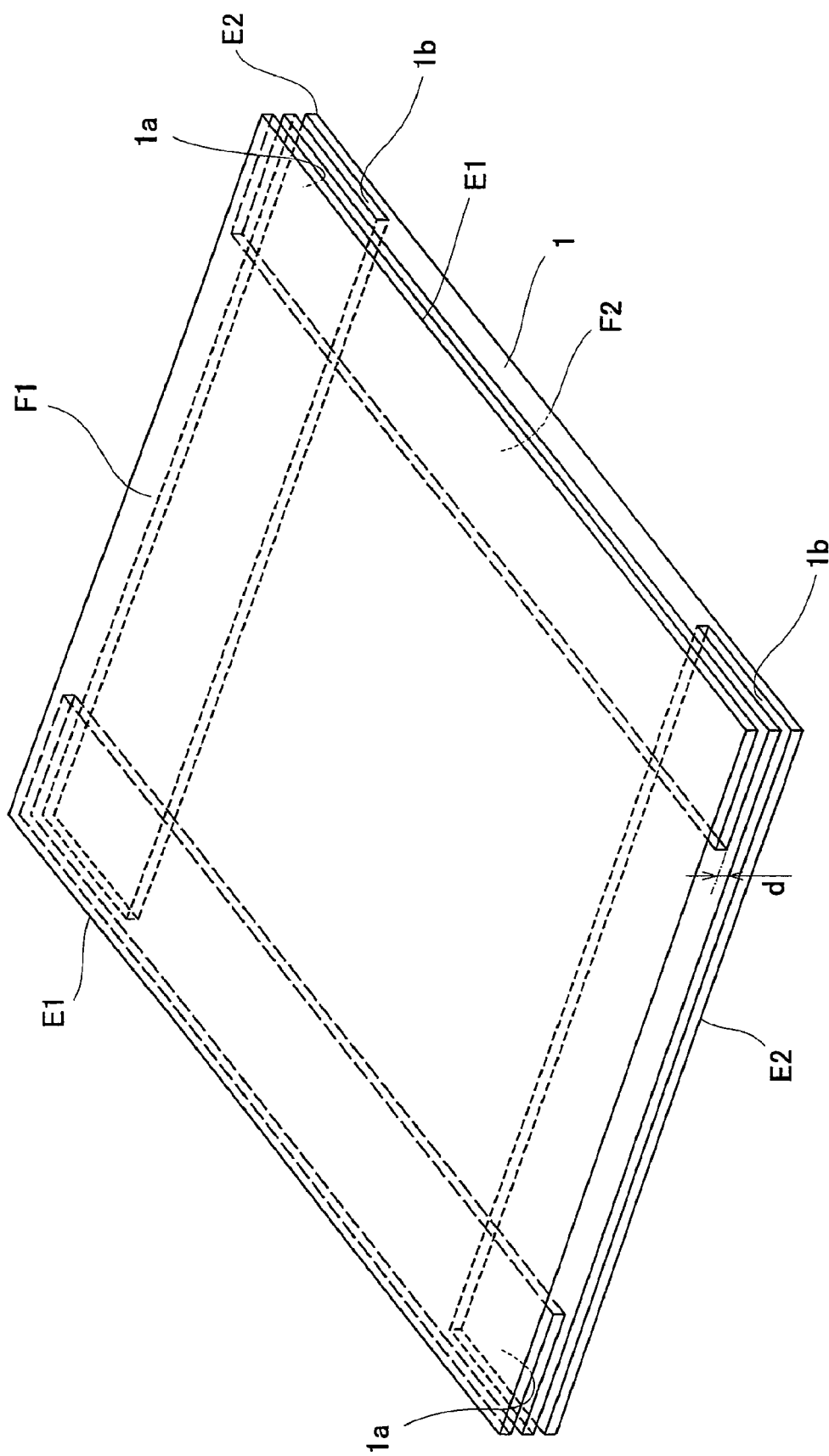
FIG. 18 is a perspective view schematically illustrating a general configuration of a polymer electrolyte membrane in the cell of the polymer electrolyte fuel cell shown in FIG. 17.
Figure 19:
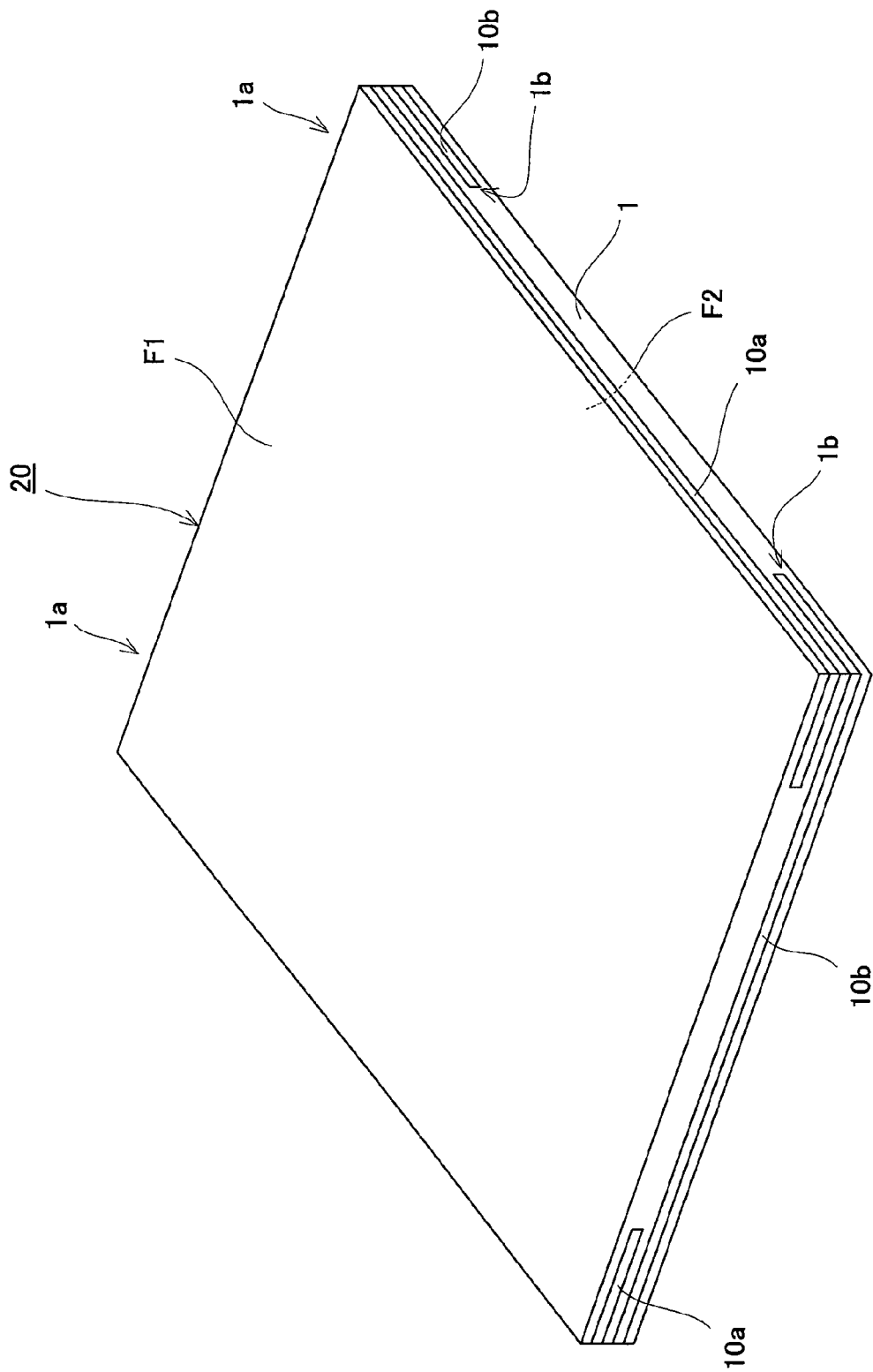
FIG. 19 is a perspective view schematically illustrating a general configuration of a membrane membrane-reinforcement-member assembly in a state where membrane reinforcement members are disposed in the polymer electrolyte membrane shown in FIG. 18.

FIG. 18 is a perspective view schematically illustrating a general configuration of the polymer electrolyte membrane 1 in the cell 100b of the PEFC shown in FIG. 17. FIG. 19 is a perspective view schematically illustrating a general configuration of the membrane membrane-reinforcement-member assembly 20 in a state where the first membrane reinforcement members 10a and the second membrane reinforcement members 10b are disposed in the polymer electrolyte membrane 1 shown in FIG. 18.

As shown in FIG. 18, the polymer electrolyte membrane 1 has a substantially quadrilateral shape (rectangular shape in this embodiment) when viewed from the main surface F1 side. Formed in the peripheral portion of the polymer electrolyte membrane 1 are a pair of first cavity portions 1a and a pair of second cavity portions 1b. More specifically, the pair of first cavity portions 1a each having a strip-like shape are formed so as to extend along the entire length of an opposed pair of sides E1 of the main surface F1 of the polymer electrolyte membrane 1, being a specified distance away from the main surface F1 with respect to a thickness direction of the polymer electrolyte membrane 1. The pair of second cavity portions 1b each having a strip-like shape are formed so as to extend along the entire length of an opposed pair of sides E2 of a main surface F2 of the polymer electrolyte membrane 1, being a distance more than the above specified distance away from the main surface F2 of the polymer electrolyte membrane 1 with respect to a thickness direction of the polymer electrolyte membrane 1. The pair of first cavity portions 1a and the pair of second cavity portions 1b are formed on the edges, respectively, of the polymer electrolyte membrane 1 so as to be a specified distance d spaced from each other in a thickness direction of the polymer electrolyte membrane 1. In this embodiment, the pair of first cavity portions 1a are closer to the main surface F1 than the pair of second cavity portions 1b, as seen from FIG. 2.

As illustrated in FIG. 19, the first membranous membrane reinforcement members 10a having the same strip-like shape as of the first cavity portions 1a are just fit in the first cavity portions 1a, respectively, of the polymer electrolyte membrane 1. In other words, the first membrane reinforcement members 10a are embedded in the polymer electrolyte membrane 1 with their main surfaces being unexposed. The second membranous membrane reinforcement members 10b having the same strip-like shape as of the second cavity portions 1b are just fit in the second cavity portions 1b, respectively, of the polymer electrolyte membrane 1. That is, the second membrane reinforcement members 10b are embedded in the polymer electrolyte membrane 1 with their main surfaces being unexposed, similarly to the first membrane reinforcement members 10a.

As illustrated in FIG. 19, the pair of first membrane reinforcement members 10a and the pair of second membrane reinforcement members 10b are arranged in a state where they extend along the four sides, respectively, of the polymer electrolyte membrane 1 when viewed as a whole and their main surfaces are not in contact with each other in the four corners of the polymer electrolyte membrane 1 (this state is hereinafter referred to as "parallelogrammatic arrangement state" according to need). More concretely, the pair of first membrane reinforcement members 10a and the pair of second membrane reinforcement members 10b are arranged with their main surfaces being the specified distance d spaced from each other in the four corners of the polymer electrolyte membrane 1. In addition, the pair of first membrane reinforcement members 10a are so embedded in the polymer electrolyte membrane 1 that a first portion of the main surface F1 corresponding to the pair of first membrane reinforcement members 10a and a second portion of the main surface F1 corresponding to the part between the pair of first membrane reinforcement members 10a are substantially flush. Similarly, the pair of second membrane reinforcement members 10b are so embedded in the polymer electrolyte membrane 1 that a first portion of the main surface F2 corresponding to the pair of second membrane reinforcement members 10b and a second portion of the main surface F1 corresponding to the part between the pair of second membrane reinforcement members 10b are substantially flush.

Although the thickness and width of the first and second membrane reinforcement members 10a, 10b, which are fitted in the first and second cavity portions 1a, 1b respectively, are not particularly specified as long as the effects of the invention can be obtained, it is preferable in view of more reliable achievement of the effects of the invention to make the thickness and width of the first membrane reinforcement members 10a equal to those of the second membrane reinforcement members 10b respectively.

Next, the constituent parts of the membrane membrane-reinforcement-member assembly 20 will be explained.

The polymer electrolyte membrane 1 has proton conductivity. Preferably, this polymer electrolyte membrane 1 has, for instance, a sulfonic acid group, carboxylic acid group, phosphonic acid group, or sulfonimide group as a cation-exchange group. It is more preferable in view of the attainment of proper proton conductivity that the polymer electrolyte membrane 1 have a sulfonic acid group.

As a resin having a sulfonic acid group that constitutes the polymer electrolyte membrane 1, a dry resin having an ion exchange capacity of 0.5 to 1.5 meq/g is preferably employed. The reason for this is that where the ion exchange capacity of the dry resin that constitutes the polymer electrolyte membrane 1 is 0.5 meq/g or more, the increase in the resistance value of the polymer electrolyte membrane 1 during power generation can be satisfactorily reduced. In addition, where the ion exchange capacity of the dry resin that constitutes the polymer electrolyte membrane 1 is no more than 1.5 meq/g, the polymer electrolyte membrane 1 does not increase in its moisture content and is therefore unlikely to swell, so that clogging of the fine pores of the catalyst layer 2 (described later) can be prevented. It is more preferable from the foregoing viewpoint that the ion exchange capacity of the dry resin that constitutes the polymer electrolyte membrane 1 be 0.8 to 1.2 meq/g.

Preferred examples of the polymer electrolyte include copolymers that have a polymerized unit derived from a perfluorovinyl compound represented by Chemical Formula (5) ("m" designates an integer number within the range of from 0 to 3, "n" designates an integer number within the range of from 1 to 12, "p" designates 0 or 1 and "X" designates a fluorine atom or a trifluoromethyl group) and a polymerized unit from tetrafluoroethylene.

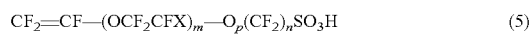

$$CF_2=CF-(OCF_2CFX)_m-O_p(CF_2)_nSO_3H \quad (5)$$

Preferred examples of the fluorovinyl compound include the compounds represented by Chemical Formulas (6) to (8). It should be noted that, in the following chemical formulas, "q" designates an integer number within the range of from 1 to 8, "r" designates an integer number within the range of from 1 to 8, and "t" designates an integer number within the range of from 1 to 3.

$$CF_2=CFO(CF_2)_q-SO_3H \quad (6)$$

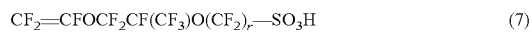

$$CF_2=CFOCF_2CF(CF_3)O(CF_2)_r-SO_3H \quad (7)$$

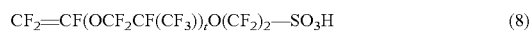

$$CF_2=CF(OCF_2CF(CF_3))_tO(CF_2)_2-SO_3H \quad (8)$$

Preferred examples of the constituent materials of the first and second membrane reinforcement members 10a, 10b include synthetic resins having flexibility and pliability so that they can be rolled up during production and restored to their original shapes when unrolled.

In the light of durability, the synthetic resins applicable as the constituent materials of the first and second membrane reinforcement members 10a, 10b are preferably composed of at least one or more resins selected from the group consisting of polyethylene naphthalate; polytetrafluoroethylene; polyethylene terephthalate; fluoroethylene-propylene copolymers; tetrafluoroethylene-perfluoroalkoxyethylene copolymers; polyethylene; polypropylene; polyether amide; polyetherimide; polyether ether ketone; polyethersulfone; polyphenylene sulfide; polyarylate; polysulfide; polyimide; and polyimide-amide.

Next, the configuration of the membrane catalyst-layer assembly 30 will be described.

Figure 20A:
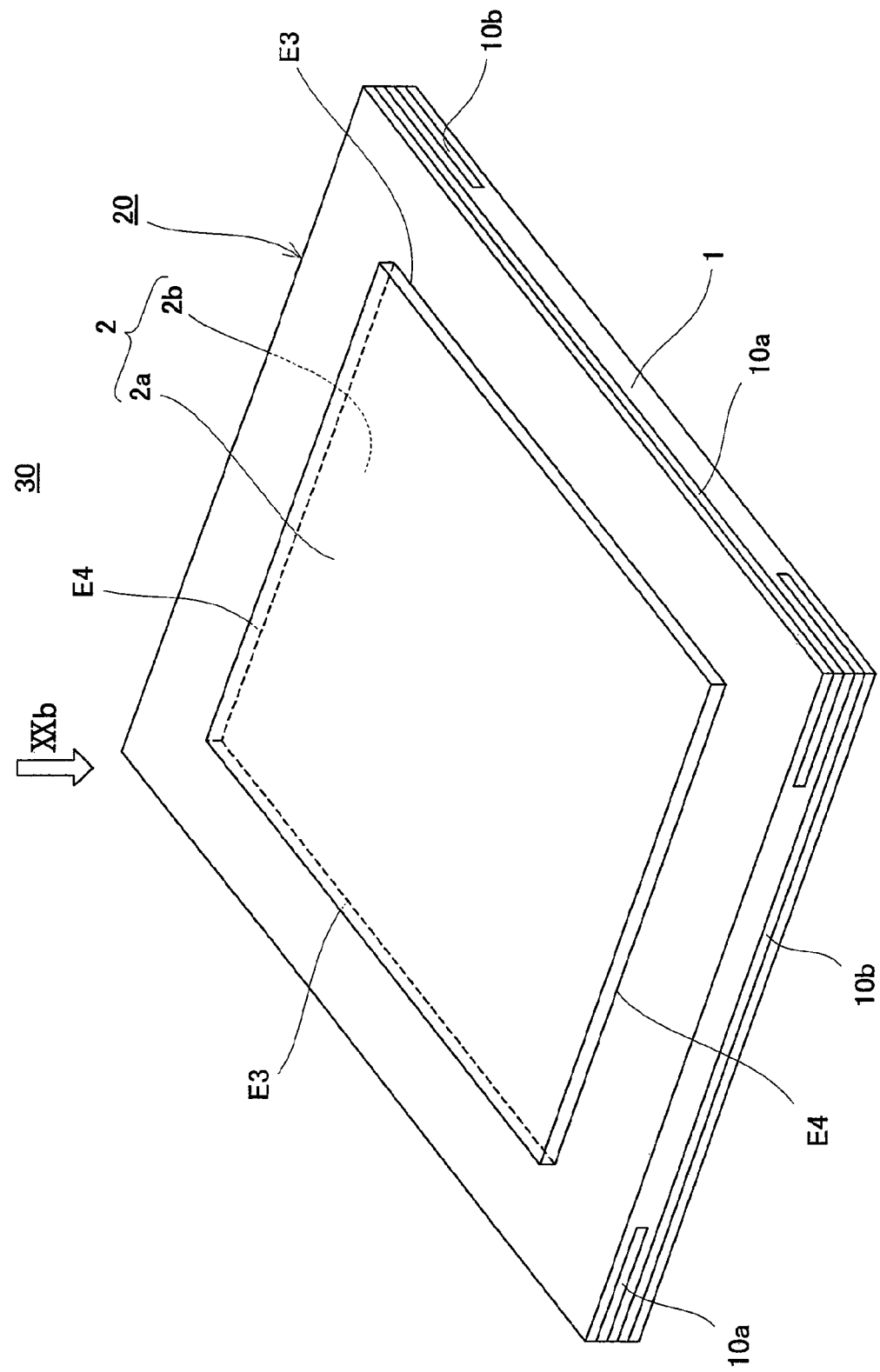
FIG. 20(a) is a perspective view schematically illustrating a general configuration of a membrane catalyst-layer assembly in the cell of the polymer electrolyte fuel cell shown in FIG. 17.

FIG. 20(a) is a perspective view schematically illustrating a general configuration of a membrane catalyst-layer assembly 30 in the cell 100b of the PEFC shown in FIG. 1. FIG. 20(b) is a schematic view when viewed from the direction of arrow XXb indicated in FIG. 20(a).

As illustrated in FIG. 20(a), the membrane catalyst-layer assembly 30 has the membrane membrane-reinforcement-member assembly 20 and the catalyst layer 2 (anode catalyst layer 2a and cathode catalyst layer 2b). The anode catalyst layer 2a is disposed on the main surface F1 side of the polymer electrolyte membrane 1 so as to extend from a part of one of the first membrane reinforcement members 10a to a part of the other first membrane reinforcement member 10a. Although not seen from FIG. 20(a), the cathode catalyst layer 2b is disposed on the main surface F2 side of the polymer electrolyte membrane 1 so as to extend from a part of one of the second membrane reinforcement members 10b to a part of the other second membrane reinforcement member 10b. As illustrated in FIG. 20(b), the anode catalyst layer 2a and cathode catalyst layer 2b of this embodiment have a rectangular shape similar to the polymer electrolyte membrane 1. When viewed from the thickness direction of the polymer electrolyte membrane 1 (i.e., the direction of arrow IVb indicated in FIG. 20(a)), the entire peripheries of the anode and cathode catalyst layers overlap the first membrane reinforcement members 10a and the second membrane reinforcement members 10b.

Of the four sides of the main surface of the anode catalyst layer 2a, an opposed pair of sides E3 are accordingly in contact with the portions of the main surface F1 of the polymer electrolyte membrane 1 reinforced by the first membrane reinforcement members 10a, so that the polymer electrolyte membrane 1 will not be damaged. Similarly, of the four sides of the main surface of the cathode catalyst layer 2b, an opposed pair of sides E4 are accordingly in contact with the portions of the main surface F2 of the polymer electrolyte membrane 1 reinforced by the second membrane reinforcement members 10b, so that the polymer electrolyte membrane 1 will not be damaged.

An opposed pair of sides E4 of the four sides of the main surface of the anode catalyst layer 2a are in direct contact with the main surface F1 of the polymer electrolyte membrane 1, and therefore it may happen that the polymer electrolyte membrane 1 is damaged in this area. However, a cross-leak of the reaction gases does not occur even in such a case, because the main surface F2 side of the polymer electrolyte membrane 1 in this area is provided with the second membrane reinforcement members 10b. Similarly, an opposed pair of sides E3 among the four sides of the main surface of the cathode catalyst layer 2b are in direct contact with the main surface F2 of the polymer electrolyte membrane 1 and therefore it may happen that the polymer electrolyte membrane 1 is damaged in this area. However, a cross-leak of the reaction gases does not occur even in such a case, because the main surface F1 side of the polymer electrolyte membrane 1 in this area is provided with the first membrane reinforcement members 10a.

The catalyst layers 2 are not limited to particular configurations but may be constructed similarly to the catalyst layers of the gas diffusion electrodes of known polymer electrolyte fuel cells so long as the effects of the invention can be achieved. For instance, the catalyst layers 2 may be configured to include electrically-conductive carbon particles (powder) carrying an electrode catalyst and polymer electrolyte having cation (hydrogen ion) conductivity. Alternatively, it may further contain a water-repellent material such as polytetrafluoroethylene. In addition, the anode catalyst layer 2a and the cathode catalyst layer 2b may have the same configuration or different configurations.

In addition, the catalyst layers 2 may be formed by a known production method for the catalyst layers of the gas diffusion electrodes of a polymer electrolyte fuel cell. For example, a liquid (ink for catalyst layer formation) containing at least the constituent material (e.g., the above-mentioned electrically-conductive carbon particles carrying an electrode catalyst and polymer electrolyte) of the catalyst layers 2 and a dispersion medium is prepared and the catalyst layers 2 may be formed from this liquid.

As the polymer electrolyte, a material that is the same or different in kind as or from the above-described material of the polymer electrolyte membrane 1 may be used. As the electrode catalyst, metal particles may be employed. The metal particles are not limited to particular kinds but various types of metals may be used. However, it is preferable in the light of electroreactivity to use at least one or more metals selected from the metal group consisting of platinum, gold, silver, ruthenium, rhodium, palladium, osmium, iridium, chrome, iron, titanium, manganese, cobalt, nickel, molybdenum, tungsten, aluminum, silicon, zinc and tin. Above all, use of platinum or an alloy of platinum and at least one metal selected from the above metal group is desirable. For instance, use of an alloy of platinum and ruthenium is particularly preferable because it stabilizes the activity of the catalyst in the anode catalyst layer 2a.

Preferably, the metal particles used as the electrode catalyst have an average particle diameter of 1 to 5 nm. The reason for this is as follows. Electrode catalysts having an average particle diameter of 1 nm or more is easy to industrially prepare and therefore desirable. In addition, use of an electrode catalyst having an average particle diameter of 5 nm or less makes it easy to ensure sufficient activity per mass of an electrode catalyst, which leads to a reduction in the cost of the polymer electrolyte fuel cell and is therefore desirable.

Preferably, the above electrically-conductive carbon particles have a specific surface area of 50 to 1500 $m^2/g$. The reason for this is that where the specific surface area of the electrically-conductive carbon particles is 50 $m^2/g$ or more, the loading of the electrode catalyst can be easily increased so that the resultant catalyst layers 2 have more adequate output characteristics. In addition, where the specific surface area of the electrically-conductive carbon particles is 1500 $m^2/g$ or less, fine pores having good size can be more easily obtained and coating with the polymer electrolyte can be facilitated, so that the resultant catalyst layers 2 have more adequate output characteristics. From the viewpoint as just discussed, it is more preferable that the specific surface area of the electrically-conductive carbon particles be 200 to 900 $m^2/g$.

Preferably, the above electrically-conductive carbon particles have an average particle diameter of 0.1 to 1.0 μm. The reason for this is as follows. If the average particle diameter of the electrically-conductive carbon particles is 0.1 μm or more, the catalyst layers 2 can ensure more adequate gas diffusivity, which results in more reliable prevention of flooding. If the average particle diameter of the electrically-conductive carbon particles is no more than 1.0 μm, the coated condition of the electrode catalyst coated with polymer electrolyte can be more easily improved and therefore a sufficient area of the electrode catalyst can be coated with polymer electrolyte, which facilitates achievement of higher electrode performance.

Next, the configuration of the MEA (membrane electrode assembly) 5 will be described.

Figure 21A:
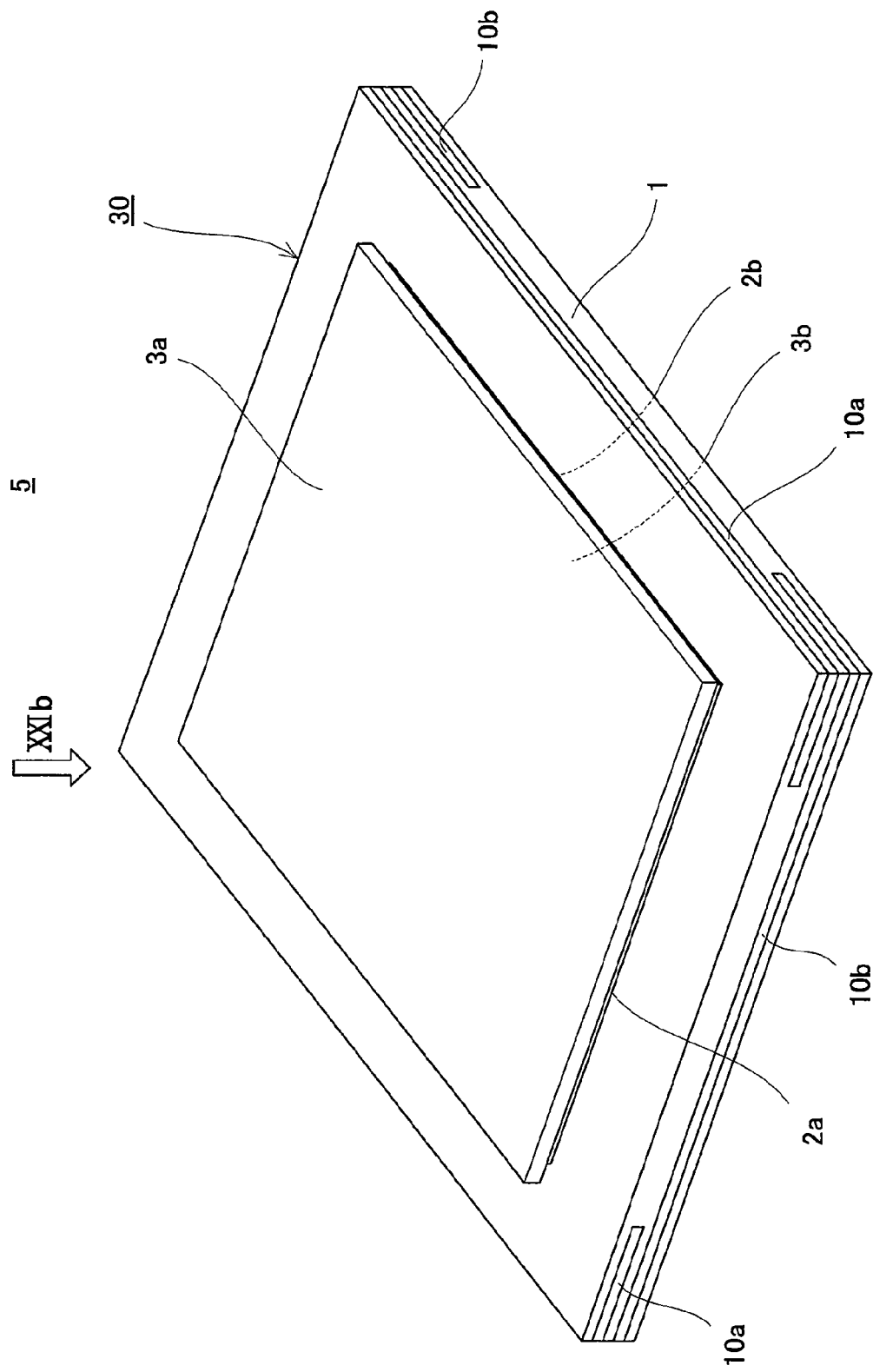
FIG. 21(a) is a perspective view schematically illustrating a general configuration of a membrane electrode assembly (MEA) in the cell of the polymer electrolyte fuel cell shown in FIG. 17.

FIG. 21(a) is a perspective view schematically illustrating a general configuration of the MEA 50 in the cell 100b of the PEFC shown in FIG. 1. FIG. 21(b) is a schematic view when viewed from the direction of arrow XXIb indicated in FIG. 21(a).

As illustrated in FIGS. 21(a), 21(b), in the MEA 5, an anode gas diffusion layer 3a is provided so as to cover the main surface of the anode catalyst layer 2a of the membrane catalyst-layer assembly 30. Likewise, in the MEA 5, a cathode gas diffusion layer 3b is so disposed as to cover the main surface of the cathode catalyst layer 2b. Herein, the anode catalyst layer 2a and the anode gas diffusion layer 3a constitute the anode 4a. The cathode catalyst layer 2b and the cathode gas diffusion layer 3b constitute the cathode 4b. The anode 4a together with the cathode 4b is referred to as electrodes 4. In this embodiment, although the main surfaces of the anode gas diffusion layer 3a and the cathode gas diffusion layer 3b are rectangular in shape, being similar to and slightly larger than the main surfaces of the anode catalyst layer 2a and the cathode catalyst layer 2b respectively, the anode and cathode gas diffusion layers 3a, 3b are not necessarily limited to this, but may be the same in shape as the anode and cathode catalyst layers.

The anode and the cathode gas diffusion layers 3a, 3b (hereinafter referred to as "gas diffusion layers 3") are not limited to any particular configurations but may have the same configuration as of the gas diffusion layers of the gas diffusion electrodes of known polymer electrolyte fuel cells as long as the effects of the invention can be obtained. Additionally, the gas diffusion layers 3 may have the same configuration or different configurations.

As the gas diffusion layers 3, an electrically-conductive substrate of porous structure may be used in order to obtain gas permeability, which substrate is prepared from, for example, a carbon fine powder having high surface area, pore-forming material, carbon paper, carbon cloth or the like. In order to obtain adequate drainage properties, a water-repellent polymer compound or the like, representative examples of which include fluorocarbon resin, may be dispersed in the gas diffusion layers 3. To achieve adequate electron conductivity, the gas diffusion layers 3 may be formed from an electron-conductive material such as carbon fiber, metal fiber or carbon fine powder.

Further, a water-repellent carbon layer constituted by a water-repellent polymer compound and carbon powder may be formed between the anode gas diffusion layer 3a and the anode catalyst layer 2a and between the cathode gas diffusion layer 3b and the cathode catalyst layer 2b. This makes it possible to more easily and reliably perform control over the water in the MEA 5 (i.e., keeping of the water required for maintaining the good properties of the MEA 5 and quick discharge of unnecessary water).

Next, the parts of the configuration of the cell 100b, which have been skipped in the above description, will be explained.

As shown in FIG. 17, a pair of gaskets 11 made of fluorocarbon rubber are disposed around the anode 4a and cathode 4b, respectively, of the MEA 5 so as to sandwich the polymer electrolyte membrane 1. This prevents leakage of the fuel gas, air and oxidizing gas to the outside of the cell 100b and mixing of these gases within the cell 100b. Although not shown in FIG. 17, the peripheral portions of the polymer electrolyte membrane 1, the first and second membrane reinforcement members 10a, 10b and the gaskets 11 are properly provided with manifold holes such as a fuel gas supply manifold hole composed of a through hole extending in a thickness direction.

The electrically-conductive anode separator 6a and cathode separator 6b are disposed so as to sandwich the MEA 5 and the gaskets 11. These anode separator 6a and cathode separator 6b are made of a resin-impregnated graphite sheet prepared by impregnating phenol resin into a graphite sheet and curing it. The anode separator 6a and cathode separator 6b may be made of a metallic material such as SUS. With the anode separator 6a and the cathode separator 6b, the MEA 5 is mechanically fixed and the MEAs 5 of adjacent cells are electrically serially connected.

Formed on the inner surface (that is in contact with the MEA 5) of the anode separator 6a is a groove-like fuel gas flow passage 7 for allowing the flow of the fuel gas which flow passage 7 assumes, for example, a serpentine shape. Formed on the outer surface (that is not in contact with the MEA 5) of the anode separator 6a is a groove-like heating medium flow passage 9 for allowing the flow of a heating medium, which flow passage 9 assumes, for instance, a serpentine shape. Although not shown in FIG. 17, the peripheral portion of the anode separator 6a is provided with manifold holes such as the fuel gas supply manifold hole composed of a through hole extending in a thickness direction.

Formed on the inner surface (that is in contact with the MEA 5) of the cathode separator 6b is a groove-like oxidizing gas flow passage 8 for allowing the flow of the oxidizing gas, which flow passage 8 assumes, for instance, a serpentine shape. Like the anode separator 6a, the outer surface (that is not in contact with the MEA 5) of the cathode separator 6b is provided with the groove-like heating medium flow passage 9 for allowing the flow of the heating medium, which flow passage 9 assumes, for instance, a serpentine shape. Although not shown in FIG. 17, the peripheral part of the cathode separator 6b is provided with manifold holes such as the fuel gas supply manifold hole composed of a through hole extending in a thickness direction, similarly to the anode separator 6a.

Although the fuel gas flow passage 7, the oxidizing gas flow passage 8 and the heating medium flow passage 9 are serpentiform in this embodiment, the shape of these flow passages are not limited to this. These flow passages may take any shapes as long as they are configured to allow the reaction gases and the heating medium to flow in the substantially entire region of the main surfaces of the anode and cathode separators 6a, 6b.

The cells 100b thus formed are stacked in their thickness direction, thereby forming a stack of cells 100b. When stacking the cells 100b, the manifold holes such as the fuel gas supply manifold holes provided in the anode separators 6a, the cathode separators 6b and the gaskets 11 are coupled together in the thickness direction, so that the manifolds such as the fuel gas supply manifold are respectively formed. End plates having a power collector plate and an insulating plate respectively are disposed at the ends, respectively, of the stack of cells 100b and secured by specified clamps to form the stack (PEFC).

Next, an MEA production method for the PEFC of this embodiment will be described. It should be noted that the production of cells and a stack (PEFC) using the MEAs produced by the process described below is not limited to any particular methods but known PEFC production techniques can be employed. Therefore, a detailed description thereof is omitted herein.

First, a production method of the membrane catalyst-layer assembly 30 will be described.

Figure 22:
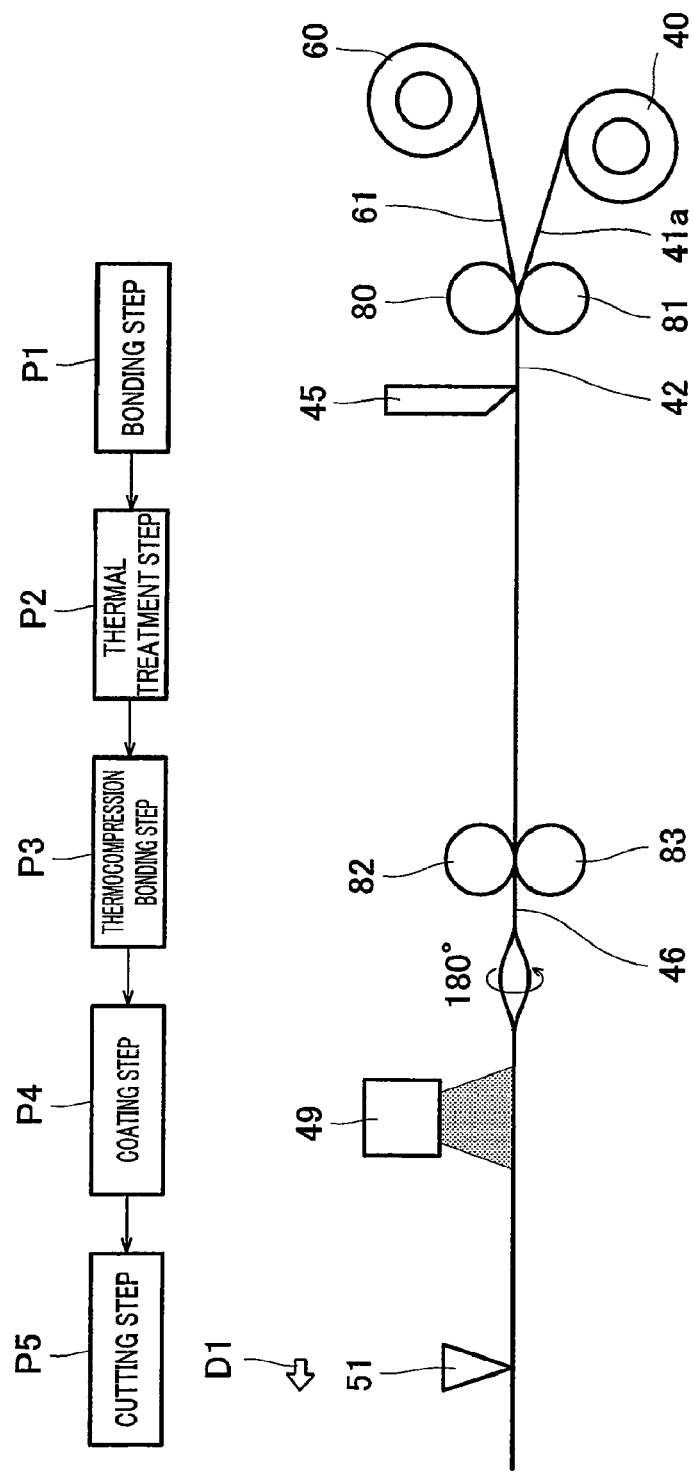
FIG. 22 is a schematic view generally illustrating a part of a series of steps and a production line for producing a membrane catalyst-layer assembly.

FIG. 22 is a schematic view generally illustrating a part of a series of steps (processing area) and a production line for producing the membrane catalyst-layer assembly.

As illustrated in FIG. 22, the membrane catalyst-layer assembly 30 shown in FIG. 20(a) is produced by performing a bonding step P1 for bonding a polymer electrolyte membrane tape and a membrane reinforcement member tape to each other to thereby form a membrane membrane-reinforcement-member assembly tape; a thermal treatment step P2 for drying the membrane membrane-reinforcement-member assembly tape; a thermocompression bonding step P3 for thermally compression bonding the membrane membrane-reinforcement-member assembly tape; a coating step P4 for coating the membrane membrane-reinforcement-member assembly tape with a catalyst layer; and a cutting step P5 for cutting the membrane catalyst-layer assembly tape into a specified length. With this process, the MEA 5 shown in FIG. 17 can be easily mass-produced at low cost.

First, the bonding step P1 will be concretely explained.

Figure 23:
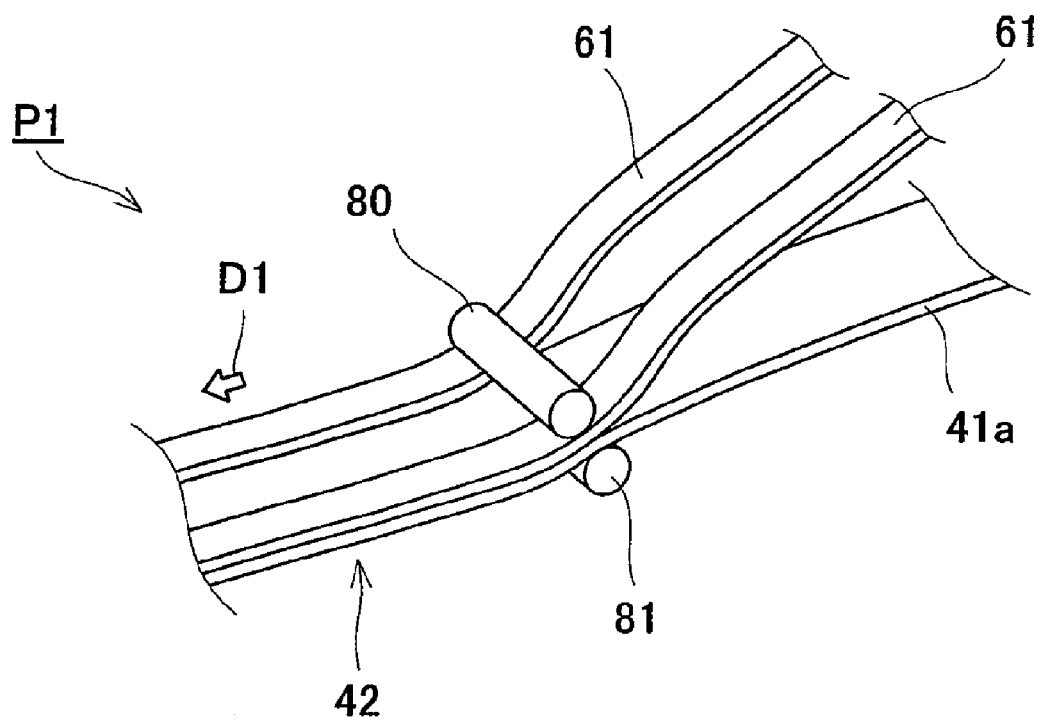
FIG. 23 is a schematic view depicted for the purpose of describing a bonding step P1 in a production process of the membrane catalyst-layer assembly.
Figure 24:
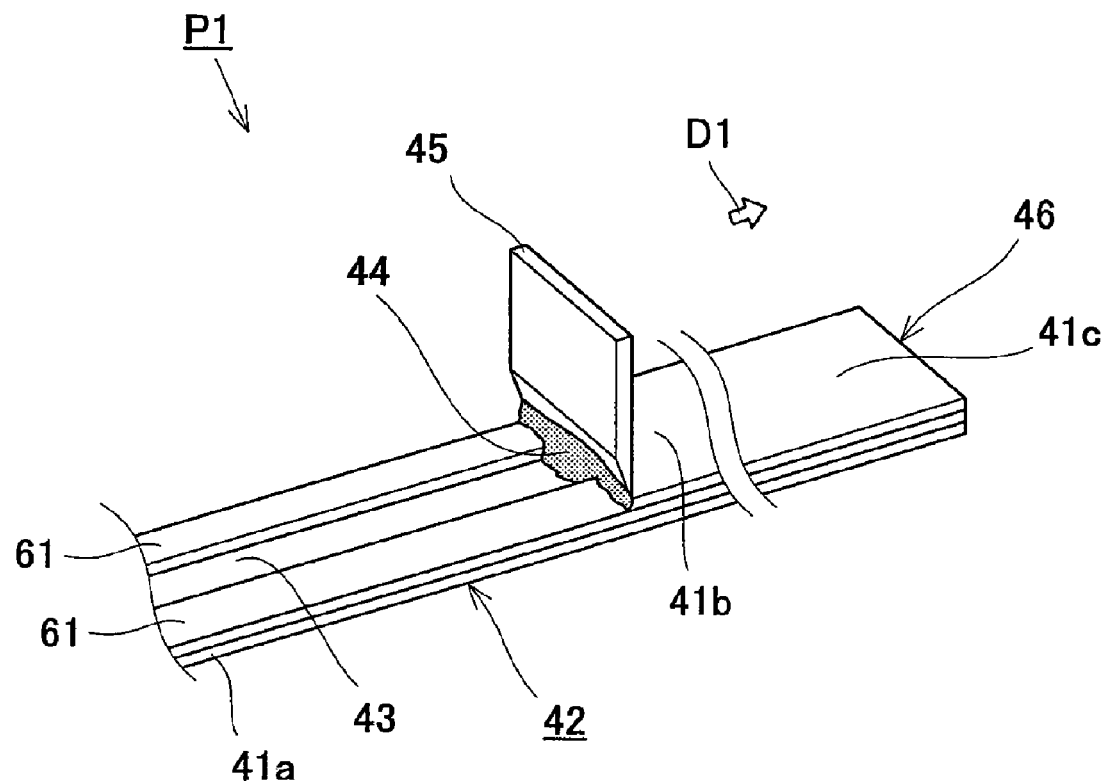
FIG. 24 is a schematic view depicted for the purpose of describing a bonding step P1 in the production process of the membrane catalyst-layer assembly.

FIGS. 23 and 24 are schematic views depicted in order to describe the bonding step P1 in the production process of the membrane catalyst-layer assembly 30.

First, a polymer electrolyte membrane roll 40 into which a long polymer electrolyte membrane tape 41a (that becomes the polymer electrolyte membrane 1 shown in FIG. 17 after cutting) is rolled up and membrane reinforcement member rolls 60 into which membrane reinforcement member tapes 61 (that become the first and second membrane reinforcement members 10a, 10b shown in FIG. 1 after cutting) are rolled up respectively are produced by use of a known thin film production technique.

Then, as shown in FIG. 23, the polymer electrolyte membrane tape 41a is paid out from the polymer electrolyte membrane roll 40 whereas the pair of membrane reinforcement member tapes 61 are paid out from the pair of membrane reinforcement member rolls 60, and these tapes are guided into the thermocompression bonding machine (not shown in FIG. 23) having a pair of rollers 80, 81. At that time, relative positioning of the polymer electrolyte membrane tape 41a and the pair of membrane reinforcement member tapes 61 is carried out such that the pair of membrane reinforcement member tapes 61 are placed at both sides of the polymer electrolyte membrane tape 41a. Then, in the thermocompression bonding machine, the polymer electrolyte membrane tape 41a and the pair of membrane reinforcement member tapes 61 are bonded together while passing through the space between the preheated rollers 80, 81 in a pay-out direction D1. In this way, a long membrane membrane-reinforcement-member assembly tape 42 is formed.

Before brought into contact with the polymer electrolyte membrane tape 41a, the pair of membrane reinforcement member tapes 61 may be subjected to pretreatment in which their surfaces (that serve as contact faces) are coated with an adhesive agent. In this case, the compression process may be performed with the rollers 80, 81 preheated as mentioned above or alternatively, only the compression process may be performed without preheating the rollers 80, 81. In this case, it is preferable to use the adhesive agent that does not deteriorate the discharge characteristic of the cell 100b. Examples of the adhesive agent include liquids in which a polymer electrolyte material (such as the materials listed earlier as examples of the constituent material of the polymer electrolyte membrane 1) is contained in a dispersion medium or a solvent, the polymer electrolyte material being of the same type as of the polymer electrolyte membrane tape 41a or different type from the same (in the latter case, the polymer electrolyte material has affinity so that it can be thoroughly integrated with the polymer electrolyte membrane tape 41a).

Then, a cast membrane 41b of polymer electrolyte is formed on the membrane membrane-reinforcement-member assembly tape 42, using a blade 45 as illustrated in FIG. 24. Specifically, the cast membrane 41b is formed in the groove-like concave portion 43 defined by the polymer electrolyte membrane tape 41a and the pair of membrane reinforcement member tapes 61 and over the membrane reinforcement member tapes 61, such that the cast membrane 41b is substantially equal in width to the polymer electrolyte membrane tape 41a and its upper surface is flat. More concretely, polymer electrolyte is brought into a liquid state by water substitution, alcohol dispersion or the like to thereby prepare a polyelectrolyte solution 44 having a proper degree of viscosity. After an adequate amount of the polyelectrolyte solution 44 is put on the concave portion 43 and on the pair of membrane reinforcement member tapes 61, the lower end of the blade 45 is fixed at a position (that is a specified distance apart from the membrane reinforcement member tapes 61) above the membrane reinforcement member tapes 61 of the membrane membrane-reinforcement-member assembly tape 42. Then, the membrane membrane-reinforcement-member assembly tape 42 is moved in the pay-out direction D1, thereby forming the polymer electrolyte cast membrane 41b with a specified film thickness between the lower end of the blade 45 and the membrane membrane-reinforcement-member assembly tape 42.

Next, the thermal treatment step P2 will be concretely explained.

In the thermal treatment step P2, the liquid contained in the cast membrane 41b, which is the polymer electrolyte membrane formed in the bonding step P1, is removed by performing a thermal treatment with a proper means (e.g., a treatment in which the membrane membrane-reinforcement-member assembly tape 42 is allowed to pass through a drying furnace controlled to have a temperature at which the dispersing agent containing polymer electrolyte dispersed therein evaporates), so that the polymer electrolyte membrane tape 41c is formed in the concave portion 43 and over the pair of membrane reinforcement member tapes 61 of the membrane membrane-reinforcement-member assembly tape 42. As described earlier, the surface of the polymer electrolyte membrane tape 41c is such that the portion laid over the pair of membrane reinforcement member tapes 61 of the membrane membrane-reinforcement-member assembly tape 42 is flush with the portion filled in the concave portion 43 of the tape 42.

Next, the thermocompression bonding step P3 will be concretely explained.

In the thermocompression bonding step P3, thermocompression bonding is carried out to completely integrate the polymer electrolyte membrane tape 41c formed in the thermal treatment step P2 with the polymer electrolyte membrane tape 42a. Concretely, the membrane membrane-reinforcement-member assembly tape 42 and the polymer electrolyte membrane tape 41c are allowed to pass through the thermocompression bonding machine (not shown in FIG. 6) having a pair of rollers 82, 83. Herein, the rollers 82, 83 are preheated to a temperature equal to or higher than the glass transition temperature (Tg) of the polymer electrolyte that constitutes the polymer electrolyte membrane tape 41a and the polymer electrolyte membrane tape 41c. Accordingly, the membrane membrane-reinforcement-member assembly tape 42 is completely integrated with the polymer electrolyte membrane tape 41c, that is, the polymer electrolyte membrane tape 41a and the pair of membrane reinforcement member tapes 61 are completely integrated with the polymer electrolyte membrane tape 41c, while they are passing through the space between the rollers 82, 83 of the thermocompression bonding machine in the pay-out direction D1. In this way, a long membrane membrane-reinforcement-member assembly tape 46 is formed.

Alternatively, the membrane membrane-reinforcement-member assembly tape 46 may be formed in the following way.

Figure 25:
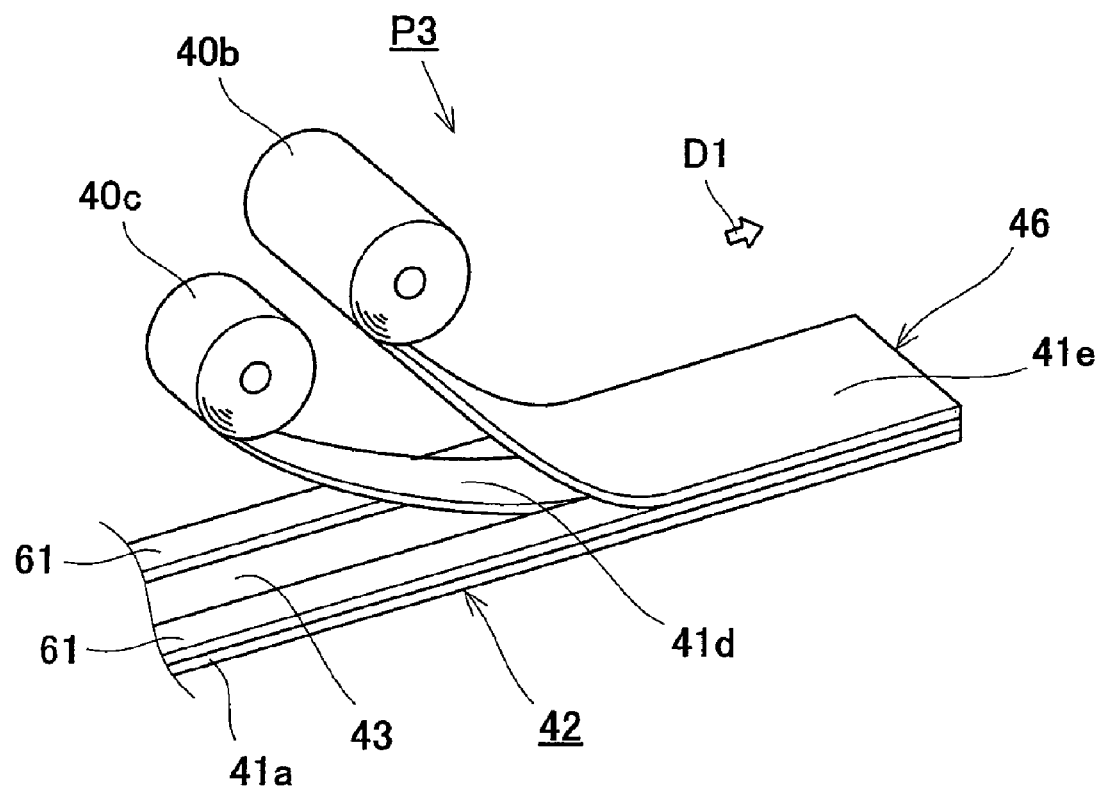
FIG. 25 is a schematic view depicted for the purpose of describing another production method for forming the membrane catalyst-layer assembly tape.

FIG. 25 is a schematic view depicted for the purpose of describing another production method for forming the membrane membrane-reinforcement-member assembly tape.

First, as shown in FIG. 25, polymer electrolyte membrane rolls 40c, 40b into which long polymer electrolyte membrane tapes 41d, 41e are rolled up respectively are produced with a known thin film production technique. At that time, the polymer electrolyte membrane tape 41d is formed so as to have the same width as of the concave portion 43 of the membrane membrane-reinforcement-member assembly tape 42. And, the polymer electrolyte membrane tape 41e is formed so as to have the same width as of the membrane membrane-reinforcement-member assembly tape 42.

Next, as shown in FIG. 25, the polymer electrolyte membrane tape 41d is paid out from the polymer electrolyte membrane roll 40c to be fitted in the concave portion 43 of the membrane membrane-reinforcement-member assembly tape 42. Then, the polymer electrolyte membrane tape 41e is paid out from the polymer electrolyte membrane roll 40d to be laid over the membrane reinforcement member tapes 61 of the membrane membrane-reinforcement-member assembly tape 42 and over the polymer electrolyte membrane tape 41d. Thereafter, the membrane membrane-reinforcement-member assembly tape 42 and the polymer electrolyte membrane tapes 41e, 41d are guided into the thermocompression bonding machine (not shown in FIG. 25). Thereby, the polymer electrolyte membrane tape 41a of the membrane membrane-reinforcement-member assembly tape 42 is bonded to and completely integrated with the polymer electrolyte membrane tape 41d in the thermocompression bonding machine. Also, the membrane reinforcement member tapes 61 of the membrane membrane-reinforcement-member assembly tape 42 are bonded to and completely integrated with the polymer electrolyte membrane tape 41d and the polymer electrolyte membrane tape 41e in the thermocompression bonding machine. In this way, the long membrane membrane-reinforcement-member assembly tape 46 is formed.

In this embodiment, the membrane membrane-reinforcement-member assembly tape 46 may be formed using a roll knife coater (comma coater) as described in the first embodiment (see FIGS. 10 and 11). In this case, the surface of the substrate sheet 84 is first coated with the polyelectrolyte solution 44 which is then cured by a specified drying method to form the polymer electrolyte membrane tape 41e on the surface of the substrate sheet 84. The substrate membrane-reinforcement-member assembly tape 86, in which the pair of membrane reinforcement member tapes 61 are affixed to both sides of the upper surface of the polymer electrolyte membrane tape 41e formed on the substrate sheet 84, is prepared whereby the substrate polymer-electrolyte-membrane tape 87 is produced similarly to the first embodiment. Subsequently, the substrate sheet 84 is peeled off the substrate polymer-electrolyte-membrane tape 87 by a proper means, thereby forming the membrane membrane-reinforcement-member assembly tape 46.

Next, the coating step P4 will be concretely explained.

Figure 26:
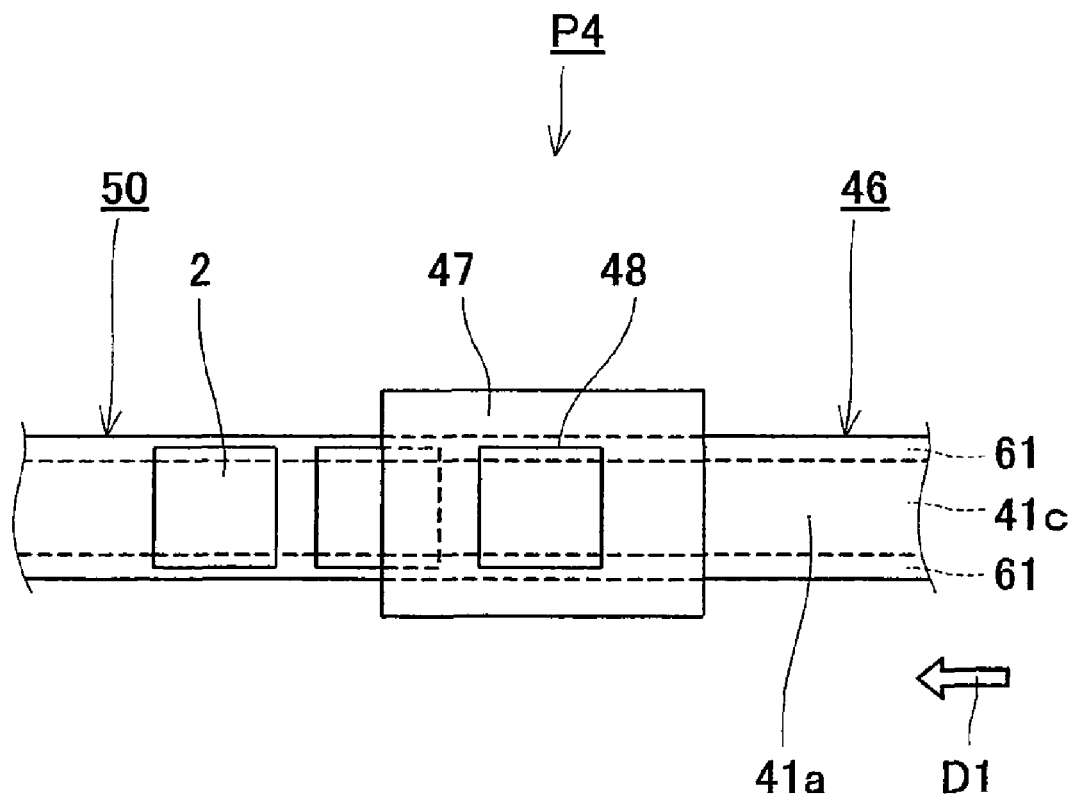
FIG. 26 is a schematic view depicted for the purpose of describing a coating step P4 in the production process of the membrane catalyst-layer assembly.

FIG. 26 is a schematic view depicted for the purpose of describing the coating step P4 in the production process of the membrane catalyst-layer assembly.

First, the structure of the area where the coating step P4 takes place will be described.

As illustrated in FIG. 26, the area where the coating step P4 is performed is provided with the mask 47 with the opening 48; a specified supporting means (e.g., supporting table) that is not shown in FIG. 26 and for supporting the membrane membrane-reinforcement-member assembly tape 46 from its main surface (hereinafter referred to as "rear surface") on the side where the pair of membrane reinforcement member tapes 61 are arranged; and the catalyst layer forming apparatus 49 (see FIG. 22). Herein, the opening 48 is designed to correspond, in shape, to the main surfaces of the catalyst layers 2 shown in FIGS. 20(a) and 20(b). The catalyst layer forming apparatus 49 has a mechanism for forming the catalyst layers 2 on the surface of the membrane membrane-reinforcement-member assembly tape 46 by coating or spraying an ink for catalyst layer formation. As this mechanism, known mechanisms for forming the catalyst layers of the gas diffusion layers of a polymer electrolyte fuel cell may be employed. Specifically, the mechanism is designed to perform a technique such as spraying, spin coating, the doctor blade method, die coating and screen printing.

Next, the processing content of the coating step P4 will be concretely explained.

After proceeding to the coating step P4 area, the membrane membrane-reinforcement-member assembly tape 46 formed in the thermocompression bonding step P3 is reversely rotated by e.g., a specified rotation mechanism and then once stopped. Then, the membrane membrane-reinforcement-member assembly tape 46 is fixedly held between the mask 47 and the supporting table not shown in FIG. 26.

Thereafter, the catalyst layer forming apparatus 49 is put into operation so that the ink for catalyst layer formation is poured from a position above the opening 48 of the mask 47, thereby forming a catalyst layer 2 on the main surface of the polymer electrolyte membrane tape 41a of the membrane membrane-reinforcement-member assembly tape 46 such that the catalyst layer 2 overlaps at least a part of the main surfaces of the pair of membrane reinforcement member tapes 61. After the formation of the catalyst layer 2, the mask 47 and the supporting table are retreated from the membrane membrane-reinforcement-member assembly tape 46. The membrane catalyst-layer assembly tape 50 thus formed continuously moves along the pay-out direction D1. In this way, the catalyst layers 2 are formed in the membrane catalyst-layer assembly tape 50, being arranged at specified intervals in a longitudinal direction of the tape 50.

The catalyst layers 2 are properly adjusted in terms of composition, dryness and others so as to have adequate flexibility. Further, a treatment (e.g., preheating of the supporting table to dry the dispersing agent contained in the ink for catalyst layer formation) is applied for the purpose of preventing the catalyst layers 2 from coming off the polymer electrolyte membrane tape 41a even if the membrane catalyst-layer assembly tape 50 turns upside down when forming the catalyst layers 2. It should be noted that at least one of desired drying treatments that include e.g., heating, air blasting and deairing may be properly applied whenever a catalyst layer 2 is formed.

Next, the cutting step P5 will be concretely explained.

First, the membrane catalyst-layer assembly tape 50 and another membrane catalyst-layer assembly tape 50 are prepared. Then, these tapes 50 are arranged such that their longitudinal directions are substantially perpendicular to each other and their rear surfaces are opposed to each other (i.e., the membrane reinforcement member tapes 61 of one tape 50 face the membrane reinforcement member tapes 61 of the other tape 50). The pair of membrane catalyst-layer assembly tapes 50 with their rear surfaces overlapping each other are guided into the cutting machine 51 having a thermocompression bonding mechanism and a cutting mechanism. Then, the rear surface of one membrane catalyst-layer assembly tape 50 and the rear surface of the other membrane catalyst-layer assembly tape 50, which tapes 50 have been guided into the cutting machine 51, are thermally compression bonded to each other through the opposed polymer electrolyte membrane tapes 41c by the thermocompression bonding mechanism. Then, the tapes 50 are cut into a predetermined size by the cutting mechanism of the cutting machine 51, whereby the membrane catalyst-layer assembly 30 shown in FIGS. 20(a), 20(b) is obtained. It is also possible to form the membrane catalyst-layer assembly 30 by cutting the membrane catalyst-layer assembly tapes 50 into a predetermined size and then bonding the pair of cut membrane catalyst-layer assembly tapes 50.

In the production line of the membrane catalyst-layer assembly according to this embodiment shown in FIG. 22, the polymer electrolyte membrane tape 41a is moved in the form of a continuous tape until the membrane catalyst-layer assembly tape 50 is formed. In this embodiment, in order to adequately move the polymer electrolyte membrane tape 41*a* in the pay-out direction D1, the production line of the membrane catalyst-layer assembly includes, in place, a traction mechanism such as capstans and pairs of rollers for traction of the tape; a tension application mechanism such as tensioners for applying proper tension to the tape; and a temporary seat holding mechanism and seat feeding mechanism such as dancer rollers for temporarily stopping the tape in a predetermined area (e.g., the coating step P4) and then fast-forwarding the tape. These mechanisms are known and therefore a description thereof is omitted herein.

In the cutting step (area) P5, a first membrane catalyst-layer assembly production line crosses a second membrane catalyst-layer assembly production line. In the cutting step P5, the second membrane catalyst-layer assembly tape 50 produced in the second membrane catalyst-layer assembly production line is reversed so as to be perpendicular to the first membrane catalyst-layer assembly seat 50 produced in the first membrane catalyst-layer assembly production line shown in FIG. 22 and then processed as described earlier. The second membrane catalyst-layer assembly production line is exactly the same as the membrane catalyst-layer assembly production line shown in FIGS. 22 to 26. Therefore, a description thereof is omitted herein.

Next, a production method for the MEA 5 will be concretely described.

The gas diffusion layers 3 (e.g., carbon cloth), which have been cut into a proper size, are bonded to the respective main surfaces of their associated catalyst layers 2 of the membrane catalyst-layer assembly 30 obtained in the way described earlier, whereby the MEA 5 is obtained. The MEA 5 may be formed by formation of water-repellent carbon layers by coating the main surfaces of the catalyst layers 2 or the gas diffusion layers 3 with water-repellent carbon layer formation ink beforehand.

It is also possible to form the MEA 5 by bonding the gas diffusion layers 3 to the main surfaces of the catalyst layers 2 of the membrane catalyst-layer assembly tapes 50 before the cutting step P5. In this case, a membrane electrode assembly tape may be formed by bonding a gas diffusion layer 3, which has been cut beforehand, to the main surface of a catalyst layer 2 or, alternatively, by bonding a gas diffusion layer 3 in the form of a tape to the main surface of a catalyst layer 2 and then cutting the bonded layers. Then, a pair of membrane electrode assembly tapes thus obtained are bonded and cut in the manner similar to the above-described cutting step P5, whereby the MEA 5 is formed. The MEA 5 may be formed after the formation of the water-repellent carbon layers by coating the main surfaces of the catalyst layers 2 or the gas diffusion layers 3 with the water-repellent carbon layer formation ink beforehand.

As a comparative example, a production method will be explained, which is generally contemplated to be used in cases where the membrane membrane-reinforcement-member assembly disclosed in Patent Document 2 is mass produced by use of a known thin film laminate production technique.

Figure 27:
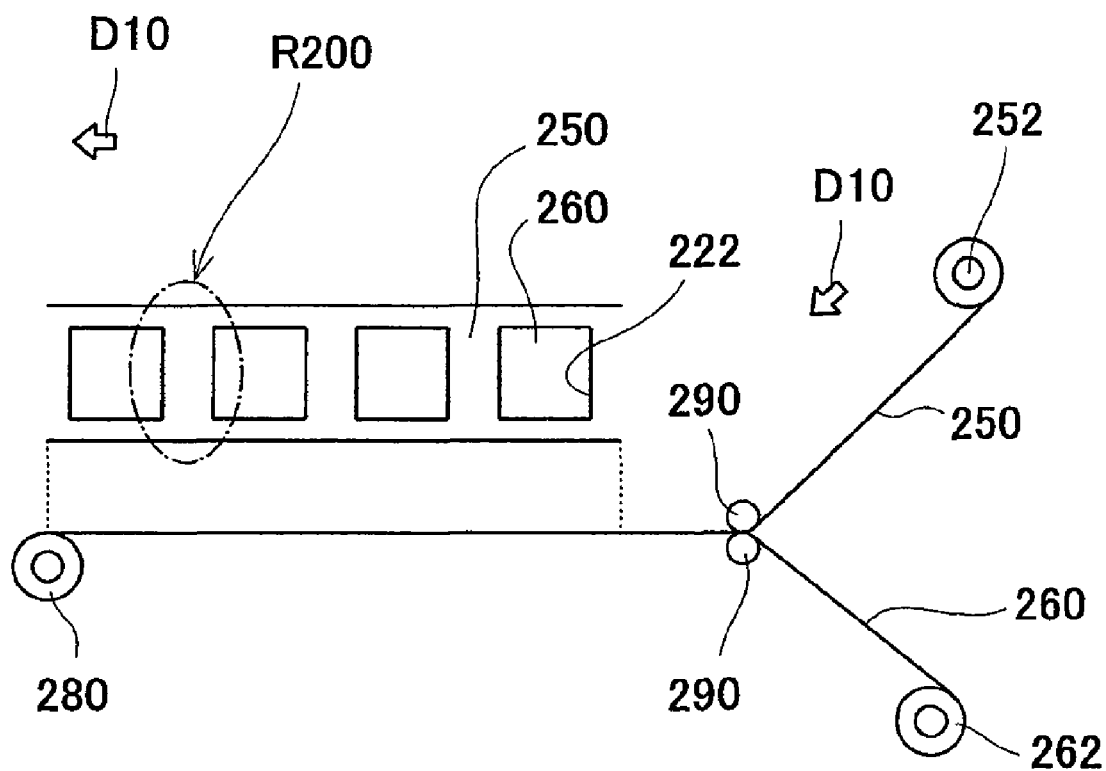
FIG. 27 is an explanatory view illustrating one example of production methods that are generally expected to be employed when intentionally trying to mass produce membrane membrane-reinforcement-member assemblies by means of a known thin film laminate production technique.

FIG. 27 is an explanatory view illustrating one example of production methods that are generally expected to be employed when intentionally trying to mass produce membrane membrane-reinforcement-member assemblies by means of a known thin film laminate production technique.

First, as illustrated in FIG. 27, the solid polymer electrolyte membrane 260, which has been produced in the form of a tape, is rolled up to form the solid polymer electrolyte membrane roll 262. The protective film 250 (a tape-shaped film produced by continuous formation of the protective film 220 shown in FIG. 32), which has been produced in the form of a tape, is rolled up to form the protective film roll 252.

Next, a laminate, in which the protective film 250 in the form of a tape is laminated to at least one of the main surfaces of the tape-shaped solid polymer electrolyte membrane 260, is produced in the way similar to the bonding step P1 of this embodiment described earlier. More specifically, the tape-shaped protective film 250 and the tape-shaped solid polymer electrolyte membrane 260 are paid out from the protective film roll 252 and the solid polymer electrolyte membrane roll 262, respectively and then sandwiched by the pair of rollers 290 to be integrated into a laminate. Then, this integral laminate is rolled up, thereby forming the membrane protective-film assembly roll 280.

During the production of the membrane protective-film assembly roll 280, tension is imposed on the protective film 250 in the pay-out direction D10 of the protective film 250 (i.e., the longitudinal direction of the tape-shaped protective film 250). In this case, when tension is imposed on the protective film 250, portions R200 of the protective film 250, which portions are substantially perpendicular to the direction of the tension imposed, lift up, because the protective film 250 is a very thin film (having a thickness of, e.g., 50 μm or less) and has openings 222 within its main surface. This increases the likelihood that wrinkles will be created in the portions R200 of the protective film 250 in the region between the rollers 290 and the protective film roll 252 when the protective film 250 is pressed by the rollers 290. Further, it becomes highly possible owing to the tension that the portions R200 of the protective film 250 will come off the solid polymer electrolyte membrane 260 in the region between the rollers 290 and the membrane protective-film assembly roll 280.

Therefore, the production method of the solid polymer electrolyte fuel cell disclosed in Patent Document 2 has to adopt a very troublesome, complicated, costly production process in which the protective films are positioned in relation to the solid polymer electrolyte membrane and affixed thereto one by one with a batch method in order to reliably produce fair quality items by avoiding product failure.

In contrast with this, the protective film 250 (shown in FIG. 27) of the third embodiment of the invention does not have the portions R200 that are substantially perpendicular to the direction of the tension imposed on the protective film 250 and likely to lift up when the tension is imposed. Therefore, this embodiment enables it to unfailingly prevent the displacement and peeling off of the membrane reinforcement member tapes 61 when the membrane reinforcement member tapes 61 are bonded to the polymer electrolyte membrane tape 41*a*.

The configuration of the PEFC constructed according to the third embodiment of the invention makes it possible to prevent damage to the polymer electrolyte membrane and a cross-leak of the reaction gases without fail and realize high cost performance mass-production. In addition, like the first and second embodiments, reinforced MEAs can be easily produced, which enables production of inexpensive thin PEFCs.

Fourth Embodiment

Figure 28:
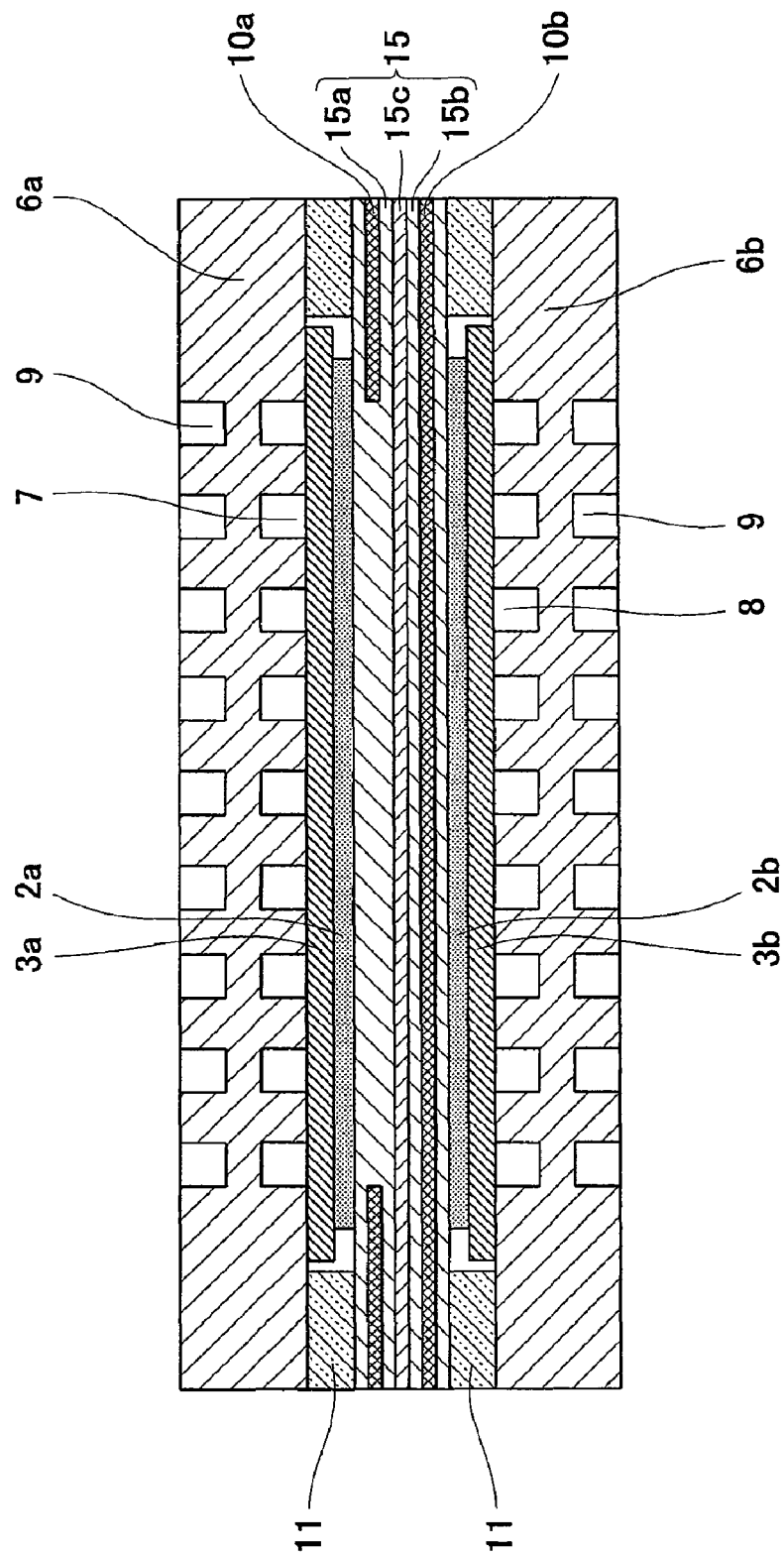
FIG. 28 is a cross-sectional view schematically illustrating a general configuration of a cell provided in a polymer electrolyte fuel cell (PEFC) according to a fourth embodiment of the invention.
Figure 29:
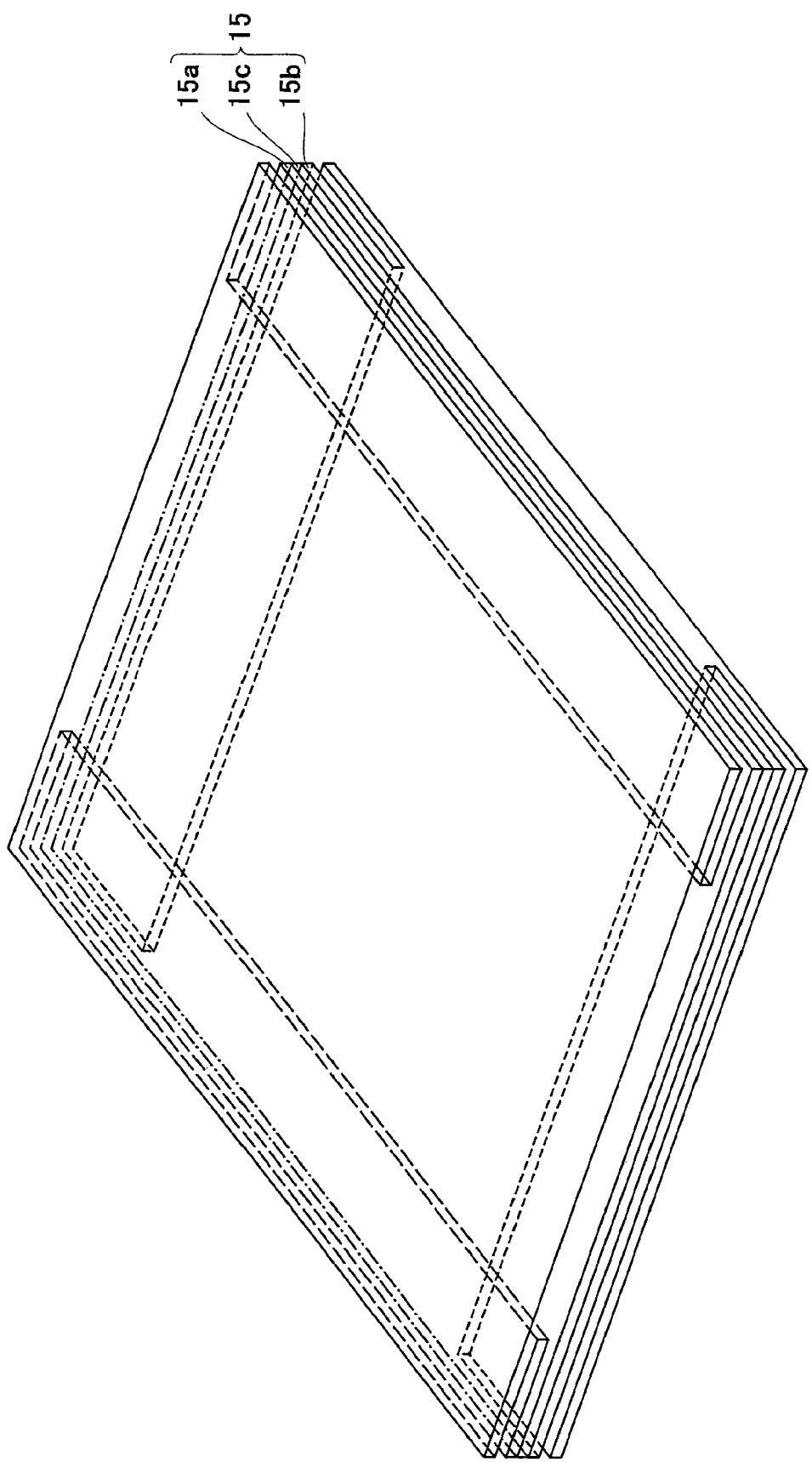
FIG. 29 is a perspective view schematically illustrating a general configuration of a polymer electrolyte membrane/inner reinforcement membrane composite in the cell of the PEFC shown in FIG. 28.

FIG. 28 is a cross-sectional view schematically illustrating a general configuration of a cell provided in a PEFC according to a fourth embodiment of the invention. FIG. 29 is a perspective view schematically illustrating a general configuration of a polymer electrolyte membrane/inner reinforcement membrane composite in the cell of the polymer electrolyte fuel cell shown in FIG. 28.

The cell of the PEFC according to the fourth embodiment basically the same in configuration as the cell 100b of the PEFC according to the third embodiment except the following points.

As shown in FIGS. 28, 29, the cell of the PEFC according to this embodiment has a polymer electrolyte membrane/inner reinforcement membrane composite 15 in place of the polymer electrolyte membrane 1. It should be noted that the "polymer electrolyte membrane" stated in Claims includes this polymer electrolyte membrane/inner reinforcement membrane composite 15. The polymer electrolyte membrane/inner reinforcement membrane composite 15 has a pair of polymer electrolyte membranes 15a, 15b in the form of a small strip and an inner reinforcement membrane 15c in the form of a small strip. Herein, the polymer electrolyte membranes 15a, 15b and 15c are so arranged that their main surfaces are opposed to each other. As illustrated in FIG. 29, the polymer electrolyte membranes 15a, 15b are each provided with cavity portions extending along an opposed pair of sides thereof and these cavity portions are arranged in a parallelogrammatic arrangement state when viewed in a thickness direction (the direction of a normal line). The first membrane reinforcement members 10a and the second membrane reinforcement members 10b are placed in the cavity portions, respectively. In this embodiment, the inner reinforcement membrane 15 is sandwiched between the polymer electrolyte membranes 15a, 15b.

Next, the structure of the inner reinforcement membrane 15c will be described in detail with reference to FIG. 30.

Figure 30:
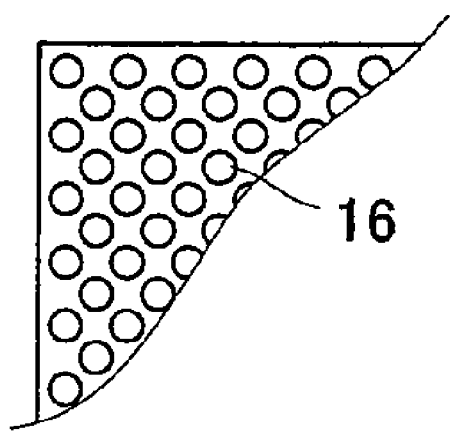
FIG. 30 is a schematic view illustrating a general configuration of an inner reinforcement membrane in the polymer electrode membrane/inner reinforcement membrane composite shown in FIG. 29.
Figure 31:
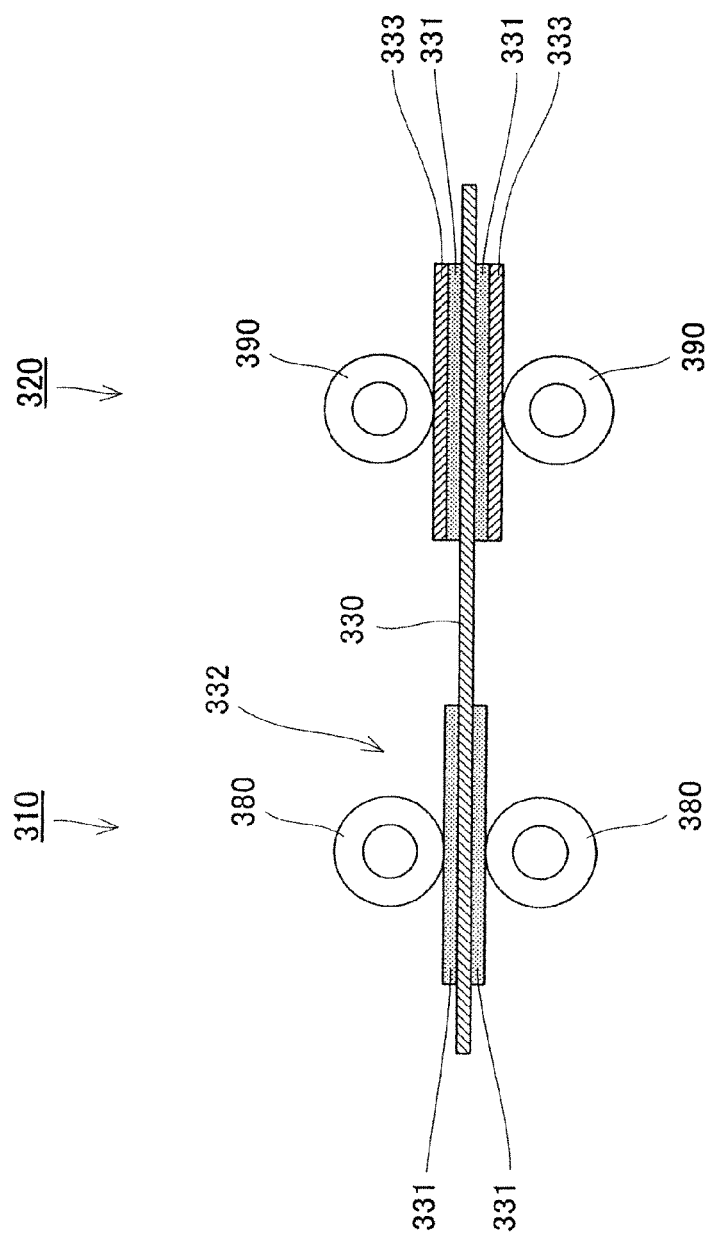
FIG. 31 is a process chart outlining in a schematic manner production steps of a membrane electrode assembly (i.e., a catalyst layer coating step and a diffusion layer integration step) disclosed in Patent Document 1.

FIG. 30 is a schematic view illustrating a general configuration of the inner reinforcement membrane in the polymer electrolyte membrane/inner reinforcement membrane composite shown in FIG. 29. It should be noted that FIG. 30 shows only a part of the inner reinforcement membrane.

As illustrated in FIG. 30, the inner reinforcement membrane 15c has a plurality of openings (through holes) 16 that run through the inner reinforcement membrane 15c in its thickness direction. The openings 16 are filled with polymer electrolyte whose components are the same as or different from the components of the polymer electrolyte membranes 15a, 15b. Herein, the ratio of the area of the openings 16 to the area of the main surface of the inner reinforcement membrane 15c (i.e., opening ratio) is preferably within the range of from 50% to 90%. By setting the opening ratio to 50% or more, sufficient ion conductivity can be easily obtained. By limiting the opening ratio to 90% or less, sufficient mechanical strength can be easily obtained in the inner reinforcement membrane 15c. The openings 16 provided in the inner reinforcement membrane 15c may be very fine pores (having a diameter of e.g., several tens of micron meters). Even in such a case, the opening ratio (porosity) is preferably within the range of from 50% to 90% for the reason discussed above.

The inner reinforcement membrane 15c may be a resinous film or stretched porous film (e.g., "GoreSelect®" produced by Japan Gore-Tex Inc.).

In the light of chemical stability and mechanical stability, the above inner reinforcement membrane 15c is preferably made of at least one or more synthetic resins selected from the resin group consisting of polytetrafluoroethylene; fluoroethylene-propylene copolymers; tetrafluoroethylene-perfluoroalkoxyethylene copolymers; polyethylene; polypropylene; polyether amide; polyetherimide; polyether ether ketone; polyethersulfone; polyphenylene sulfide; polyarylate; polysulfide; polyimide; and polyimide-amide.

The inner reinforcement membrane 15c may be formed such that a sheet-like polymer electrolyte membrane contains at least either fiber-like reinforcement particles or spherical reinforcement particles to thereby increase the strength of the polymer electrolyte membrane. Examples of the constituent material of the reinforcement particles include the resins listed earlier as the material of the inner reinforcement membrane 15c.

The production method of the polymer electrolyte membrane/inner reinforcement membrane composite 15 is not limited to any particular techniques but known thin film production techniques may be employed. The cells of this PEFC can be produced with a method that is the same as the cell production method described earlier except the use of the polymer electrolyte membrane/inner reinforcement membrane composite 15.

While the third and fourth embodiments of the invention have been described in details, the present invention is not limited to these embodiments.

For instance, whereas the third and fourth embodiments have been discussed in the context of a configuration in which the outer peripheral portions (edges) of the first membrane reinforcement members and the second membrane reinforcement members are in line with the peripheral portion (edges) of the polymer electrolyte membrane (that is, the outer edges of the first or second membrane reinforcement members overlap the edges of the polymer electrolyte membrane and the edges of the polymer electrolyte membrane do not stick out when viewed in a direction substantially normal to the main surfaces of the polymer electrolyte membrane), the invention is not limited to such a configuration. As long as the effects of the invention can be achieved, other configurations may be employed. For instance, the edges of the first or second membrane reinforcement members may partially or entirely stick out from the edges of the polymer electrolyte membrane, or alternatively, the edges of the polymer electrolyte membrane may partially or entirely stick out from the edges of the first or second membrane reinforcement members.

In the third and fourth embodiments, the polymer electrolyte membranes 1, 15a, 15b and the inner reinforcement membrane 15c may be approximately quadrilateral in shape. Precisely speaking, in the third and fourth embodiments, the internal angles of the four corners of each of the polymer electrolyte membranes and the inner reinforcement membrane may not be 90 degrees. Concretely, the four sides of these membranes may be slightly curved or the four corners may be chamfered.

INDUSTRIAL APPLICABILITY

The membrane membrane-reinforcement-member assembly, membrane catalyst-layer assembly and membrane electrode assembly according to the invention find industrial applications as the parts of mass-producible polymer electrolyte fuel cells.

In addition, the polymer electrolyte fuel cell of the invention is expected to be suitably used as a main or auxiliary power source for mobile objects such as automobiles and for distributed (on-site type) power generation systems (household cogeneration systems).

What is claimed is:
1. Assembly comprising:
a polymer electrolyte membrane that is substantially quadrilateral in shape and has a first main surface and a second main surface;
a pair of first membrane reinforcement members that respectively extend along one opposed pair of sides of four sides of said polymer electrolyte membrane and are embedded in said polymer electrolyte membrane such that main surfaces of the pair of first membrane reinforcement members are unexposed; and a pair of second membrane reinforcement members that respectively extend along the other opposed pair of sides of four sides of said polymer electrolyte membrane and are embedded in said polymer electrolyte membrane such that main surfaces of the pair of second membrane reinforcement members are unexposed, wherein said pair of first membrane reinforcement members and said pair of second membrane reinforcement members are arranged such that said pair of first membrane reinforcement members are positioned closer to the first main surface than said pair of second membrane reinforcement members, and are so embedded as to overlap each other in four corners of said polymer electrolyte membrane, when viewed in a thickness direction of said polymer electrolyte membrane.

2. The assembly as set forth in claim 1,
wherein said pair of first membrane reinforcement members and said pair of second membrane reinforcement members are embedded such that the respective main surfaces are in contact with each other in the four corners of said polymer electrolyte membrane.

3. The assembly as set forth in claim 1,
wherein said pair of first membrane reinforcement members and said pair of second membrane reinforcement members are embedded such that the respective main surfaces are not in contact with each other in the four corners of said polymer electrolyte membrane.

4. The assembly as set forth in claim 3,
wherein said pair of first membrane reinforcement members and said pair of second membrane reinforcement members are embedded such that the respective main surfaces are not in contact with each other in the four corners of said polymer electrolyte membrane, with said polymer electrolyte membrane sandwiched therebetween.

5. The assembly as set forth in claim 1,
wherein said pair of first membrane reinforcement members are embedded in said polymer electrolyte membrane such that a first portion of the first main surface is substantially flush with a second portion of the first main surface, the first portion being located on said pair of first membrane reinforcement members whereas the second portion is an area other than the first portion, and wherein said pair of second membrane reinforcement members are embedded in said polymer electrolyte membrane such that a first portion of the second main surface is substantially flush with a second portion of the second main surface, the first portion being located on said pair of second membrane reinforcement members whereas the second portion is an area other than the first portion.

6. The assembly as set forth in claim 1,
wherein said polymer electrolyte membrane has therein an inner reinforcement membrane having a through hole that serves as an ion conduction path.

7. The assembly as set forth in claim 6,
wherein said pair of first membrane reinforcement members and said pair of second membrane reinforcement members are embedded so as to sandwich said inner reinforcement membrane therebetween in the four corners of said polymer electrolyte membrane.

8. A membrane catalyst-layer assembly comprising,
the assembly as set forth in claim 1;
a first catalyst layer that is so arranged as to cover the first main surface of said polymer electrolyte membrane; and
a second catalyst layer that is so arranged as to cover the second main surface of said polymer electrolyte membrane, wherein said first catalyst layer is arranged to overlap a part of the main surfaces of said pair of first membrane reinforcement members and a portion of said polymer electrolyte membrane which portion is located between said pair of first membrane reinforcement members, when viewed in a thickness direction of said polymer electrolyte membrane, and wherein said second catalyst layer is arranged to overlap a part of the main surfaces of said pair of second membrane reinforcement members and a portion of said polymer electrolyte membrane which portion is located between said pair of second membrane reinforcement members, when viewed in the thickness direction of said polymer electrolyte membrane.

9. The membrane catalyst-layer assembly as set forth in claim 8,
wherein said first catalyst layer and said second catalyst layer are arranged such that their entire peripheral portions overlap said first membrane reinforcement members and said second membrane reinforcement members, when viewed in the thickness direction of said polymer electrolyte membrane.

10. A membrane electrode assembly, comprising:
the membrane catalyst-layer assembly as set forth in claim 8,
a first gas diffusion layer that is arranged so as to cover said first catalyst layer of said membrane catalyst-layer assembly, and
a second gas diffusion layer that is arranged so as to cover said second catalyst layer of said membrane catalyst-layer assembly.

11. A polymer electrolyte fuel cell including the membrane electrode assembly as set forth in claim 10.

12. The assembly as set forth in claim 1, wherein each of the first membrane reinforcement members and the second membrane reinforcement members has a film shape.

* * * * *